(12) United States Patent
Nelson et al.

(10) Patent No.: US 9,179,612 B2
(45) Date of Patent: Nov. 10, 2015

(54) AREA-PROGRAMMABLE SPRINKLER

(71) Applicants: Rodney Lee Nelson, Colbert, WA (US);
LaLonni Lee Nelson, Colbert, WA (US);
John S. Reid, Spokane, WA (US)

(72) Inventors: Rodney Lee Nelson, Colbert, WA (US);
LaLonni Lee Nelson, Colbert, WA (US);
John S. Reid, Spokane, WA (US)

( * ) Notice: Subject to any disclaimer, the term of this patent is extended or adjusted under 35 U.S.C. 154(b) by 48 days.

(21) Appl. No.: 13/998,913

(22) Filed: Dec. 23, 2013

(65) Prior Publication Data

US 2014/0110498 A1    Apr. 24, 2014

Related U.S. Application Data

(63) Continuation of application No. 13/573,585, filed on Sep. 26, 2012, which is a continuation of application No. 12/804,417, filed on Jul. 21, 2010, now Pat. No. 8,302,882.

(51) Int. Cl.
| | |
|---|---|
| *B05B 3/00* | (2006.01) |
| *A01G 25/16* | (2006.01) |
| *A01G 25/09* | (2006.01) |
| *B05B 3/02* | (2006.01) |
| *B05B 1/14* | (2006.01) |
| *B05B 1/26* | (2006.01) |
| *B05B 15/10* | (2006.01) |

(52) U.S. Cl.
CPC .............. *A01G 25/16* (2013.01); *A01G 25/092* (2013.01); *B05B 1/14* (2013.01); *B05B 1/262* (2013.01); *B05B 3/021* (2013.01); *B05B 15/10* (2013.01)

(58) Field of Classification Search
CPC .............. G05D 1/0278; G05D 1/0268; G05D 2201/0201; A01G 25/092; A01G 25/162; A01G 25/165

USPC .............. 239/723, 728, 729, 730, 737, 67–69
See application file for complete search history.

(56) References Cited

U.S. PATENT DOCUMENTS

| | | | |
|---|---|---|---|
| 1,796,942 A | | 3/1931 | Pottenger, Jr. |
| 3,326,232 A | * | 6/1967 | Stamps et al. ................ 239/727 |
| 3,362,641 A | | 1/1968 | Barnes |
| 3,528,093 A | | 9/1970 | Eerkens |
| 3,952,954 A | | 4/1976 | Taylor |
| 4,004,612 A | | 1/1977 | Hummel et al. ......... 137/624.11 |
| 4,819,875 A | | 4/1989 | Beal |
| 4,852,802 A | | 8/1989 | Iggulden et al. ................ 239/64 |
| 5,135,174 A | | 8/1992 | Chaplinsky |
| 6,045,066 A | * | 4/2000 | Gerdes et al. ................ 239/729 |

(Continued)

FOREIGN PATENT DOCUMENTS

DE    10/2005/058798 A1    6/2005

*Primary Examiner* — Davis Hwu
(74) *Attorney, Agent, or Firm* — John S. Reid

(57) ABSTRACT

A center pivot sprinkler system includes a sprinkler arm to be mounted at a pivot point at a first end of the sprinkler arm, the sprinkler arm defining a water conduit. A motive source can move the sprinkler arm in a circular motion about the pivot point. An end nozzle is supported at a second end of the sprinkler arm, and in fluid communication with the water conduit. A control valve is positioned between the water conduit and the end nozzle, and a control valve positioner can position the control valve. A position determining device determines the position of the end nozzle in a circular arc about the pivot point. A processor polls the position determining device to determine a then-current position of the end nozzle and determines a flow of water to be issued from the end nozzle as a function of the then-current position of the end nozzle.

7 Claims, 27 Drawing Sheets

(56) References Cited

U.S. PATENT DOCUMENTS

| | | | |
|---|---|---|---|
| 6,402,048 B1 | 6/2002 | Collins | 239/63 |
| 6,834,814 B1 | 12/2004 | Beckman | |
| 7,494,070 B2 | 2/2009 | Collins | 239/63 |
| 2004/0093912 A1* | 5/2004 | Krieger et al. | 68/12.26 |
| 2007/0267524 A1* | 11/2007 | Mack | 239/729 |
| 2010/0012744 A1 | 1/2010 | Kates | |

* cited by examiner

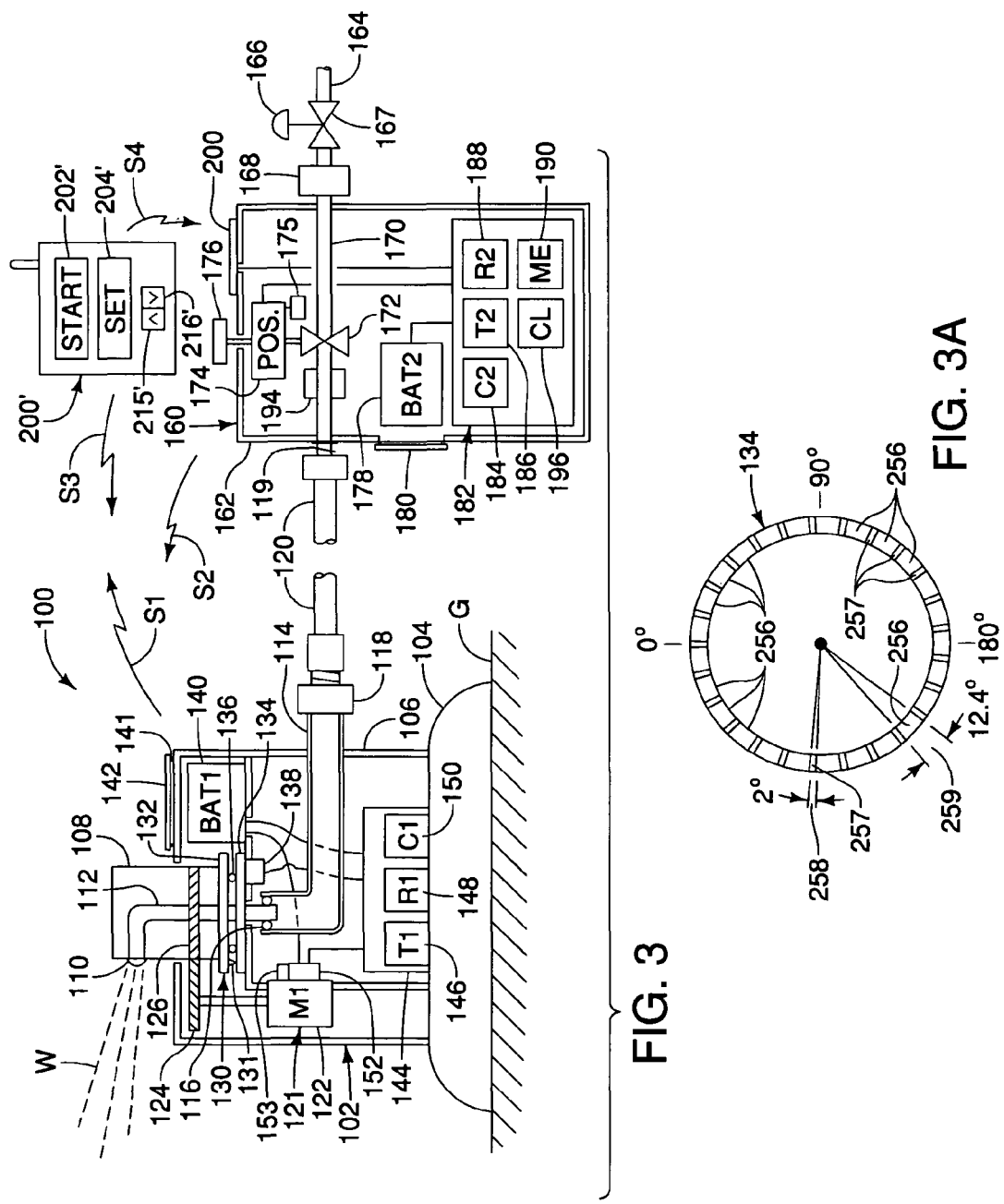

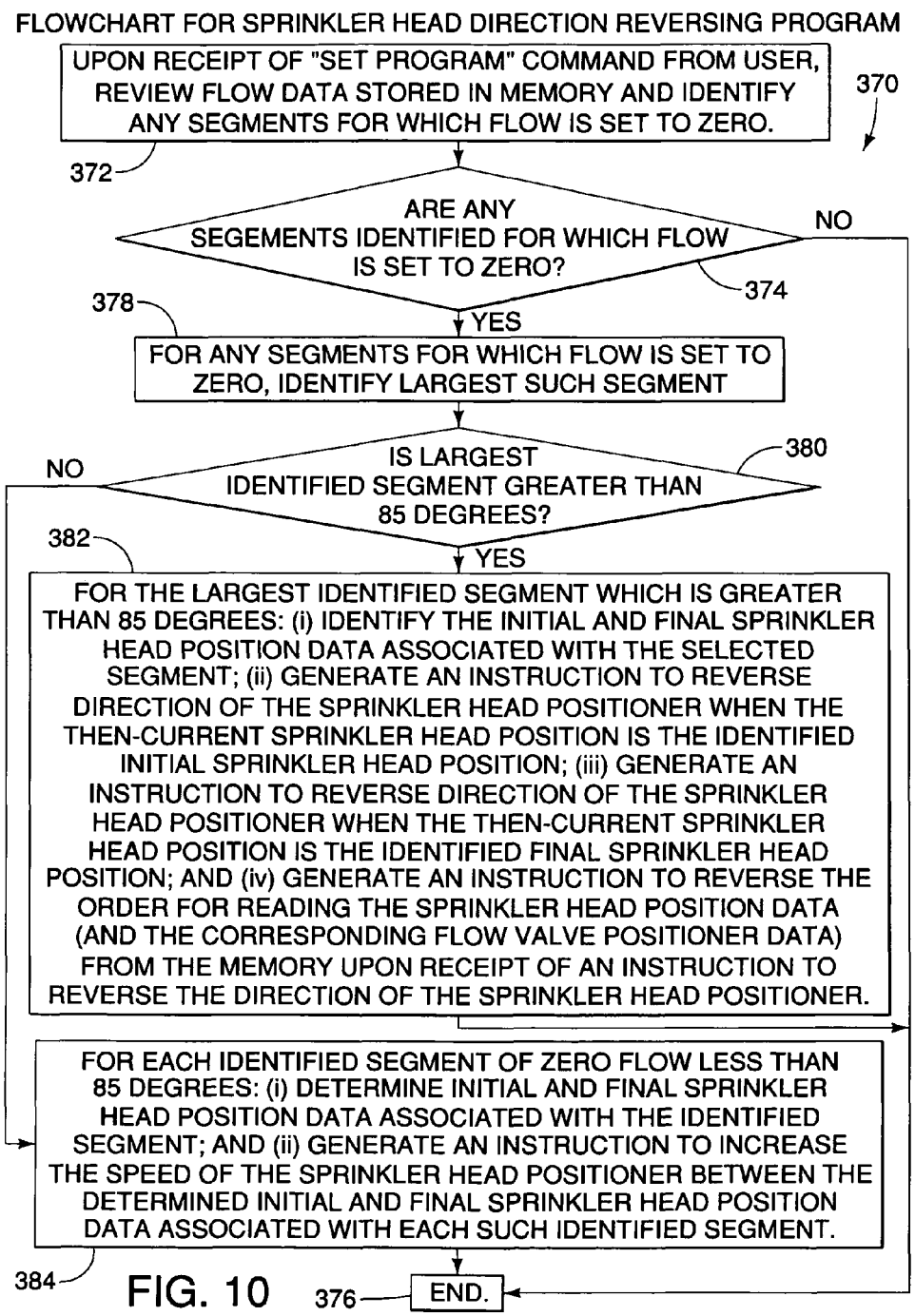

AREA-PROGRAMMABLE SPRINKLER

CROSS REFERENCE TO RELATED APPLICATIONS

This application is a continuation-in-part of U.S. patent application Ser. No. 13/573,585, filed Sep. 26, 2012, which in turn is a continuation-in-part of U.S. patent application Ser. No. 12/804,417, filed Jul. 21, 2010 (now U.S. Pat. No. 8,302,882 B2), which are all hereby incorporated by reference herein in their entirety. Priority is claimed to these earlier-filed applications under 35 U.S.C. §120.

FIELD

This application generally pertains to water sprinklers for irrigating an intended area while reducing watering of areas outside of the intended area.

BACKGROUND

It is desirable that a sprinkler, or a sprinkler system, water only that area which is intended to be watered. Watering outside of the intended area not only wastes water, but can have other undesirable consequences if the water falls on areas or objects which are not intended to be watered. For example, if a sprinkler sprays water against the side of a house, this can lead to premature degradation of paint applied to the house. Likewise, if a sprinkler sprays water in an area which is not intended to be irrigated, this can promote weed growth in the unintended area.

By and large, most sprinkler heads intended for the irrigation of lawns and the like are configured to sprinkle in a circular pattern, or at least a pattern circumscribing a circular arc. For example, in-ground sprinkler systems utilize one or both of pop-up spray heads and/or rotary spray heads, both of which are typically limited to spraying in circular (or circular arc) spray patterns. Likewise, many free-standing moveable lawn sprinklers are also limited to spraying in circles or circular arcs.

Most in-ground water sprinkler systems employing pop-up spray heads and/or rotary spray heads are configured with the sprinkler heads positioned at corners or edges of the intended area to be watered. This facilitates (but does not ensure) watering the intended area, since the spray from the sprinkler heads is directed inward of the perimeter of the intended area. For example, for a square area intended to be watered (such as a common residential lawn or yard), a typical in-ground sprinkler system may include two sprinkler heads positioned at opposing corners of the yard. In this case only the intended area to be sprinkled will most likely be watered, yet there will be a region of overlap concentrated towards the center of the yard. Thus, the area is not evenly irrigated, and edge areas will typically become dry sooner, while the central area may remain quite moist (thus promoting grown of fungus and the like in this area). This situation is depicted in FIG. 1A, which shows a plan view of an area A1 which is desired to be watered (or irrigated). In the example depicted in FIG. 1A, the area A1 to be watered is bounded by border 1, and is depicted as generally being a square area. In this example two sprinkler heads, 10' and 10", are located at opposite corners of the square area A1. Each of the sprinkler heads 10' and 10" are configured to provide spray over an area consisting of a circular arc of 90 degrees. Thus, sprinkler head 10' will cover an area bounded by the upper edge A1-1, the left-most edge A1-2, and the arc 4, while sprinkler head 10" will cover an area bounded by the lower edge A1-3, the right-most edge A1-4, and the arc 5. As can be seen, this will result in an area 3 of overlapping spray, thus providing essentially twice as must water to area 3 as to areas 2. As can be appreciated, this is an undesirable situation, since water is not evenly applied to areas 2 and 3.

Alternately, if a sprinkler head which sprays in a circular pattern is placed inward of the perimeter of a square lawn area, its circular pattern will miss corner areas, and will typically insufficiently irrigate edge areas. That is, a sprinkler head configured to provide a circular spray pattern will inherently be incapable of sprinkling an area which is not bounded by a circular perimeter. Since most lawns, yards and gardens are non-circular in shape, the common pop-up and rotary sprinkler spray heads cannot water such areas without either (1) spraying beyond the perimeter of the intended area, or (2) depriving parts of the intended area to be watered from receiving the desired quantity of water. This is graphically depicted in FIG. 1B, which shows a plan view of the area A1 (of FIG. 1A) which is desired to be watered (or irrigated). In this instance, a single rotary sprinkler head 10 is centrally located in the essentially square area A1 which is to be sprinkled. As can be seen, a water flow from sprinkler 10 which covers the entire area A1 (bounded by circle 7) also includes overspray of areas 9, which can result in (1) waste of water, and (2) undesirable application of water to features (such as housing siding and the like) located in areas 9. On the other hand, a water flow from sprinkler 10 which does not provide overspray into areas 9 will be bounded by circle 6, but will not provide water to corner areas 8.

The problem depicted in FIGS. 1A and 1B becomes more acute when the area to be sprinkled is of a complex geometry. FIG. 1C is a plan view of an area A2 to be sprinkled which includes a number of different geometric shapes (e.g., concave edges, convex edges, straight edges, and non-parallel edges). The area A2 to be sprinkled is defined by a perimeter line "PL2" (which is not necessarily straight, curved, and/or continuous). A prior-art solution to the problem of watering the area A2 of FIG. 1C is depicted in FIG. 1D. In FIG. 1D, four separate sprinkler placements (10A, 10B, 10C and 10D) are provided to generally cover the area A2. (The four separate sprinkler placements can either be provided by a fixed in-ground sprinkler system, or by systematically placing a single sprinkler in each of the four indicate positions). In the example of FIG. 1D, sprinkler heads 10A and 10C are rotating sprinkler heads, configured to sprinkle over areas bounded by perimeters 20 (in the case of sprinkler 10A), and 24 (in the case of sprinkler 10C). Also in the example of FIG. 1D, sprinkler heads 10B and 10B are rotating sprinkler heads (or, alternately, pop-up circular spray pattern sprinkler heads) bounded by respective perimeters 22 (for sprinkler head 10B) and 26 (for sprinkler head 10D). As can be seen from FIG. 1D, the proposed pattern of sprinkler head placement (for sprinkler heads 10A, 10B, 10C and 10D) provides overspray (i.e., irrigation to non-desired areas) in areas 28, overlapping watering in other areas (30), and no watering to area 32. Further, as can be appreciated from FIG. 1D, the proposed watering arrangement requires either the placement of four separate in-ground sprinkler heads (10A, 10B, 10C and 10D), or four separate placements by a user of a single sprinkler head over a period of time to achieve the indicated coverage. In the first instance (i.e., placement of four separate in-ground sprinkler heads), this increases cost and complexity of an in-ground sprinkler system. In the second instance (i.e., four separate placements of a single sprinkler by a user over a period of time), this requires increased user involvement, which may be undesirable to the user.

Some proposed solutions to this problem are known in the prior art. For example, U.S. Pat. No. 1,796,942 describes a rotating sprinkler head which can vary the distance from the sprinkler head to the outer reach of the spray pattern by adjusting the angle of declination of the sprinkler head. This is done by using fixed cams which cause the sprinkler head to selectively move angularly up-and-down through the cycle of rotation. As is apparent, a separate cam is required for each spray area. That is, the sprinkler head is not "programmable" other than by replacing one cam with another.

Another proposed prior art solution to the problem described above can be found in U.S. Pat. No. 3,528,093. The '093 patent describes a rotating sprinkler head which can vary the distance from the sprinkler head to the outer reach of the spray pattern by adjusting the volumetric flow of water to the sprinkler head. This is accomplished by using a cam which throttles flow as a function of position of the sprinkler head through the cycle of rotation. As with the device described in the '942 patent, a separate cam is required for each spray area.

BRIEF DESCRIPTION OF THE DRAWINGS

FIG. 3 is a side view schematic diagram depicting a first embodiment of an area-programmable sprinkler system in accordance with the current disclosure.

FIG. 3A is a plan view of a rotary encoder base which can be used as part of a sprinkler head position determiner in accordance with the current disclosure.

FIG. 10 is a flowchart depicting an exemplary sprinkler head direction reversing program which can be used at least in conjunction with the sprinkler system embodiments described herein.

DETAILED DESCRIPTION

Figure 1A:
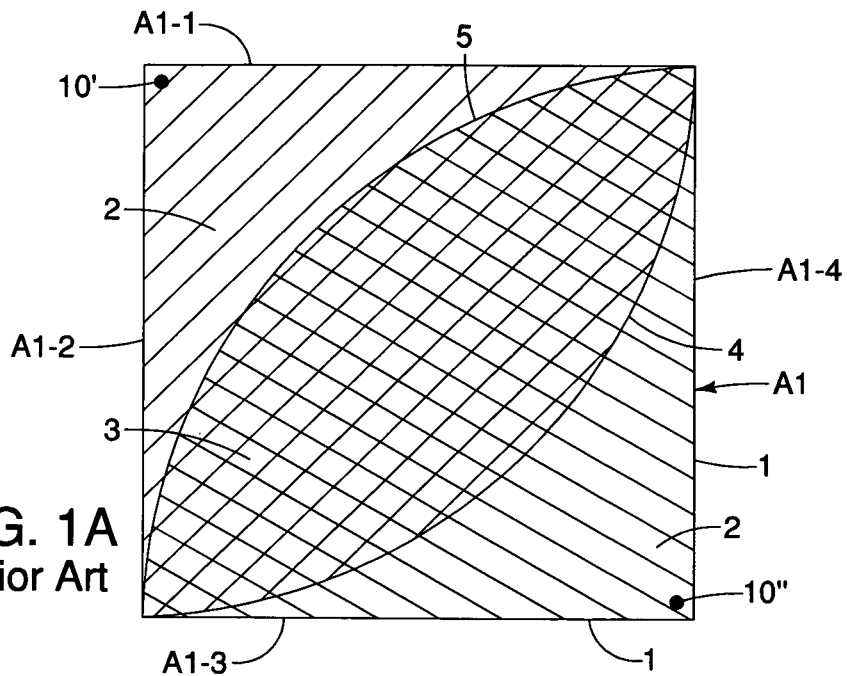
FIG. 1A is a plan view of a desired area to be irrigated (sprinkled), and depicting a first prior-art solution to irrigating the desired area.
Figure 1B:
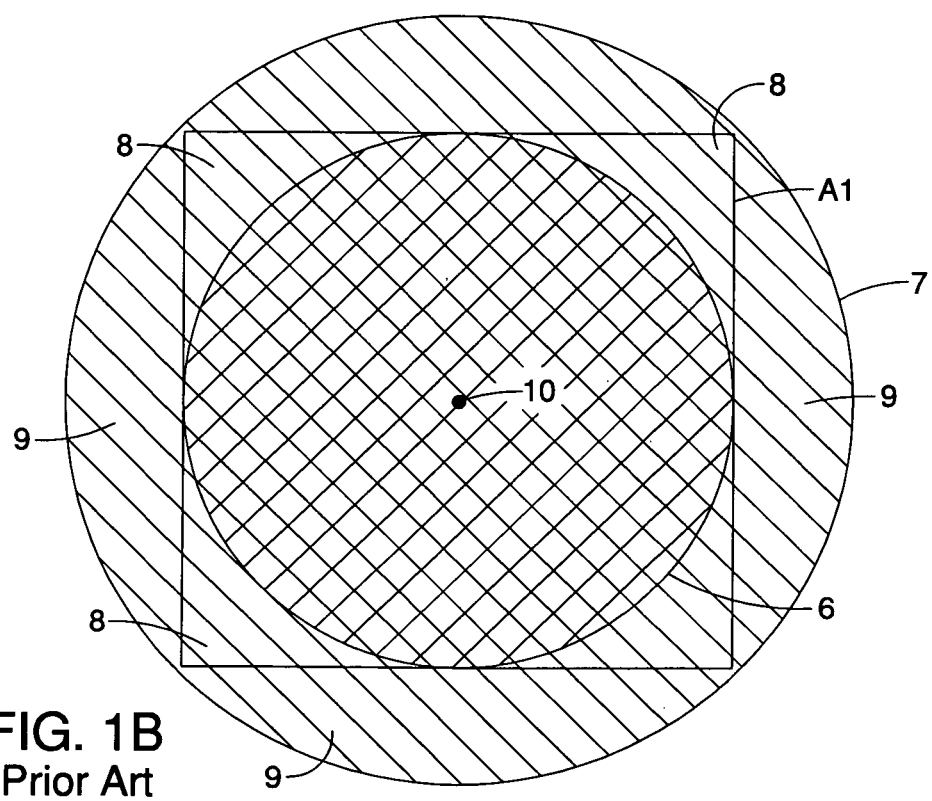
FIG. 1B is a plan view of a desired area to be irrigated (sprinkled), and depicting a second prior-art solution to irrigating the desired area.
Figure 1C:
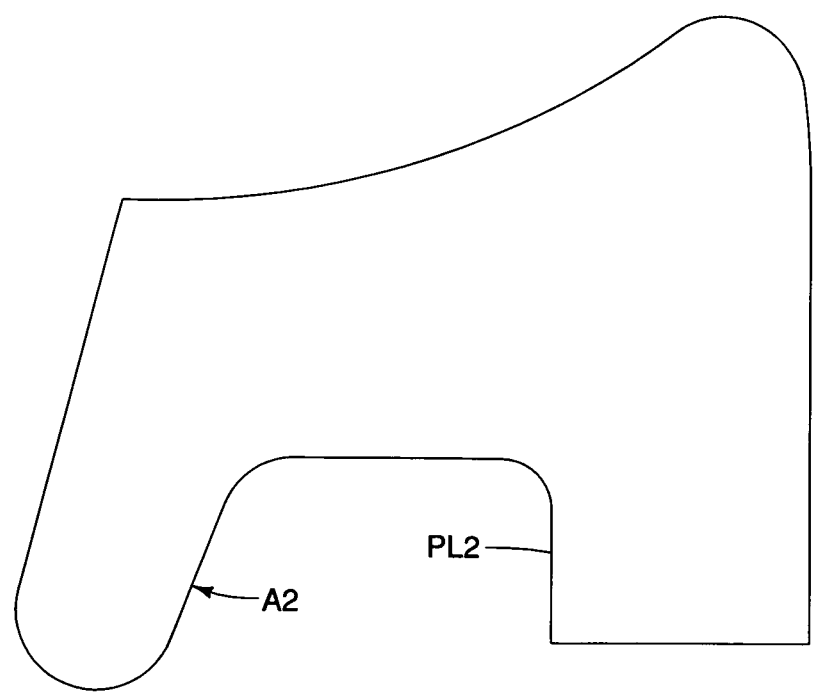
FIG. 1C is a plan view of a complex geometry desired area to be irrigated (sprinkled).
Figure 1D:
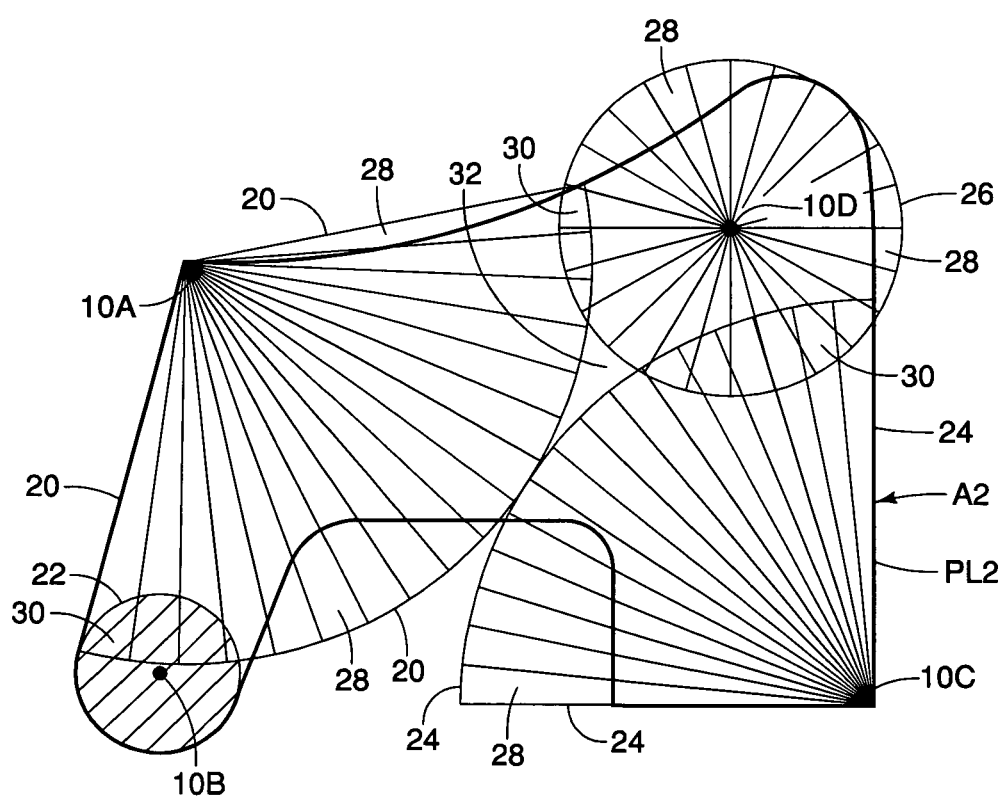
FIG. 1D is a plan view depicting one possible prior art solution to irrigating the complex geometry area depicted in FIG. 1C.
Figure 2:
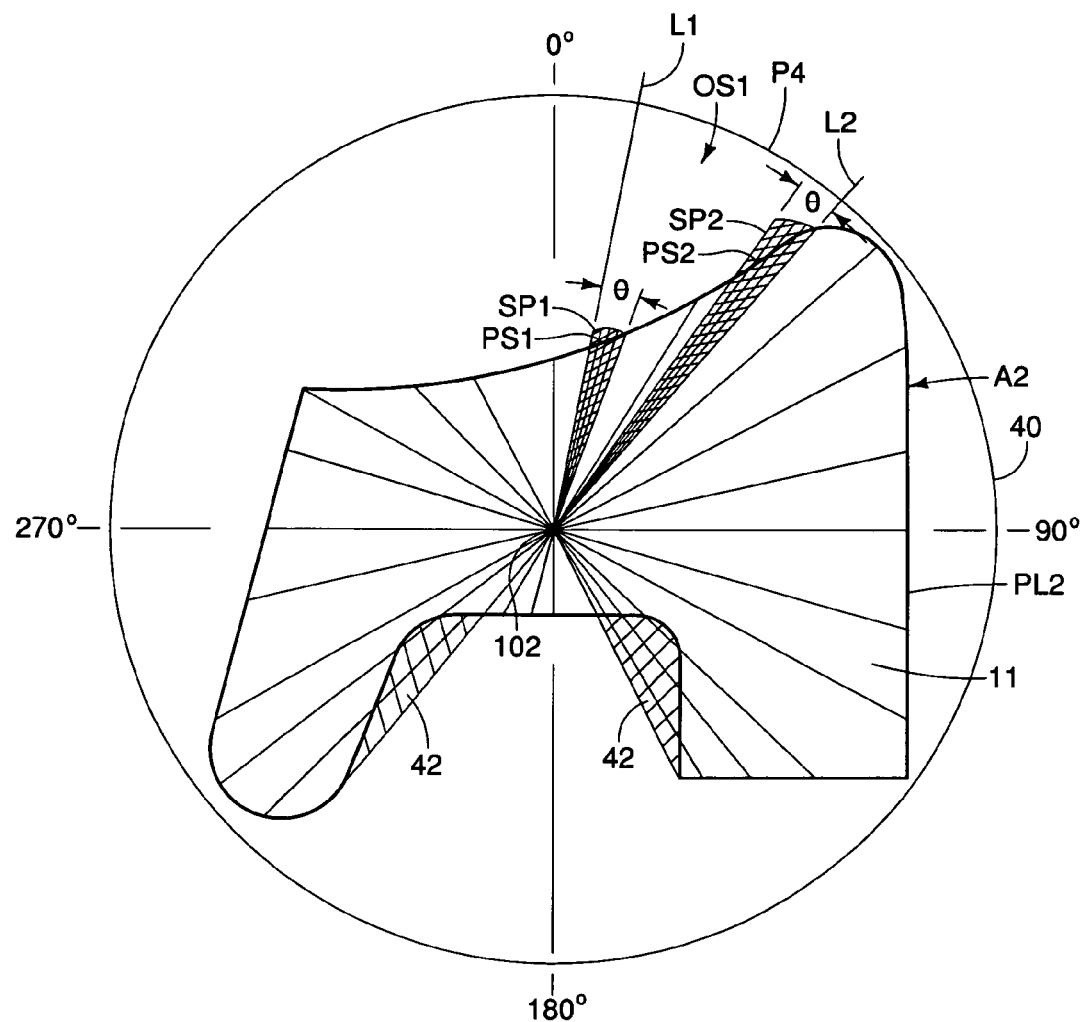
FIG. 2 is a plan view depicting how a sprinkler apparatus of the current disclosure can be used to irrigate the complex geometry area depicted in FIG. 1C.

The apparatus disclosed and described herein provides for an area-programmable sprinkler and sprinkler system which can provide irrigation (i.e., water spray or watering) to a desired area to be sprinkled, while substantially reducing overspray (i.e., watering to areas which are not desired to be watered), and also substantially reducing overlapping watering in areas within the desired area to be sprinkled, and particularly as compared to the prior art. One example of a application of an area-programmable sprinkler in accordance with the present disclosure is depicted in FIG. 2, which is a plan view of the desired area to be sprinkled A2 of FIGS. 1C and 1D. In FIG. 2, a sprinkler head 102 in accordance with the present disclosure is located within the area to be sprinkled A2. The area-programmable sprinkler of the present disclosure (which includes sprinkler head 102) can be programmed to provide irrigation to area 11 (as depicted by the radial lines extending outward from sprinkler head 102). The sprinkler head 102 is configured to provide irrigation to a circular area bounded by circular perimeter 40, but can be programmed (via the other system components described hereinafter) to only provide irrigation to the area A2, save for the minor overspray in areas 42. As can be appreciated by a comparison of FIGS. 1D and 2, the area programmable sprinkler (and sprinkler system) of the present disclosure (as depicted in FIG. 2) substantially reduces the amount of overspray (areas 28, FIG. 1D), and the non-irrigated portion (32, FIG. 1D) over the prior art (FIG. 1D). As can further be appreciated by a comparison of FIGS. 1D and 2, the area programmable sprinkler (and sprinkler system) of the present disclosure (as depicted in-use in FIG. 2) substantially reduces the number of fixed sprinkler heads and/or sprinkler head placements (from the four positions 10A, 10B, 10C and 10D in FIG. 1D, to the single position 102 in FIG. 2) required to irrigate the area the be watered (A2).

As will be evident from the following disclosure, the area programmable sprinkler (and sprinkler system) of the present disclosure provides advantages over the prior art. Specifically, with respect to the apparatus disclosed in U.S. Pat. No. 1,796,942 (which provides for a rotating sprinkler head which can vary the distance from the sprinkler head to the outer reach of the spray pattern by adjusting the angle of declination of the sprinkler head), this prior art solution maintains constant volumetric water flow over the entire area to be sprinkled. Thus, areas which are bounded by the then-current distance between the sprinkler head and the perimeter of the area to be sprinkled will receive differential amounts of water (on a gallon-per-square-foot basis), and thus the area to be sprinkled will not be evenly irrigated. By contrast, the apparatus of the present disclosure provides for an irrigation system which can provide an essentially constant flow of water (on a gallon-per-square-foot basis) to the area to be sprinkled.

Further, with respect to the apparatus disclosed in U.S. Pat. No. 3,528,093 (which provides for a rotating sprinkler head which can vary the distance from the sprinkler head to the outer reach of the spray pattern by adjusting the volumetric flow of the sprinkler head by way of a cam which throttles flow as a function of position of the sprinkler head), the apparatus of the present disclosure provides for an irrigation system which can be programmed for several different areas to be sprinkled, without the use of providing separate cams for each different area. Additionally, since the apparatus described in U.S. Pat. No. 3,528,093 uses "water jet pressure" to advance the sprinkler head in a rotating pattern, this "water jet pressure" will vary as the water flow from the spray nozzle is varied (by the cam), and the rate of rotation of the sprinkler head will thus not be constant, and the sprinkler head will thus provide an uneven rate of water application (in gallons per square foot) to the area to be sprinkled, similar to the deficiency described above for the apparatus described in U.S. Pat. No. 1,796,942.

A further advantage of a sprinkler system in accordance with the present disclosure over the prior art (specifically, the devices described in U.S. Pat. Nos. 1,796,942 and 3,528,093) is the ease of use of the apparatus described herein. Specifically, in order to adjust the cams for the devices described in U.S. Pat. Nos. 1,796,942 and 3,528,093 the user must individually adjust each cam positioner in order to provide coverage over the area to be sprinkled. This can require making multiple adjustments to the cam positioners, turning the sprinkler off and on following each adjustment. (Alternately, the user can replace one cam with another for different areas, but this necessitates having a plurality of cams available.) Further, in these prior art devices once a cam is established to provide coverage to an area to be sprinkled, if the sprinkler is moved to a different location (even within the area to be sprinkled), then the cam must either be reconfigured to adjust to the new location of the sprinkler head, or replaced with a different cam. As can be seen, these prior art devices can involve significant user interaction in order to achieve area-variable irrigation. By contrast, the area-programmable sprinkler system of the present disclosure enables a user to easily adjust a water flow pattern over the area to be sprinkled. Further, this adjustment of the water flow pattern can be performed without the need for the user to enter the area to be sprinkled during the adjustment process, thus allowing the user to avoid stepping in wet lawn during the adjustment process.

Additional advantages of the apparatus and system of the current disclosure over the prior art will become evident in the following disclosure.

The following disclosure provides for at least the three following embodiments: (1) a single sprinkler head which can be used to provide a programmable watering to one or more areas to be sprinkled; (2) a sprinkler system (such as an in-ground sprinkler system) which comprises multiple sprinkler heads in order to provide programmable watering to one or more areas to be sprinkled; and (3) a sprinkler which incorporates programmable angle-of-declination adjustment for a water discharge nozzle of the sprinkler.

We will now proceed to describe each embodiment, and variants, in detail.

First Embodiment: Single Sprinkler Controllable for Area-programmable Coverage of Area (or Areas) to be Sprinkled.

The first embodiment generally includes a sprinkler head having a water discharge nozzle and adapted to move between a first sprinkler head position and a second sprinkler head position, to thereby apply water to the area desired to be sprinkled. In the following descriptions and figures, the sprinkler head is presumed to move in a rotational pattern about a fixed sprinkler base, discharging water from the discharge nozzle in a relatively narrow arc over the area to be sprinkled as the sprinkler head rotates. (The arc of discharge of water from the discharge nozzle is typically in the range of between about 2 degrees and about 20 degrees.) However, as will be appreciated from the following description, the general concepts provided for herein can equally be applied to other sprinkler types, such as a travelling sprinkler (which physically moves a sprinkler base from a first location to a second location within the area to be watered during use of the sprinkler), and an oscillating (i.e., "back-and-forth") sprinkler. Further, in the case of the sprinkler head moving in a rotational pattern about a fixed sprinkler base (which supports the sprinkler head), the first sprinkler head position and the second sprinkler head position generally describe a circular arc (which can include a full circle) over which the sprinkler head is intended to travel.

Referring to FIG. 2 (described above), the sprinkler head discharge nozzle (not specifically identified, but presumed to be fixed with respect to the rotating sprinkler head 102) distributes water spray in an arc covered by "θ" degrees (here, about 4-7 degrees). In a first spray position "SP1" the discharge nozzle discharges water over the indicated area which is bounded by perimeter segment "PS1", and in a second spray position "SP2" the discharge nozzle discharges water over the indicated area which is bounded by perimeter segment "PS2". As can be seen, a certain amount of overspray of the area to be watered (A2) is provided in each of the two spray positions (SP1 and SP2). However, it will be appreciated that this overspray is insignificant as compared to the overspray OS1 (i.e., the circular arc bounded by lines L1 and L2, arc-line P4, and the sprinkler head 102) which would be experienced in a traditional prior art situation where the spray from sprinkler head 102 was not area-programmable. (The present disclosure also provides for methods to reduce the overspray which can result from implementation of the area-programmable sprinklers described herein.)

The sprinkler system of the first embodiment further includes a sprinkler head positioner. The sprinkler head positioner moves (either directly or indirectly) the sprinkler head between the first and second sprinkler head positions. For purposes of the examples described herein below, and particularly with respect to the exemplary figures, the sprinkler head positioner moves the sprinkler head in a rotational motion about a static sprinkler base (which supports the sprinkler head). Thus, for purposes of these examples, the sprinkler head positioner rotates the sprinkler head in a circular arc about the sprinkler base (as viewed in a plan view). However, it will be appreciated that for other types of sprinkler heads (e.g., a traveling sprinkler head or an oscillating sprinkler head), the sprinkler head positioner can move the sprinkler head along a trajectory within (or proximate to) the area to be sprinkled (in the case of the traveling sprinkler head), or back-and-forth within (or proximate to) the area to be sprinkled (in the case of the oscillating sprinkler head). The sprinkler head positioner can be driven by sources such as electrical power or flow of water to the sprinkler head.

The sprinkler system of this first embodiment further includes a sprinkler head position determiner to determine a current sprinkler head position between the first and second sprinkler head positions. That is, assuming that the water discharge nozzle is fixed with respect to the sprinkler head, and the sprinkler head (and thus, the discharge nozzle) move rotationally about the fixed sprinkler base, the sprinkler head position determiner determines the relative position of the sprinkler head (and thus, the discharge nozzle) with respect to the fixed sprinkler base. The sprinkler head position determiner serves to establish (or determine) the position of the sprinkler head (and thus, the position of the water discharge nozzle) relative to a segment of the perimeter line (e.g., perimeter segment PS1 of perimeter line PL2 of FIG. 2) which can be covered by discharge of water from the water discharge nozzle. The sprinkler head position (based on information derived from the sprinkler head position determiner) is generally used to determine a desired flow of water from the discharge nozzle relative to the then-current position of the sprinkler head. In general, the sprinkler head position determiner produces a position signal representative of the then-current position of the water discharge nozzle relative to the sprinkler base. As will be described below, this nozzle position signal can be used to determine the flow of water to be sent to the discharge nozzle for the then-current sprinkler head position.

For purposes of the examples described herein below, and particularly with respect to the exemplary figures, the sprinkler head position determiner establishes the relative rotational position of a rotating sprinkler (and thus the water discharge nozzle) head about a static sprinkler base (which supports the sprinkler head). However, it will be appreciated that for other types of sprinkler heads (e.g., a traveling sprinkler head, and an oscillating sprinkler head), the sprinkler head position determiner can determine the position of a sprinkler head along a trajectory within (or proximate to) the area to be sprinkled (in the case of the traveling sprinkler head), and a forward and/or backward position of a sprinkler head (in the case of an oscillating sprinkler head).

The sprinkler system of the first embodiment further includes a flow control valve to control flow of water from a main water supply to the water discharge nozzle in the sprinkler head. As described more fully below, the flow control valve (which may also be referred to hereinafter as "FCV") operates in response to signals from a controller to control flow of water from the main water supply to the water discharge nozzle. The flow control valve can be of any known form of a controllable valve, such as a ball valve, a gate valve, a globe valve, or other any other form of valve.

The first embodiment of the sprinkler system provided for herein further includes a flow control valve positioner to establish a current control valve position of the flow control valve between an essentially fully closed control valve position and an essentially fully open control valve position. More particularly, the flow control valve positioner regulates flow of water (via the flow control valve) between the main water supply and the sprinkler head discharge nozzle. The flow control valve positioner thus serves to adjust flow of water emanating from the sprinkler head (e.g., 102, FIG. 2) such that water flow at least (desirably) reaches the then-current perimeter segment (e.g., PS1, FIG. 2), without providing significant spray beyond this perimeter segment, or spray which would not essentially provide water coverage to this segment.

The sprinkler system of the first embodiment also includes a controller to receive a sprinkler head position signal from the sprinkler head position determiner, and to send a control valve control signal to the flow control valve positioner in response thereto. That is, in order to determine the correct flow to be sent to the sprinkler head (as determined by the control valve), the position of the flow control valve positioner is set based on the then-current direction of the sprinkler head discharge nozzle, as determined by the sprinkler head position signal sent from the sprinkler head position determiner. More particularly, the controller receives the sprinkler head position signal (or a derivative signal based thereon), and, based on this signal, generates a control valve position signal to be sent to the control valve positioner. Exemplary forms for the controller include a microprocessor, a programmable logic circuit (or "PLC"), an analog control circuit, and electronic components (e.g., transistors, resistors, diodes, etc.) on a circuit board.

FIG. 3 is a generally side elevation view depicting one example of a sprinkler system in 100 accordance with the first embodiment. The sprinkler system 100 includes a sprinkler 102 and a control unit 160, which are connected by a water conduit (here, a garden hose) 120. The sprinkler 102 includes a sprinkler head 108 and a sprinkler base 104. The sprinkler base 104 supports the sprinkler 102 on a ground or surface "G" which is within, or proximate to, an area to be watered. The sprinkler base 104 also supports the sprinkler head 108 so that the sprinkler head can rotate about the base (i.e., in a plan view, sprinkler head 108 rotates clockwise and/or counter-clockwise relative to base 104). Sprinkler 102 is provided with a housing 106 which encloses other components of the sprinkler (described below) to provide protection for those components.

Sprinkler head 108 includes a water discharge nozzle 110 which projects water "W" in a relatively narrow spray angle (between approx. 2 degrees and approx. 20 degrees in this example) from the sprinkler head. Water is provided to the discharge nozzle 110 by a sprinkler head conduit 112 which fluidically connects to a sprinkler water line 114. A rotational seal 116 allows the sprinkler head conduit 112 to move rotationally with respect to the static sprinkler water line 114. The sprinkler 102 further includes a hose connector 118 allowing the sprinkler water line 114 to be connected to the garden hose 120. In one variation the water discharge nozzle 110 can be interchangeable so that a user can select from among several different spray patterns. For example, a user may desire to use a first discharge nozzle which produces a larger sized droplet as compared to a second discharge nozzle which produces a smaller sized droplet (at the expense of not being able to project the water spray as far when using the first discharge nozzle).

Sprinkler 102 further includes sprinkler head positioner 121, which serves to cause the sprinkler head 108 to rotate about the sprinkler base 104. In the example depicted, the sprinkler head positioner 121 includes an electric motor 122 which drives drive gear 124. Drive gear 124 in turn engages sprinkler head gear 126, such that motor 122 can cause the sprinkler head 108 to rotate about the sprinkler base 104. In the example depicted, the sprinkler head motor 122 is a rotary motor. However, in an optional configuration the sprinkler head motor 122 can be a linear electric motor which can engage a rack-and-pinion type drive connected to sprinkler head 108. The sprinkler motor 122 can be optionally provided with a motor starter solenoid 152, and can be further optionally provided with a sprinkler motor reversing unit 153. (Sprinkler motor starter solenoid 152, and sprinkler motor reversing unit 153, will be described further below.)

It will be appreciated that the sprinkler head positioner 121 can also be provided as a water motor, which is commonly known in the art. A water motor uses the flow of water from pressurized water supply (e.g., hose 120) in order to drive an impeller, which in turn drives a sprinkler head (e.g., sprinkler head 108) in rotational motion. In the instance of the current disclosure, the use of an electric motor as the sprinkler head positioner can provide certain advantages over the use of a water motor. In the first instance, the use of an electric motor as the sprinkler head positioner generally ensures an essentially constant rate of movement for the sprinkler head (e.g., as measured in degrees of movement per minute), whereas a water motor will provide a variable rate of movement for the sprinkler head. That is, if a water motor is used as the sprinkler head positioner, then as flow of water to the sprinkler discharge nozzle 110 is increased or reduced (in order to provide variable irrigation to the area to be sprinkled), the rotational speed of the sprinkler head 108 will likewise be respectively increased or reduced. This in turn provides for an uneven distribution of water (as measured in gallons per square foot) of the area to be watered. More particularly, a water motor (which is subject to variable flow) will generally provide a constant flow of water to a discharge nozzle, as measured in gallons per minute per degree of arc. However, this does not consider the length of the area to be covered by the arc of the sprinkler spray (i.e., the distance from the sprinkler head to the outer perimeter of the instant area to be watered). By contrast, an electric motor (when used in conjunction with variable water flow to the sprinkler head water discharge nozzle) will maintain a constant rate of the variable flow of water. Put another way, a water motor applies an equal amount of water to a circular arc, regardless of the area circumscribed by the arc, whereas an electric motor provides an equal amount of water to an area circumscribed by a circular arc. As described above, the latter situation (i.e., providing equal amounts of water to different arc segment areas covered by a water sprinkler discharge nozzle) is one of the preferred advantages of the sprinkler systems described herein.

Figure 9:
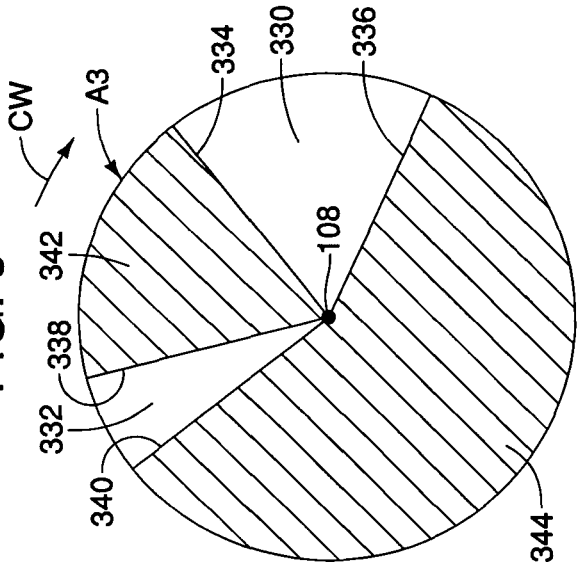
FIG. 9 is a plan view of a general area to be sprinkled depicting how the general area can contain one or more specific areas for which no watering (or sprinkling) is to be provided.

A further advantage of using an electric motor (versus a water motor) as the sprinkler head positioner is that an electric motor can continue to move (i.e., position) the sprinkler head even in the case where there is no water flow. (As can be appreciated, if a water motor is used as the sprinkler head positioner, then in an area where no sprinkling is desired, there will be no water flow, and thus no forward motion of the sprinkler head beyond the area where no sprinkling is desired.) This situation is depicted in FIG. 9, which is a plan view of an area A3 which can be watered by sprinkler head 108. In the situation depicted in FIG. 9, areas 330 and 332 desirably receive no irrigation. Thus, in the instance of no-sprinkle area 330 (and assuming that sprinkler head 108 is generally moving in the clockwise direction "CW"), once the sprinkler head 108 reaches position 334, flow of water to the sprinkler head will cease. Thus, if a water motor is used as the sprinkler head positioner, then the sprinkler head 108 will not move any further, and will stall. However, if the sprinkler head positioner is an electric motor, then sprinkler head 108 will continue to move in direction "CW" to position 336 (regardless of the fact that no water is emanating from the sprinkler head 108), at which time flow of water to the sprinkler head will resume to thus irrigate area 344.

Returning to FIG. 3, the sprinkler 102 of the current example further includes sprinkler head position determiner 130. As described above, the sprinkler head position determiner 130 serves to indicate the relative position of the moving sprinkler head 108 with respect to the essentially fixed sprinkler base 104. (In the example depicted in FIG. 3, the sprinkler head position determiner 130 serves to indicate a relative rotational position of the moving sprinkler head 108 with respect to the essentially fixed sprinkler base 104.) As depicted in FIG. 3, in this example the sprinkler head position determiner 130 is a rotary encoder which includes a fixed base 134 (i.e., fixed with respect to sprinkler base 104), and a position determiner contact 131 which is supported on a sprinkler head platform 132. Sprinkler head platform 132 rides on static position determiner base 134 supported by a bearing 136. Bearing 136 reduces frictional drag (and thus wear) between the position determiner contact 131 and the position determiner base 134. FIG. 3A is a plan view depicting an exemplary fixed base 134 of the rotary encoder 130. In the example shown, the fixed base 134 includes 25 contact points 256 (which can be electrical contacts) separate by non-conductive spacers 257. As the position determiner contact 131 (FIG. 3) moves over any given contact point 256, the arc segment (e.g., arc segment 259) position for that particular contact (relative to an initial position of 0 degrees, for example) is specifically identified, and thus a then-current position signal can be generated by position sensor 138 (FIG. 3). In the example shown in FIG. 3A, the encoder base includes 25 positions (i.e., 25 separate contact points 256). If the angle of each spacer 257 is 2 degrees (e.g., spacer arc 258), then for a 360 degree circular positioner, 50 degrees of arc will be consumed by the spacers 257, leaving 310 degrees for the contact points 256, or 12.4 degrees per contact point. That is, each contact point 256 can provide for sending a discreet position signal over a 12.4 degree arc. As will be described more fully below, control logic for setting a flow control valve positioner (174, FIG. 3) can include a number of different schemes to provide watering over each discrete segment covered by a position contact point 256 and adjacent spacers 257.

Returning to FIG. 3, the sprinkler 102 can also include a sprinkler electronics package 144. In the example shown, the sprinkler electronics package 144 includes a sprinkler transmitter "T1" (146), a sprinkler receiver "R1" (148), and a local sprinkler control unit "C1" (150). The sprinkler transmitter 146 can be used to transmit sprinkler head position information (from sprinkler head position determiner 130) to the sprinkler controller 182 (described below), as well as other information such as a low battery condition (for battery 140, described below). The sprinkler transmitter 146 can also include a wireless signal transmitter (described below). The sprinkler receiver 148 can receive signal information from the sprinkler controller 182 (such as a signal to start and/or stop motor 122), and can also include a wireless receiver (described below). The local sprinkler control unit 150 can include a clock (not shown), a processor or the like (not shown), and a voltage regulator (also not shown). The local sprinkler control unit 150 can coordinate signals to and from other components in the system 100, as will be described below with respect to FIG. 8.

As depicted in FIG. 3, the sprinkler 102 further includes a power source, shown as battery "BAT1" 140. The sprinkler battery 140 can be protected by sprinkler housing 106, as well as a separate battery compartment (not shown), and can be accessed via battery compartment door 142, which can include a watertight seal 141. The battery 140 can provide electrical power to the sprinkler motor 122, the motor starter solenoid 152, the motor reversing unit solenoid 153, and the sprinkler electronics package 144.

The main control unit 160 of the exemplary sprinkler system 100 of FIG. 3 is depicted as being a separate unit enclosed by a control housing 162, and including a first (or inlet) water connector 168, and a second (or outlet) water connector 119. Control unit water inlet connector 168 can be, for example, a standard female hose connector which can be connected to the male threads of a faucet 167, which is in turn connected to a main water supply source 164. Control unit water outlet connector 119 can be, for example, a standard male hose connector which can be connected to a female connector of garden hose 120, which is in turn connected to the sprinkler 102. (It will be appreciated that in one variation the control unit 160 and the sprinkler 102 can be plumbed in a fixed configuration, thus eliminating certain of the water connectors depicted in FIG. 3.)

The main control unit 160 includes a flow control valve 172 which is placed inline in water supply conduit 170, and which can regulate flow of water from the main water supply 164 to the water discharge nozzle 110 on sprinkler 102. Regulation of the flow control valve 172 is performed by a flow control valve positioner "POS." 174 which can establish a current control valve position for the water restricting component (not shown) within the flow control valve 172. The flow control valve positioner 174 can be provided with a manual positioner 176 which can allow a user to manually adjust the flow control valve positioner 174, and thus manually regulate flow of water from the flow control valve 172. The control valve manual positioner 176 serves as one means for a user to position the flow control valve positioner during a program mode in the control unit 160 (described below). The flow control valve positioner 174 can also be provided with a flow control valve position determiner 175. The flow control valve position determiner 175 includes a sensor which can detect the position of the moveable flow control element within the static body of the flow control valve 172 and generate a flow valve position signal in response thereto. In one variation the flow control valve 172 (and the flow control valve positioner 174) can be located at (or within) the sprinkler 102.

The flow control valve 172 can be implemented using a number of different kinds of valves, however is it desirable (but not essential) that the flow control valve 172 be a fast-acting valve, such as a ball valve (which only needs to move through 90 degrees of rotation to move from a fully closed position to a fully open position), a gate valve, or a globe valve attached to a valve stem having a relatively high-pitch thread pattern. The value of implementing the flow control valve 172 as a fast-acting valve is that during a program mode (described below), the user can use the control valve manual positioner 176 to quickly adjust the flow of water to the sprinkler 102. (That is, use of a standard globe valve, for example, may not allow the user to adjust the flow of water sufficiently rapidly when a quick transition is required between high and low flow situations.)

The flow control valve positioner 174 can be implemented using a number of different kinds of automatic valve positioners, such as an electric rotary motor (including stepper motors) or an electric linear motor. The selection of the particular form of control valve positioner 174 to be used can depend in part on the kind of valve used for the flow control valve 172. As will be appreciated, the valve positioner 174 and the control valve 172 can be linked by a mechanical drive such as a gear rack, a rack-and-pinion drive, and a reduction gear drive.

The control valve manual positioner 176 can be implemented in a number of different forms, and the particular form of implementation will generally (but not necessarily) depend on the kind of flow control valve positioner 174, and/or the form of control valve 172, which is used. In the example depicted in FIG. 3, the control valve manual positioner 176 is implemented as a rotary knob connected to the valve positioner 174, and in this case the valve positioner 174 can be a rotary positioner. In one variation, the manual positioner 176 can be connected directly to the flow control valve 172, or connected through a gear reduction mechanism. In another variation the manual positioner 176 can be a slider. In yet another variation the control valve manual positioner 176 can be implemented as an electronic control on the user interface 200 (described below), in which case there is no physical mechanical connection between the manual positioner 176 and the control valve 172 or the valve positioner 174. In still a further variation (described more fully below), the control valve manual positioner 176 can be eliminated, and its function replaced by using the valve handle 166 on the main water supply faucet 167.

The main control unit 160 also includes a controller electronics package 182, which can include a main controller "C2" (184), a control unit transmitter "T2" (186), a control unit receiver "R2" (188), a memory device "ME" (190), and a clock or timer "CL" (196). The controller 184 can function, and be implemented, as described above in the general description of the first embodiment. The control unit transmitter 186 can transmit signals (and coordinate their transmission) within the overall system 100, and can include a wireless transmitter (not shown). The control unit receiver 188 can receive signals (and coordinate their reception) within the overall system 100, and can include a wireless receiver (not shown). The control unit memory device 190 can be implemented as a computer-readable memory (readable by controller 184, and possibly other components within the system), and can include static memory (ROM) and dynamic memory (RAM). In general, the control unit memory 190 serves to record control valve positioner information correlated with sprinkler head position information. A more detailed description of the functions and interactions of the various components in the controller electronics package 182 will be provided below.

The main control unit 160 of FIG. 3 further includes a main power supply, depicted here as battery "BAT2" (178), which can be accessed in main unit housing 162 via battery compartment door 180. Power supply 178 provides power to the controller electronics package 182, and directly or indirectly to the valve positioner 174 and the user interface 200 (described below). The controller electronics package 182 can include a power regulator and one or more transformers or power converters, and including electrical switching components (none of which are specifically depicted in FIG. 3) in order to regulate one or more of the voltage, amperage, power type (AC or DC), and distribution of power to various other components in the system 100.

Figure 3B:
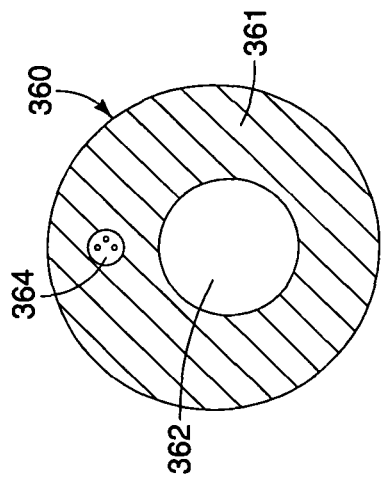
FIG. 3B is a cross section of a fluid conduit which can be used in selected variations of the embodiments described herein.
Figure 4:
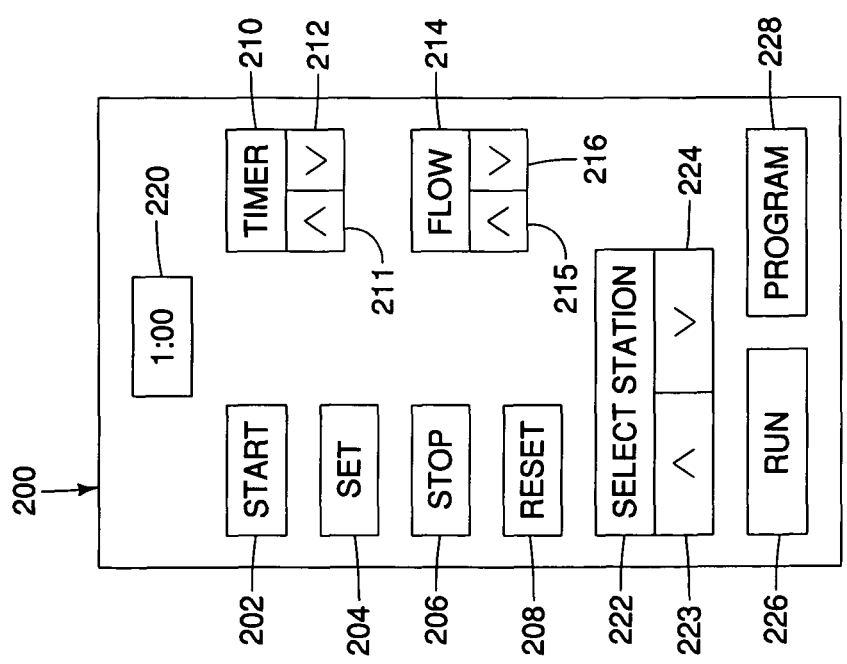
FIG. 4 is a plan view of a user interface which can be used with at least the area-programmable sprinkler system depicted in FIG. 3.

Main control unit 160 includes a user interface 200, here depicted as being mounted on the main unit housing 162. The primary function of the user interface 200 is to enable a user to choose between a program mode (wherein the user programs the controller 184 to provide a desired sprinkling pattern to an area to be watered), and a run mode wherein the controller 184 carries out the program entered by the user. (More on the program and run modes will be provided below.) Accordingly, in the simplest implementation the user interface 200 can be implemented as a switch to allow the user to select between the "program" and "run" modes. However, the user interface 200 can further include a number of enhancements, as depicted in FIG. 4. FIG. 4 is a plan view depicting an exemplary user interface 200 which can be used with the sprinkler system 100 of FIG. 3. The user interface 200 of FIG. 4 includes a "START" feature 202, a "SET" feature 204, a "STOP" feature 206, a "RUN" feature 226, a "PROGRAM" feature 228, and a "RESET" feature 208. Start feature 202 can function to power up the sprinkler control unit 160 and the sprinkler head motor 122, while the stop feature 206 can turn the off the sprinkler system (e.g., power down the control unit 160 and the sprinkler motor 122). The program feature 228 can be used to place the controller (184, FIG. 3) in a "program" mode, while the run feature 226 can function to place the controller in a "run" mode. The set feature 204 can be used to set or store a program into the control unit memory (190, FIG. 3), while the reset feature 208 can clear the control unit memory 190 FIG. 3) so that a new sprinkler program can be entered without conflicting with an existing stored program. The user interface 200 can further include a display device 220 to display useful information to the user. (Display device 220 can be, for example, and LCD display.) It will be appreciated that a number of the features described above can be implemented using fewer controls. For example, the start feature 202 can also place the controller 184 in a program mode, and the set feature 204 can also place the controller in a run mode (thus allowing respective program and run controls 228 and 226 to be eliminated).

In one variation, the manual control valve positioner (176, FIG. 3) can be implemented as a flow control feature "FLOW" (214) on the user interface 200 of FIG. 4, including controls 215 and 216 for respective flow increase and flow decrease. (In this case, the flow control feature 214 sends an electrical signal to the valve positioner 174 either directly or via controller 184. More specifically, the valve positioner 174 can include a control valve positioner driver, such as an electric motor, which is used to move the flow control element within the body of the flow control valve 172.) The user interface 200 can also optionally include a timer feature "TIMER" (210) to enable the user to set the period of time over which a program is to be run, as well as a time-of-day start time. The timer feature 210 can include controls 211 and 212 to allow a user to selectively increase or decrease time quantities, and to move through a menu of start times. Timer feature 210 can also work in conjunction with set feature 204 and display 220 to allow a user to page through a timing program (including days of the week, start times and run-length times) and set a sprinkling regimen for an extended period of time.

In still a further variation, the user interface 200 can include a "SELECT STATION" feature 222 which allows a user to select between one or more stations (i.e., sprinklers and/or sprinkler locations) using controls 223 and 224. For example, in the example depicted in FIG. 3, the sprinkler 102 can be placed in a variety of different sprinkler locations. For each sprinkler location, the user can save the respective sprinkling program (as stored in the memory 190) as a separate station. Then, when the user moves the sprinkler 102 from one location to another, the user does not need to reprogram the sprinkling program but can merely recall an existing sprinkling program from the memory 190 using the select station controls 223 and/or 224. Further, the sprinkler system 100 of FIG. 3 can be implemented using a plurality of sprinklers 102 located at different sprinkler locations. In this case the select station feature 222 can be used to select the particular sprinkler to be used at any given time. (This latter variation is described more specifically below with respect to the second embodiment and FIG. 12.)

Returning to FIG. 3, the sprinkler system 100 can be optionally provided with a water flow detector 194 adapted to determine at least an approximation of water flowing out of control valve 172 (and hence, from the water discharge nozzle 110). The water flow detector 194 can send a water flow signal to the controller 184, and the controller can use the water flow signal to assist in setting the position of the control valve positioner 174. The water flow signal is indicative of the amount (volumetric quantity) of water being issued from the sprinkler spray nozzle 110. These use of the water flow detector 194 is beneficial in situations where the pressure of water from the main supply 164 may be subject to pressure variation (and thus volumetric water flow—e.g., as measured in gallons per minute). As can be appreciated, if the main supply of water is subject to pressure (and flow) variations as a function of time, then the amount of water flowing through the control valve 172 will also vary over time for any given position of the control valve positioner 174. Thus, during the program mode the controller 184 can record not only the then-current position of the control valve positioner 174 (as determined by the flow control valve position determiner 175), but also the then-current corresponding volumetric flow of water (or an approximation thereof) from the control valve 172. Then, in a run mode, if the controller 184 determines that the flow of water from the control valve 172 has varied from the initially recorded flow for a given control valve positioner setting (as a result of reading the flow signal from the flow detector 194), the controller can increase or decrease the then-current position of the control valve positioner 174 to account for any such variances. Further, when a water flow detector 194 is employed in the sprinkler system 100 and flow is recorded during the program mode, then the then-current position of the control valve positioner 174 does not also need to be recorded since the main controller 184 can use only the current sprinkler head position and the recorded flow value for that sprinkler position in order to adjust the control valve 172 in order to achieve the desired flow. In one variation the recorded values of the then-current position of the control valve positioner 174 can be used to initially position the control valve 172, and then flow data can be used to make fine adjustments to the control valve to achieve the desired flow.

An exemplary device which can be used for the water flow detector 194 is an inline impeller (not shown) which is disposed at least partially in the fluid conduit between the outlet of the control valve 172 and the water discharge nozzle 110. In this case the impeller can be fitted with a fixed magnet which is configured to pass proximate to a fixed sensor (such as a magnetic switch) located on or in the fluid conduit proximate the impeller. Thus, each time the fixed magnet passes the fixed sensor, a pulse is generated. The higher the frequency of the pulses, the higher the detected water flow. Other known devices for measuring a liquid flow rate can also be employed as the water flow detector 194 such as, without limitation, an orifice plate or a venturi nozzle. In one variation, the water flow detector 194 can be a device which approximates water flow by measuring water pressure within the fluid conduit between the outlet of the control valve 172 and the water discharge nozzle 110. Since water flow to the discharge nozzle 110 is a function of the pressure drop between the outlet of the control valve 172 and the water discharge nozzle 110, measuring the pressure at a constant point in this fluid conduit will be representative of the flow passing therethough. While the water flow detector 194 is depicted in FIG. 3 as being located proximate the outlet of the control valve 172, it can be advantageous to locate the flow detector 194 in (or proximate to) the sprinkler water supply conduit 114, or even in the sprinkler head conduit 112. Locating the water flow detector 194 in the sprinkler 102 can reduce variances which may be introduced in the fluid conduit between the outlet of the control valve 172 and the water discharge nozzle 110. For example, if the user replaces the garden hose 120 with a different hose of a greater length, then more pressure drop will be introduced by the longer hose (assuming all other variables are held constant). In this case, measuring pressure proximate to the outlet of the control valve 172 would be less indicative of flow than measuring the pressure proximate to the discharge nozzle 110. Similarly, if one of the hose fittings 118 or 119 is leaking water, then measuring flow proximate to the outlet of the control valve 172 will not account for this lost water. Thus, when the water flow detector 194 is a pressure sensor, it is preferable to position the water flow detector proximate to the sprinkler 102, and more preferably in fluidic (and thus pressure) communication with either the sprinkler head conduit 112 or the sprinkler water line 114. (The sprinkler head conduit 112 and the sprinkler water line 114 may be referred to collectively as in-sprinkler fluid supply lines.)

As described above, in the sprinkler system 100 of FIG. 3 the sprinkler 102 and the main control unit 160 are in signal communication with one another so that at least the then-current sprinkler head position information (as determined by the sprinkler head position determiner 130) can be transmitted to the main control unit 160. This can be accomplished in at least two different ways. Firstly, the sprinkler transmitter 146 and the controller receiver 188 can be connected directly (or indirectly) via a signal wire. This configuration is more practical when the sprinkler 102 is an in-ground sprinkler, and thus the signal wire can be run underground. However, in one variation the signal wire can be integrated into an above-ground conduit (such as a garden hose). An example of such a garden hose is depicted in cross section in FIG. 3B. The garden hose 360 of FIG. 3B is fabricated from rubber (or other elastomeric material) 361, and defines a water conduit 362 and a wire conduit 364. The rubber material 361 prevents water from migrating from the water conduit 362 into the wire conduit 364. The wire conduit 364 can not only house the signal wire from the sprinkler position determiner sensor 138 (FIG. 3), but also electrical power wires (thus eliminating the need for the sprinkler battery 140), as well as other signal wires (e.g., signals from a flow detector sensor). Further, multiple signals can be transmitted on a single signal wire in the wire conduit 364 by multiplexing the signals (e.g., using sprinkler control unit 150). Unlike a traditional garden hose, the garden hose 360 of FIG. 3B can be connected to the main control unit 160 and the sprinkler 102 using a twist-lock fitting (not shown) which places the wires in the wire conduit 364 in electrical contact with electrically conductive terminal contacts (also not shown) in the sprinkler 102 and the main control unit 160. Further, the twist-lock fitting can form a water-tight seal between the water conduit 362 in the hose 120, and the sprinkler water supply inlet fitting 119 (FIG. 3) and the control unit water outlet fitting 119.

In another variation the sprinkler 102 and the main control unit 160 can be placed in signal communication with one another via a wireless system. In this variation the sprinkler transmitter 146 and the control unit transmitter 186 each include a wireless transmitter, and the sprinkler receiver 148 and the control unit receiver 188 each include a wireless receiver. Sprinkler receiver 148 is configured to receive wireless signals S2 transmitted by the control unit transmitter 186, and the control unit receiver 188 is configured to receive wireless signals S1 transmitted by the sprinkler transmitter 146.

In yet a further variation, the sprinkler system 100 of FIG. 3 can be optionally provided with a handheld remote unit 200', as depicted in FIG. 3. The handheld remote unit 200' can receive signals S2 from the control unit 160 and transmit them (as signals S3) to the sprinkler 102, and can also receive signals S1 from the sprinkler 102 and transmit them (as signals S4) to the control unit 160. The handheld remote unit 200' can also include a remote "START" feature 202', a remote "SET" feature 204', and a remote manual flow control adjustment feature (depicted by controls 211' and 212'). These control features (202', 204', 211' and 212') work essentially as per their respective counterpart control features (202, 204, 215 and 216) on the user interface 200 of FIG. 4, described above. The advantage of using the handheld remote 200' is that in the system 100 of FIG. 3 the sprinkler 102 and the main control unit 160 may not always be in line of site of one another. Thus, a user attempting to adjust the flow of water from the sprinkler 102 to an area to be sprinkled may not be able to visually see the area to be sprinkled when the user is at the main control unit 160 (and thus out of site of the area to be sprinkled). Further, if the sprinkler 102 and the main control unit 160 are not in line of site, then the signals S1 and S2 (placing the sprinkler head 102 and the control unit 160 in signal communication) may not be received by receivers 148 and 188. The use of the handled remote unit 200' can thus act as a signal relay station in this case.

While FIG. 3 depicts the main control unit 160 as being separate from the sprinkler 102, in one variation the components within the main control unit (all described above) can be located at or within the sprinkler 102. As may be apparent, such a configuration (i.e., placing the components of main control unit 160 in sprinkler 102) has a drawback that in order to program the controller 184 for the specific area to be sprinkled, the user must be at the sprinkler 102 (unless a handheld remote 200' is used). When the user is physically at the sprinkler 102 during the program mode, the user may be inadvertently sprinkled, or may have to walk in wet lawn, both of which are undesirable from a user standpoint.

Figure 5A:
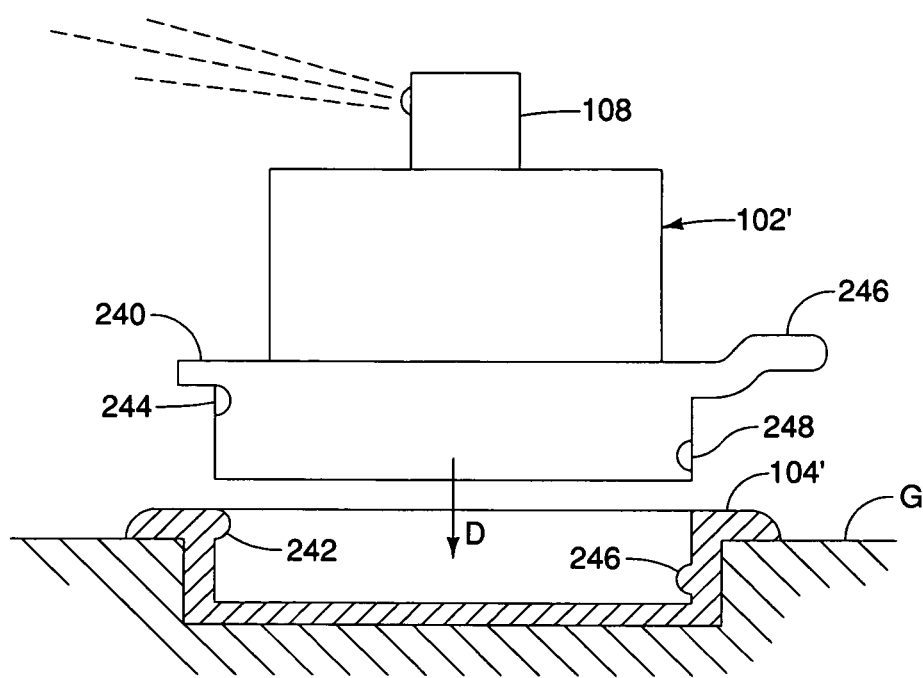
FIG. 5A is a side (partial sectional) view of a sprinkler base mounting system which can be used with a sprinkler head in accordance with the present disclosure.

In FIG. 3 the sprinkler base 104 is depicted as resting on a ground surface "G" which is within or proximate to an area to be sprinkled. When the sprinkler base 104 is freely moveable, then each time the user places the sprinkler 102 on the ground, the sprinkler program will need to be established since the location of the sprinkler within the area to be sprinkled (e.g., sprinkler head 102 in area A2 of FIG. 2) can vary. Further, even if the sprinkler 102 is placed in the same location each time, the orientation of the sprinkler head position determiner 130 may vary (i.e., the user may rotate the sprinkler 102 somewhat, thus providing disorientation between the sprinkler head position determiner 130 and the area to be watered as recorded in a sprinkler program stored in memory 190). In order to address this situation, the sprinkler 102 of FIG. 3 can be provided with an alternative sprinkler base which ensures that the sprinkler 102 is located in the same location, and with the same orientation, within (or proximate to) an area to be sprinkled each time the sprinkler is placed. One example of such an alternative sprinkler base is depicted in a side view in FIG. 5A. The alternative sprinkler base of FIG. 5A is set in the ground "G", and includes a removable sprinkler 102'. The sprinkler base 104' is configured to sit near ground level so that it can be left in place when the sprinkler head 102' is removed, and not present an obstruction to mowing and foot traffic over ground "G". (The sprinkler base 104' can optionally include a spike, not shown, configured to further secure the base into the ground "G".) In this example sprinkler head 102' can include a sprinkler mounting 240 which is received at least partially within the sprinkler base 104' when moved in direction "D". The sprinkler base 104' can include one or more protrusions 242, 246 which are configured to engage counterpart indents 244, 248 in the sprinkler mounting 240. The protrusions 242, 246 and counterpart indents 244, 248 ensure that the sprinkler head 102' is oriented in the same position each time the sprinkler mounting 240 is placed in the base 104'. The sprinkler mounting 240 can also include a handle 246 to assist a user in removing the sprinkler 102' from the keyed base 104'.

Figure 5B:
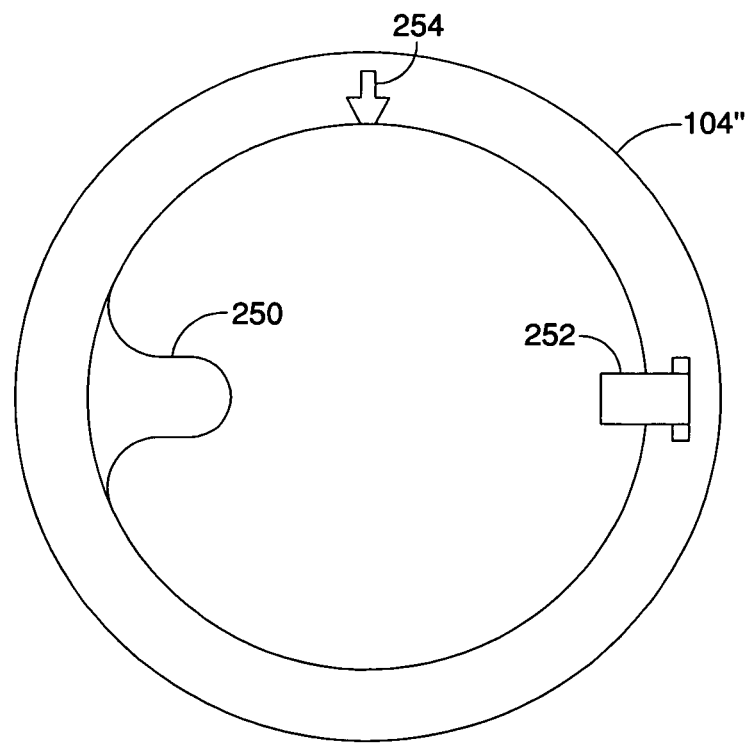
FIG. 5B is a plan view of an optional sprinkler base mount which can be used with a sprinkler head in accordance with the present disclosure.

Another alternative keyed sprinkler base 104" is depicted in plan view in FIG. 5B. In the configuration depicted in FIG. 5B the sprinkler base 104" includes a raised feature 250 in the bottom of the base 104", and in this instance the sprinkler mounting 240 (FIG. 5A) includes a corresponding recess (not shown). The raised feature 250 thus acts as a key for the sprinkler 102'. In order to provide proper orientation of the sprinkler head 102' with respect to the base 104", the user rotates the sprinkler 102' until the raised feature 250 in the sprinkler base 104" fits into the corresponding recessed feature in the sprinkler mounting 240. (It will be appreciated that the locations of the raised feature 250 and the corresponding recess in the mounting 240 can be and reversed between the base 104" and the mounting 240). In the example depicted in FIG. 5B, the sprinkler base 104" can be provided with a releasable locking device 252 to hold the sprinkler 102' in the base 104" during use.

Figure 8:
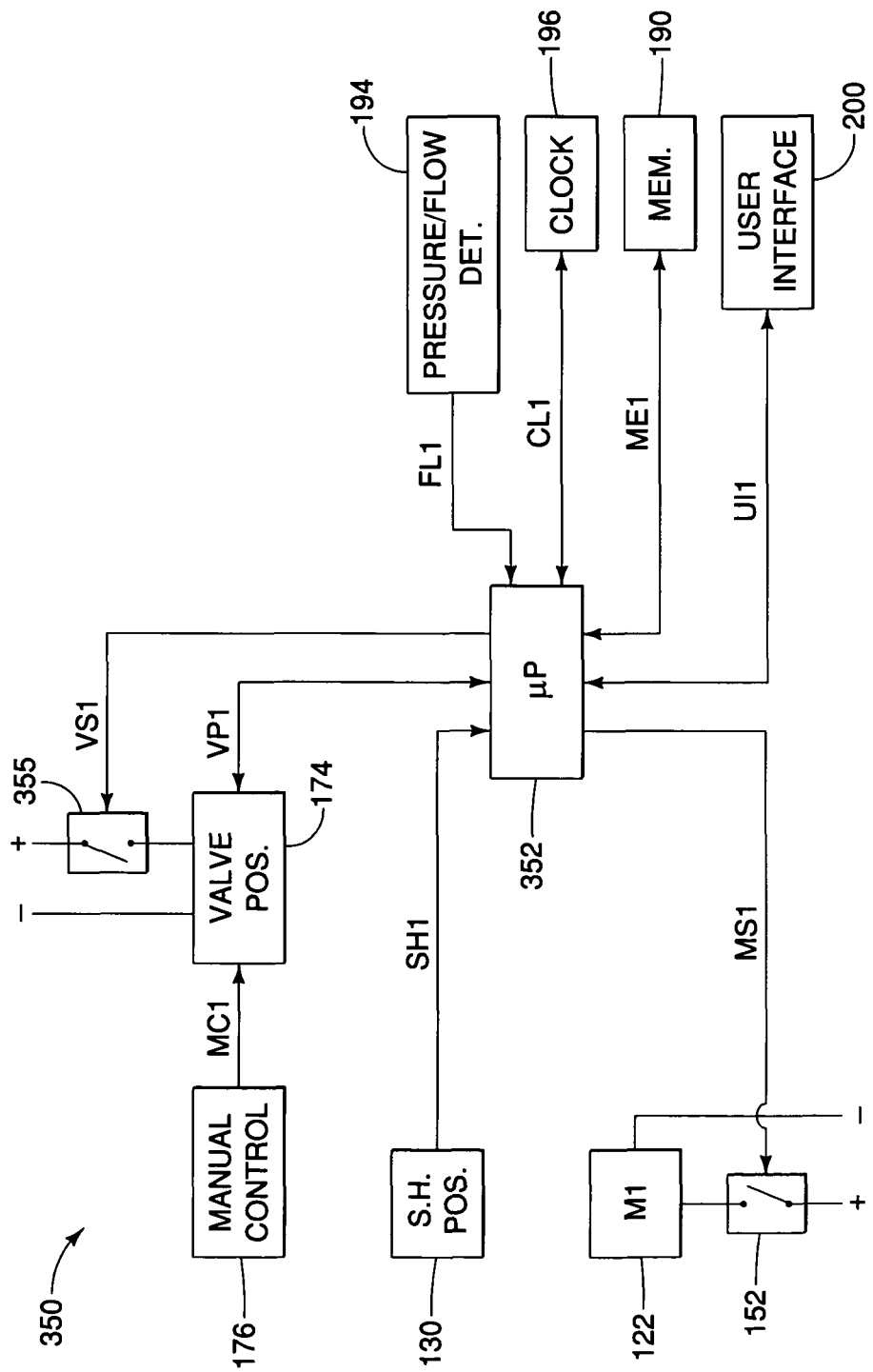
FIG. 8 is a schematic diagram depicting a signal communication schema which can be used for the sprinkler system depicted in FIG. 3.

Turning now to FIG. 8, a schematic diagram depicts one exemplary signal communication schema 350 which can be used for the sprinkler system 100 depicted in FIG. 3. In the example depicted, the sprinkler control unit 150 and the controller 184 of FIG. 3 are depicted as the integrated controller 352 (which is depicted as being a microprocessor). In this example, the following signals can be sent to the controller 352: a sprinkler head position signal SH1 from the sprinkler head position determiner 130; and a flow signal FL1 from the flow detector 194. Further, the following signals can be sent from the controller 352: a sprinkler motor start signal MS1 (to motor starter 152, to send power to sprinkler motor 122); and a control valve positioner start signal VS1 (to the control valve positioner actuator motor, not shown, but located in valve positioner 174). In addition, the following signals can be sent to and from the controller 352: data signals ME1 to be stored in, and read from, memory 190; user instruction signals UI1 from (and user information signals, also UI1 to) the user interface 200; clock signals CL1 from the clock 196 (and, in the case of setting the clock, clock signals CL1 to the clock); and control valve position signals VP1 from the control valve positioner 174 during the program mode, and to the control valve positioner 174 during the run mode. In addition, when the control valve manual positioner 176 is implemented electronically (as for example, using flow feature 214 on user interface 200 of FIG. 4), then the manual positioner 176 can send a manual control valve position signal MC1 to the valve positioner 174. The particular function of each of these signals has been generally described above with respect to their respective component parts, and will now be described further below with respect to exemplary flowcharts describing the operation of the sprinkler system 100 of FIG. 3. In describing the following flowcharts it will be understood that the flowcharts are exemplary only, and that the order of steps can be rearranged, and steps added or removed, all within the spirit of the current disclosure. Accordingly, the flowcharts provided herein are not to be considered as limiting the scope of the current disclosure.

Figure 6A:
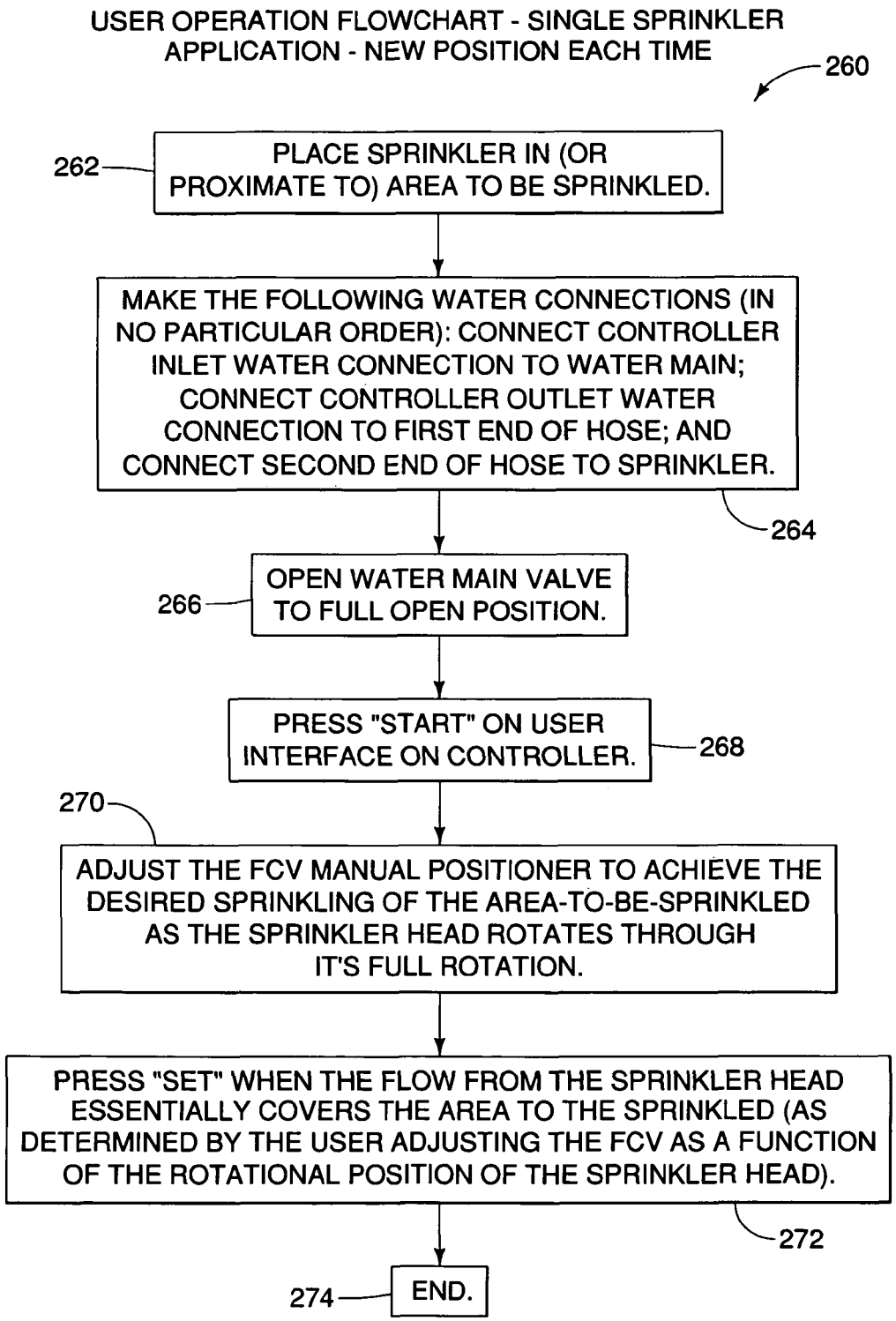
FIG. 6A is a flowchart depicting exemplary user steps for operation of a single sprinkler application of the current disclosure for new position placement of a single sprinkler in accordance with the current disclosure.

With respect to FIG. 6A, a flowchart 260 depicts exemplary user steps for operation of a single sprinkler application of the first embodiment (depicted in FIG. 3) for new position placement of a single sprinkler 102. That is, for the flowchart 260 depicted in FIG. 6A, it is understood that a single sprinkler 102 is in fluid (water flow) and signal communication with the main control unit 160. Thus, the user can place the sprinkler 102 in a new sprinkler location within (or proximate to) an area to be sprinkled, and following each new placement, the steps indicated in flowchart 260 can be performed to program the sprinkler 102 to provide desired irrigation to the area to be sprinkled. Accordingly, the first step 262 is for the user to place the sprinkler 102 (FIG. 3) in (or proximate to) an area to be sprinkled (e.g., area A2 of FIG. 2). In step 264 the user makes the following water connections: controller water inlet connection 168 (FIG. 3) to water main 164; controller water outlet connection 119 to first end of hose 120; and sprinkler water inlet connection 118 to second end of hose 120. The sprinkler 102 and main control unit 160 are now in fluidic communication with one another. In step 266 the user opens the water supply main valve 167 (FIG. 3) to the full open position. In step 268 the user engages the "START" (or "PROGRAM") command on the user interface 200 (respectively, either control 202 or 228 in FIG. 4, or control 202' on the handheld remote 200' of FIG. 3). (Engaging the "start" or "program" command in step 268 places the sprinkler controller 184 (FIG. 3) in a recording or program mode, as will be describe below with respect to FIG. 6B.) In step 270 the user adjusts the flow control valve manual positioner to achieve the desired sprinkling of the area to be watered as the sprinkler head 108 rotates through its full rotation. Adjustment of the flow control valve manual positioner can be performed using either the manual positioner 176 of FIG. 3, via the electronic controls 215 and 216 in the user interface 200 of FIG. 4, or via the control buttons 215' and 216' on the handheld remote 200' of FIG. 3. Once the sprinkler 102 is satisfactorily sprinkling the area to be watered (as determined by the user), then in step 272 the user can enable the "SET" command (204, FIG. 4, or 204', FIG. 3) to set the program (i.e., to store the sprinkler program for the area to be sprinkled into memory 190, FIG. 3). At this point the process ends at step 274, and the sprinkler delivers the desired sprinkling to the area to be watered until the user either closes the main supply valve (164, FIG. 3), engages the "STOP" command (206 on the user interface 200 (FIG. 4), or the sprinkling is performed for a predetermined period of time (as can be established using the timer feature 210 on the user interface 200 of FIG. 4).

With respect to step 270 in FIG. 6A, the adjusting of the manual flow valve positioner can either be performed essentially continuously as the sprinkler head rotates through its full rotation, or alternately, the adjusting can be performed at incremental steps as the sprinkler head rotates through its full rotation. With respect to the latter variation, the user interface 200 can be provided with user controls the allowing the user to move the sprinkler head between incremental positions (e.g., 36 different positions at 10 degree increments), and at each incremental location the user can adjust the flow, then instruct the controller to record the position of the flow control valve positioner 174 for that location. The user interface can also allow the user to increase or decrease the size of the increments for any given segment of the sprinkler head rotation. For example, in areas where there is a considerable difference in flow to be provided over a short arc of sprinkler head rotation, the user may desire to decrease the increments to 2 degrees. Likewise, if there is a large arc of sprinkler head rotation where no change in flow is to be recorded, then the user may elect to increase the increments to 20 degrees. When incremental (versus essentially continuous) programming is used, then the sprinkler system operation can be modified, as described further below.

Figure 6B:
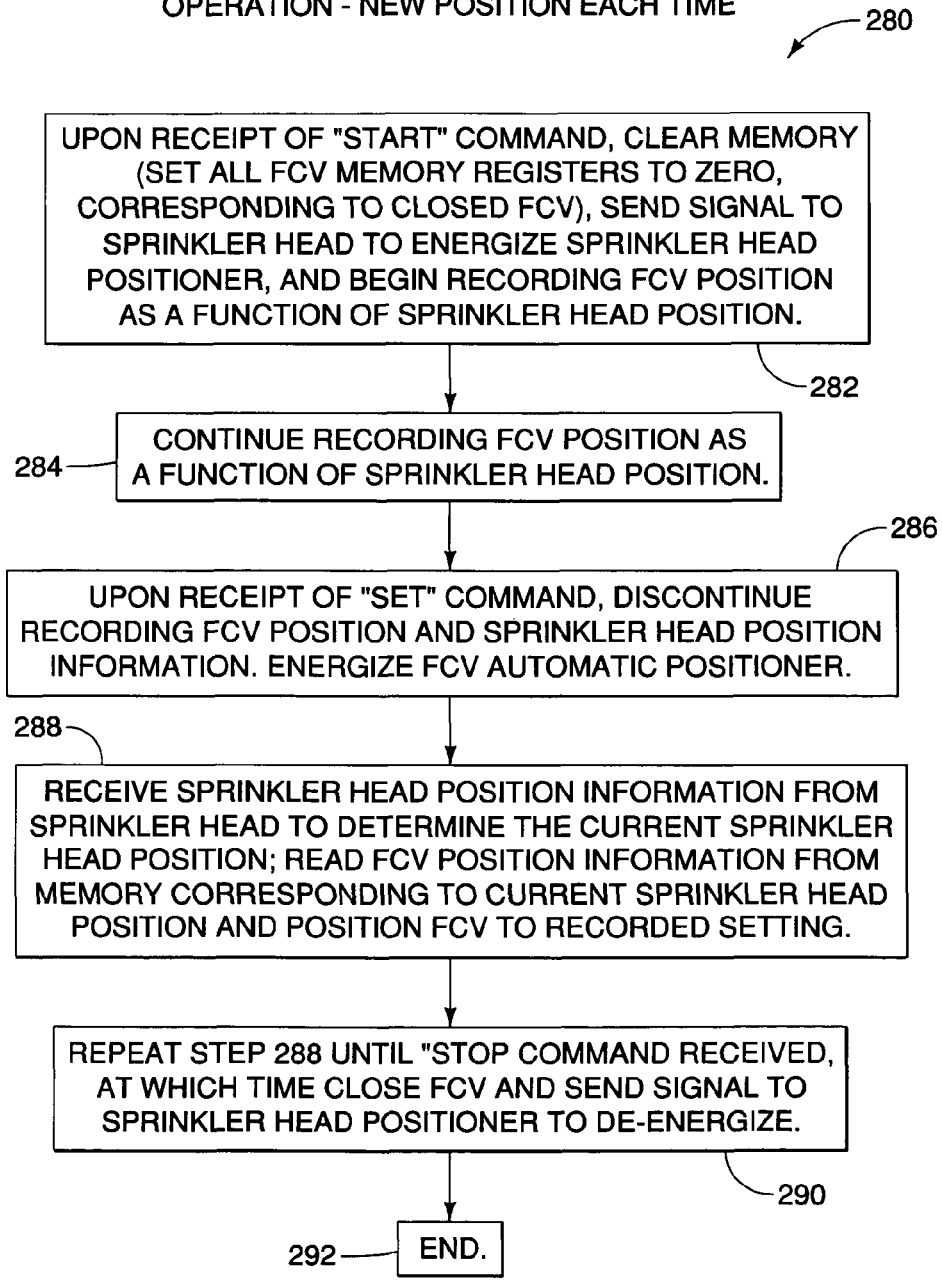
FIG. 6B is a flowchart depicting exemplary system operation steps for a single sprinkler application of the current disclosure for new position placement of a single sprinkler in accordance with the current disclosure, and in general accordance with the user steps depicted in FIG. 6A.

With respect to FIG. 6B, a flowchart 280 depicts exemplary system control steps for operation of a single sprinkler application of the first embodiment (depicted in FIG. 3) for new position placement of a single sprinkler 102, following the exemplary situation described above for the user steps depicted in the flowchart 260 of FIG. 6A. In the flowchart 280 of FIG. 6B, in the first indicated step 282, upon receipt of the "Start" command (e.g., from START control feature 202 of user interface 200 of FIG. 4, via a user interface control signal UI1 in FIG. 8), the controller memory 190 (FIG. 3) is cleared, and all flow control valve memory registers are set to zero (corresponding to a fully closed position of flow control valve 172, FIG. 3). The "Start" command further causes the controller 184 (FIG. 3) to send a motor start signal "MS1 (FIG. 8) to the motor starter relay 152 (FIGS. 3 and 8) to energize the sprinkler head positioner (sprinkler motor 122, FIGS. 3 and 8). The "Start" command can also cause the controller 184 to begin recording (in memory 190, FIG. 3) the then-current position of the flow control valve positioner (174, FIG. 3, and as indicated by valve position signal VP1, FIG. 8) as a function of the then-current sprinkler head position (as determined by the then-current sprinkler head position signal generated by the sprinkler head position determiner 130, FIG. 3, and sprinkler head position signal SH1 of FIG. 8). Flow data from water flow detector 194 can also be recorded at this time. In step 284 of the flowchart 270 (FIG. 6B), the controller 184 (FIG. 3) continues to record (in memory 190) the flow control valve positioner position data (and/or water flow data) as a function of the sprinkler head then-current position, as the user adjusts the flow via the control valve manual positioner 176 (FIG. 3), and as the sprinkler head 108 rotates through its full sweep. Step 284 is essentially the main sprinkler programming step, wherein then-current water flow data (as generally determined by the user-set position of the flow control valve positioner 174, but also can be determined by the water flow detector 194) is recorded in memory 190 along with correlated then-current sprinkler head position data (as determined by the sprinkler head position determiner 130). During the primary program recording step 284 of flowchart 280, then-current water flow data (via water flow signal FL1, FIG. 8) from optional water flow detector 194 (FIG. 3) can also be stored in the memory 190, along with the then-current sprinkler head position data and, optionally, the corresponding then-current control valve positioner data. Once the user is satisfied with the sprinkler programming and has enabled the "SET" commend (at step 272 in flowchart 260 of FIG. 6B), then in step 286 of flowchart 280 (FIG. 6B) the controller 184 (FIG. 3) discontinues recording the then-current control valve positioner data and the then-current sprinkler head position data. (For any sprinkler head positions for which corresponding control valve position data has not been recorded, the default values for the flow control valve positioner can be set at zero, corresponding to a closed position for the flow control valve 172.) Further in step 286, the "SET" command can cause the sprinkler controller 184 to then automatically enter a "run-program" (or "run") mode. In this instance the controller 184 sends a valve positioner start signal VS1 (FIG. 8) to the control valve positioner solenoid 355 (FIG. 8) to engage the control valve positioner actuator (motor). That is, prior to this time, and during the program recording mode (step 284), the control valve positioner actuator (not specifically shown, but part of the control valve positioner 174) can be de-energized via solenoid 355 in order to avoid conflicts which might arise between an energized actuator and the manual positioner 174.

In step 288 of the flowchart 280 (FIG. 6B), the system controller 184 enters the run mode (in order to run the program recorded at step 284). Specifically, in step 288 the controller 184 (FIG. 3) receives the then-current sprinkler head position information from the sprinkler head position determiner 130 (as signal SH1, FIG. 8) to determine the then-current sprinkler head position, and reads the corresponding flow control valve position information from memory (190, FIG. 3) corresponding to that then-current sprinkler head position. The controller 184 then adjusts the flow control valve positioner 174 (via signal VP1, FIG. 8) in order to achieve the desired flow corresponding to the then-current sprinkler head position. Also at step 288, if initial corresponding water flow data has been recorded from the flow detector 194 (FIGS. 3 and 8) during the program recording step 284 (as describe above), then this flow data can be used to correct the flow valve positioner signal VP1 (based on a then-current flow data signal FL1 received from the flow detector sensor 194) in order to achieve the water flow recorded during the program step 284.

In step 290 of the flowchart 280 (FIG. 6B) step 288 (i.e., the run mode) is repeated until either a "stop" command is received, the main water supply valve is closed, or a timer setting is exhausted (as described above with respect to user step 274 of flowchart 260 in FIG. 6A). At this point the flow control valve 172 is automatically closed (using control valve positioner 174), and a motor signal MS1 is sent to the sprinkler motor solenoid 152 (FIGS. 3 and 8) to de-energize the sprinkler motor 122. Also at this time, a signal VS1 (FIG. 8) can be sent to the control valve positioner 174 (FIG. 3) to de-energize the control valve positioner actuator. The control process is then terminated at step 292.

Figure 7A:
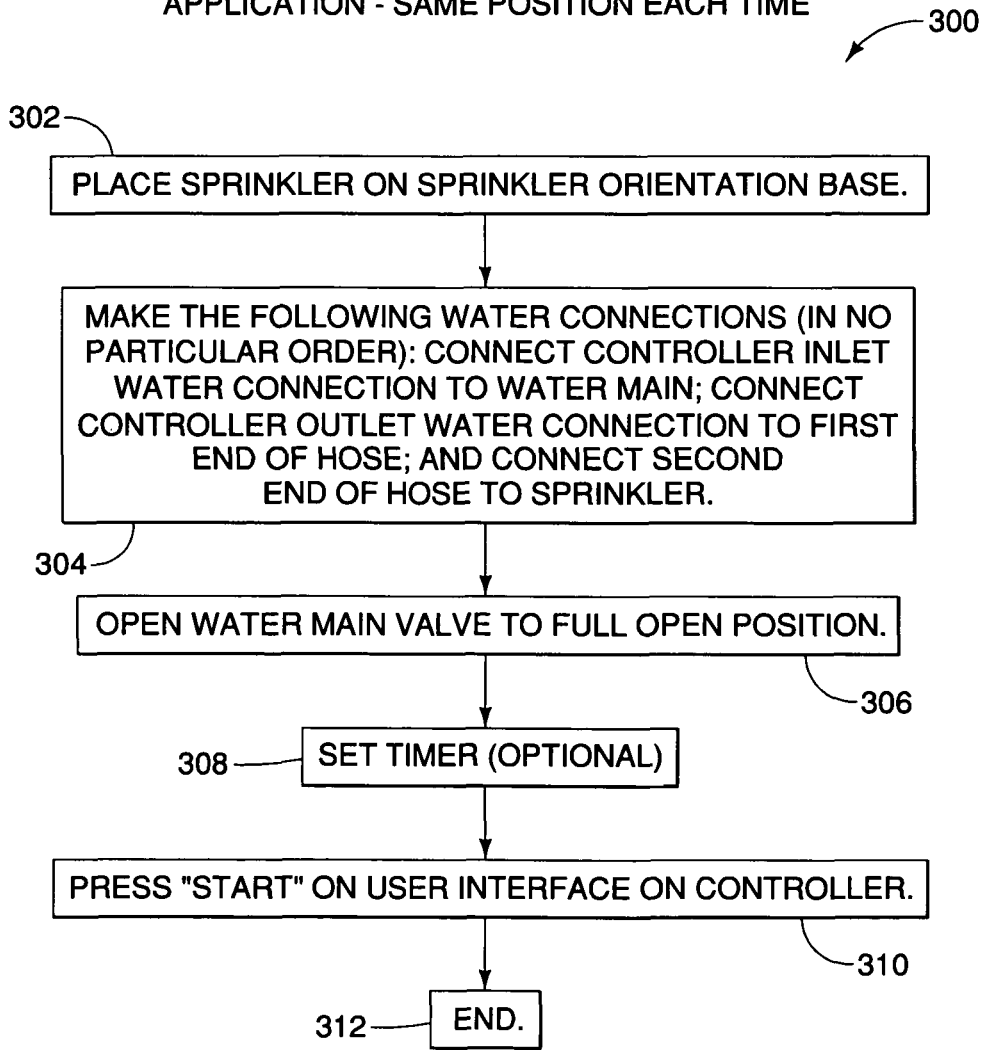
FIG. 7A is a flowchart depicting exemplary user steps for operation of a single sprinkler application of the current disclosure for same-position placement of a single sprinkler in accordance with the current disclosure.

Turning now to FIG. 7A, a flowchart 300 depicts exemplary user operation steps which can be used with the sprinkler system 100 of FIG. 3 when the sprinkler 102 is placed in the same position (and with the same orientation for the sprinkler head position determiner 130) for each use. That is, flowchart 300 assumes that a particular sprinkler program has already been set and recorded per steps 270 and 272 of the flowchart 260 of FIG. 6B. In this instance, in step 302 of the flowchart 300 (FIG. 7A), the sprinkler 102 (FIG. 3) is placed on a sprinkler orientation pad (e.g., sprinkler orienting base 104' of FIG. 5A, or sprinkler orienting base 104" of FIG. 5B). Then in step 304 the water connections are made between the sprinkler and the water main (in the same manner as described above for step 264 of flowchart 260, FIG. 6A), and at step 306 the main water supply valve 167 (FIG. 3) is opened to the full position. At step 308 (FIG. 7A) the user can optionally set a timer (e.g., using the timer control feature 210 in the user interface 200 of FIG. 4), and at step 310 the user engages the "START" command feature (202, FIG. 4) on the user interface 200. Watering of the area to be sprinkled will then proceed.

As described above with respect to step 270 of FIG. 6A, adjusting of the manual flow valve positioner can either be performed essentially continuously as the sprinkler head rotates through its full rotation, or alternately, the adjusting can be performed at incremental steps. When the adjusting is performed essentially continuously, then at step 284 of FIG. 6B the control valve position information is recorded for at least each discrete and identifiable sprinkler head position which can be detected by the sprinkler head position determiner 130. However, when programming is performed in discrete increments of sprinkler head rotation (e.g., every 10 degrees), then at step 284 the control valve position information is recorded for each discrete incremental position as selected by the user. In this latter variation, after the sprinkling program has been entered by the user, and at step 272, the controller 200 can execute an interpolation program to estimate flow control valve positions between the incremental segments. Without limitation, the interpolation can be linear or differential (i.e., based on the rate of change between 3 or more positions).

Figure 7B:
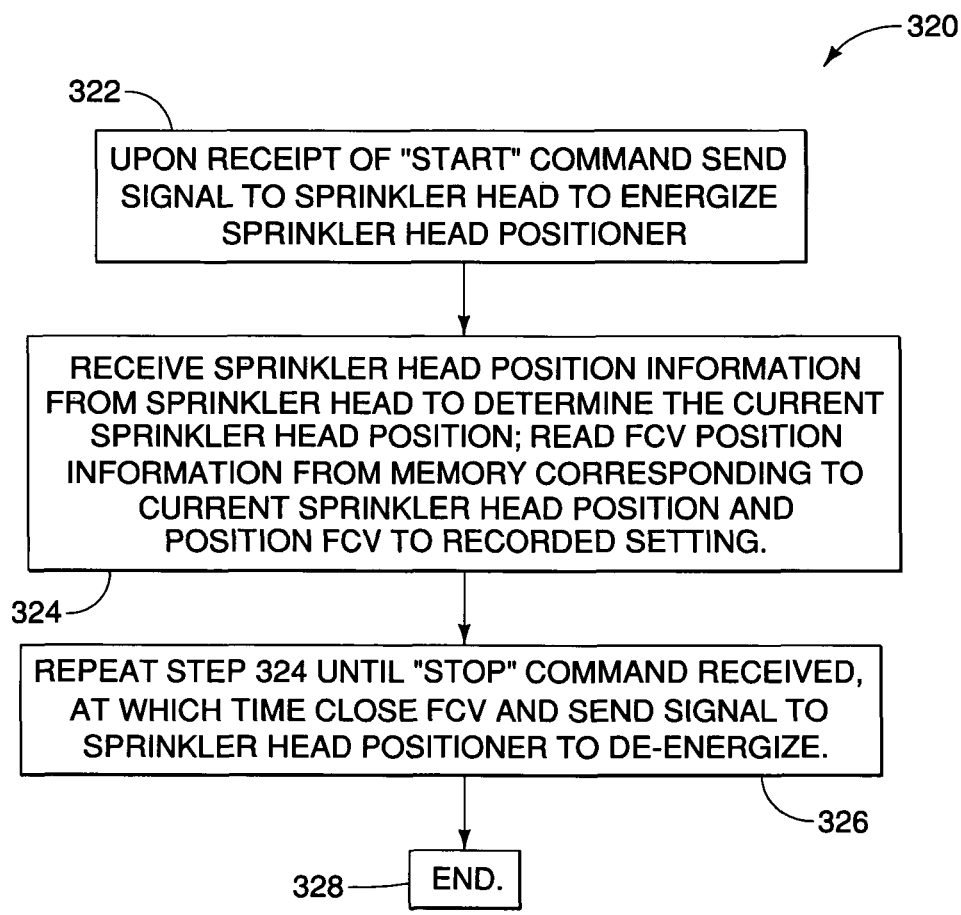
FIG. 7B is a flowchart depicting exemplary system operation steps for a single sprinkler application of the current disclosure for same-position placement of a single sprinkler in accordance with the current disclosure, and in general accordance with the user steps depicted in FIG. 7A.

FIG. 7B is a flowchart 320 depicting exemplary system operation steps which can be performed by the sprinkler system controller 184 for operation of a single sprinkler application of the first embodiment (depicted in FIG. 3) for same-position placement of a single sprinkler 102, following the exemplary situation described above for the user steps depicted in the flowchart 300 of FIG. 7A. The flowchart 320 of FIG. 7B assumes that a sprinkler program has already been recorded according to steps 282 and 284 of the flowchart 280 (FIG. 6B), as described above. Thus, in step 322 of the flowchart 320 (FIG. 7B), upon receipt of a "START" command (e.g., via "START" feature 202 on user interface 200 of FIG. 4), the controller 184 (FIG. 3) sends signal MS1 (FIG. 8) to the sprinkler head motor starter solenoid 152 (FIGS. 3 and 8) to energize the sprinkler head positioner (sprinkler motor 122, FIGS. 3 and 8). Then, in step 324 the controller 184 performs the same steps as described above with respect to step 288 of FIG. 6B (i.e., receiving the then-current sprinkler head position information from the sprinkler position determiner 130, reading the associated flow control valve positioner data from the memory 190, and positioning the flow control valve controller 174 to the corresponding recorded setting). Then, in step 326 of flowchart 320, the program is repeated until the controller 184 is signaled to stop running the program (in essentially the same manner as described above for step 290 of flowchart 280, FIG. 6B). The process then ends at step 328.

Thus, according to flowcharts 300 and 320 (FIGS. 7A and 7B, respectively), once a sprinkling program has been established for a particular area to be sprinkled (and stored in memory 190, FIG. 3), thereafter all the user needs to do in order to sprinkle this area time-and-time again is to place the sprinkler 102 on the orienting sprinkler base 104' of FIG. 5A (or 104", FIG. 5B), make the necessary water connections, and press "START". The sprinkler controller 184 will then read the sprinkler program from the memory 190, and will perform the desired sprinkling of the area until the program is terminated by the user or by a timer.

In one variation on the sprinkler control disclosure provided above, the manual control valve positioner 176 can be eliminated, and the user can manually determine the flow of water to the area to be sprinkled (during the program mode) using the main water supply valve 167. In this variation, the sprinkler system 100 is provided with the water flow detector 194 (described above), and the user operation of the system (and the subsequent system operation), as respectively described in the flowcharts 260 and 280 of respective FIGS. 6A and 6B, will vary. Specifically, in the user operation described in flowchart 260 (FIG. 6A), in step 270 the user adjusts the main water supply valve (167, FIG. 3) in order to achieve the desired flow. Following step 272 (which sets, or records, the sprinkling program), the user opens the main water supply valve to the full open position, and the program is run. Further, in step 284 of flowchart 280 (FIG. 6B), rather than recording flow valve positioner information as a function of sprinkler head position, water flow data (e.g., signal FL1, FIG. 8) from flow detector 194 is recorded as a function of sprinkler head position, and then in step 288 (i.e., the run mode) the flow control valve positioner 174 is set to establish the desired (and recorded) flow as a function of the then-current sprinkler head position.

As may be evident from the above disclosure, during the program mode (e.g., step 284 of flowchart 280, FIG. 6B) the controller 184 will record the then-current position of the flow control valve positioner (174, FIG. 3) (and/or the then-current water flow signal in the case of a water flow detector 194 being employed) as a function of the then-current sprinkler head position (as determined by sprinkler head position determined 130). However, since the sprinkler head position determined 130 will typically include a plurality of discrete sprinkler head position indicator sensors (e.g., the 25 discrete contact points 256 indicated in the plan view of the rotary encoder base 134 of FIG. 3A), and each discrete sprinkler head position indicator sensor (e.g., contact point 256) covers a predetermined span (12.4 degrees, in the given example), then this raises the question of exactly what associated flow control valve positioner data (and/or volumetric water flow data in the case of a water flow detector 194 being used) will be recorded for each given discrete sprinkler head position indicator sensor? That is, assuming that the user will be able to variably adjust the flow (using the manual control flow valve positioner 176, FIG. 3) during the time in which the encoder contact 131 travels over a contact point 256 (FIG. 3A), then typically the recorded control valve position (or water flow signal) associated with the specific contact point 256 will be the last recorded control valve position. Thus, for example, if the sprinkler motor 122 (FIG. 3) is configured to rotate the sprinkler head 108 through an arc of 360 degrees in one minute (i.e., one revolution per minute), and the span between the beginning of adjacent contact points 256 is 14.4 degrees (following the example set forth in FIG. 3A), then the elapsed time for the encoder contact 131 (FIG. 3) to move over an entire contact point 256, and the adjacent spacer 257, will be 2.4 seconds. As can be appreciated, during this 2.4 second interval a user can potentially make considerable adjustments to the manual control valve positioner 176 (FIG. 3). And if the last recorded control valve positioner data) and/or water flow data) is used for the entire 14.4 degree arc segment, then this may not be representative of the entire segment. Accordingly, it is desirable to offer a control logic program in controller 184 to address this situation. That is, since position determiners (such as sprinkler head position determiner 130) are generally discrete in nature (and thus cannot make not make infinitely fine distinctions between one position and another), and the cost of discrete positioner determiners increases exponentially as does the number of discrete positions available for detection, it is desirable to supplement the controller 184 for the sprinkler system 100 with a routine (or program) which can take into account the undesirable effects introduced by a discrete position determiner (e.g., position determiner 130, FIG. 3) having a limited number of position determiner contacts 256 (FIG. 3A).

In order to address the situation described immediately above, in one variation the controller 184 can be provided with information regarding the travel rate of the encoder contact 131 over the encoder base 134 (and more specifically, the travel rate, in degrees per second, over each contact point 256 and adjacent spacer 257). In this case the controller 184 will be able to determine approximately where on each given contact point 256 the encoder contact 131 is located, and the controller 184 can then record control valve positioner information (and/or water flow information) not only as a function at the then-current contact point, but also as a function of the approximate position of the encoder contact on a specific contact point (and an adjacent spacer 257). For example, if it takes 2.4 seconds for the encoder contact 131 to traverse an entire contact point 256 and an adjacent spacer 257, then the controller 184 can record various control valve positioner data (and/or water flow data) every 0.2 seconds (for approximately 12 different potential recorded control valve positioner settings over each 14.4 degree arc) during the elapsed 2.4 second interval. These 12 recorded control valve positioner settings (or water flow data values) can then be used (in the run mode) to variably adjust the control valve positioner over the 2.4 second interval for an associated contact point 256.

In another variation in order to address the situation described above, a clock timer (e.g., via clock 196, FIG. 3) can be started each time the encoder contact 131 initially contacts a contact point 256, and can be stopped once the encoder contact moves out of contact with the contact point. During this timed event, various control valve positioner data (and/or water flow data) can be periodically recorded (e.g., every 0.2 seconds). The controller 184 can then average the control valve positioner data (and/or water flow data) for the segment associated with a particular contact point 256, and use the average setting (or flow value) as the control valve positioner setting (or flow value) for the particular segment defined by the contact point 256 and its adjacent spacer 257.

As can be appreciated from the above disclosure, other control logic routines which can be performed by controller 184 can be implemented to reduce the effects of a discrete sprinkler head positioner determiner 130 (as described above). This ability to programmably provide finer control of the control valve positioner 174 between adjacent discrete sprinkler head position determiner contacts 256 further distinguishes the system disclosed herein over the prior art.

When accurate sprinkling along a perimeter is desired, then it is preferable to provide the sprinkler nozzle 110 with a less diffuse spray. The less diffuse spray reduces wind drift of water towards the periphery of the area being sprinkled. However, the less diffuse spray nozzle typically results in areas between the sprinkler 102 and the periphery receiving less that the ideal or desired amount of water (i.e., water will tend to be concentrated towards the peripheral areas). In order to address this problem the program can be provided with an option to allow the user to select an enhanced watering coverage feature. For convenience, we will refer to this feature as a "paint" feature. When selected, the "paint" feature (which is intended to be used in conjunction with a nozzle 110 having a non-diffuse spray pattern) can pause the rotation of the sprinkler head 108 at each position and then decrease the flow from the flow quantity set for that position (i.e., flow intended to reach the periphery) to zero (or near zero) flow, and then increase the flow again to the flow quantity set for that position. That is, the main controller 184 causes the control valve 172 to cycle between the full-flow quantity established for that sprinkler head position to a reduced flow, and then back up again to the full flow (for that position), thus causing water from the nozzle 110 to "paint" the area between the sprinkler 102 and the periphery with water. After "painting" of a segment is complete, the motor 121 then advances the sprinkler head 108 to the next segment to be watered. Thus, the sprinkler system 100 can be provided with at least two different spray nozzles (110) so that during initial installation a user can select a nozzle best suited for the installation at hand. If a nozzle having a less diffuse spray pattern is selected, then the user can select as an option, during the program mode, to use the "paint" feature.

As suggested above, the sprinkler system 100 can be provided with plurality of different spray nozzles (110) so that during initial installation a user can select a nozzle best suited for the installation at hand. The nozzles 110 can be threaded to fit within a complimentary threaded end of the sprinkler head conduit 112. Such a configuration can be particularly beneficial when the sprinkler system is implemented as a plurality of fixed sprinklers 102 (as described below with respect to the second embodiment). In this way during initial set-up of the sprinkler system the user can configure each sprinkler 102 within the overall system with the nozzle 110 best suited for the particular sprinkler within its region to be irrigated. For example, if the region to be irrigated by a first sprinkler 102 is intended to cover an area not exceeding 10 feet at the greatest extent (i.e., 10 feet from the sprinkler 102 to the outermost periphery), then a spray nozzle 110 having a relatively diffuse pattern might be employed since the average affect of wind drift on the water being discharged from the nozzle will not result in a significant dispersal of water beyond the periphery. On the other hand, if the region to be irrigated by a second sprinkler 102 is intended to cover an area having a periphery extending to 20 feet from the sprinkler, the a spray nozzle 110 having a relatively concentrated spray might be employed to reduce wind drift at the periphery (in which case the "painting" option described above can be implemented to improve coverage of the area between the sprinkler and the periphery). Nozzles 110 having different types of spray patterns (e.g., horizontal fan spray, vertical fan spray, and cone spray, to mention only a few) can be made available for use with the sprinkler 102.

Figure 15:
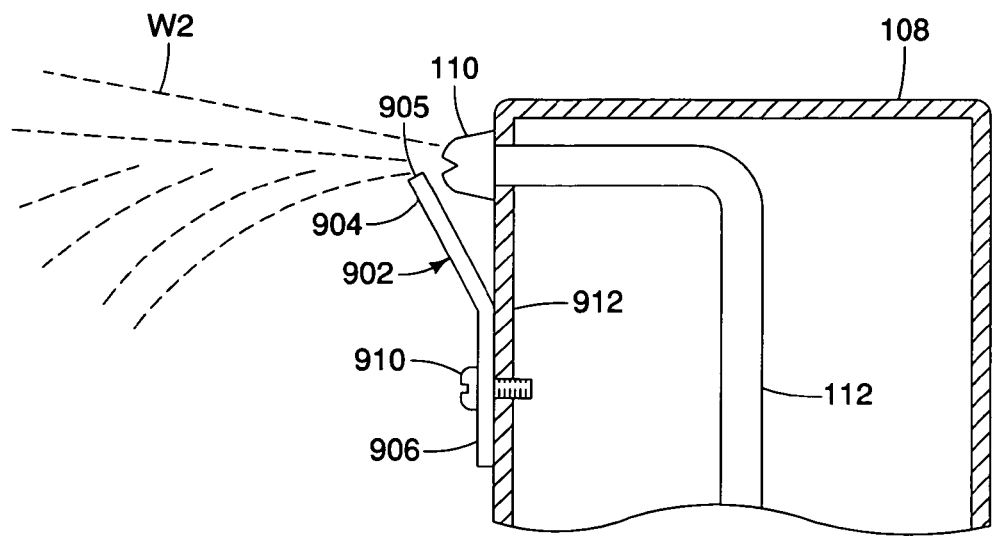
FIG. 15 is a side view of a sprinkler head having a positionable diffuser attached thereto and proximate a water discharge nozzle in accordance with the current disclosure.
Figure 15A:
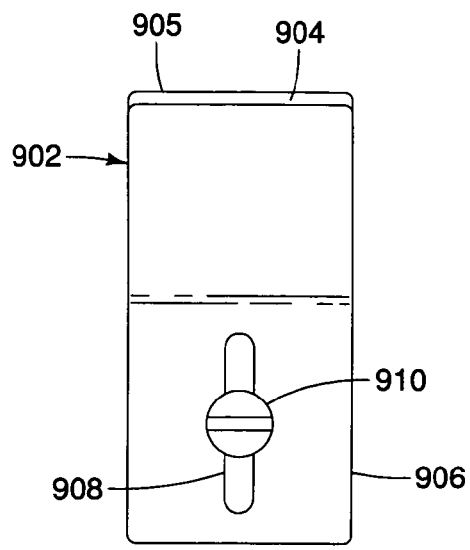
FIG. 15A is a front view of the positionable diffuser of FIG. 15.

In yet a further variation, the sprinkler 102 can be provided with a spray diffuser positioned in front of the nozzle 110 in order to allow the user to adjust the spray pattern emanating from the nozzle without the need to replace the nozzle (as per the discussion immediately above). Such a configuration is depicted in FIG. 15. FIG. 15 is a side view of the sprinkler head 108 showing the nozzle 110 and the sprinkler head conduit 112. A positionable spray diffuser 902 is secured to the body 912 of the sprinkler head 108 by a set screw 910. The positionable spray diffuser 902 includes an upper portion 904 angled away from the sprinkler head body 912, and which can interfere with spray W2 emanating from nozzle 110. The positionable spray diffuser 902 also includes a lower portion 906 which fits against the sprinkler head body 912. Turning briefly to FIG. 15A, a front view of the positionable spray diffuser 902 shows that the lower portion 906 of the positionable spray diffuser defines a slot 908. As can be appreciated by the figures, by loosening set screw 910 the positionable spray diffuser 902 can be moved upward and downward, and thus into and out of the spray pattern W2 emanating from nozzle 110. As can also be further appreciated by a comparison of FIGS. 3 and 15, the spray pattern W of FIG. 3 is dispersed to the spray pattern W2 of FIG. 15 when the upper edge 905 of the angled portion 904 of the diffuser 902 is positioned to intercept flow emanating from the nozzle 110. Accordingly, a user can adjust the position of the spray diffuser 902 by using the set screw 910 in order to achieve a desired spray pattern without the need to replace the spray nozzle 110 with a different nozzle.

Figure 17:
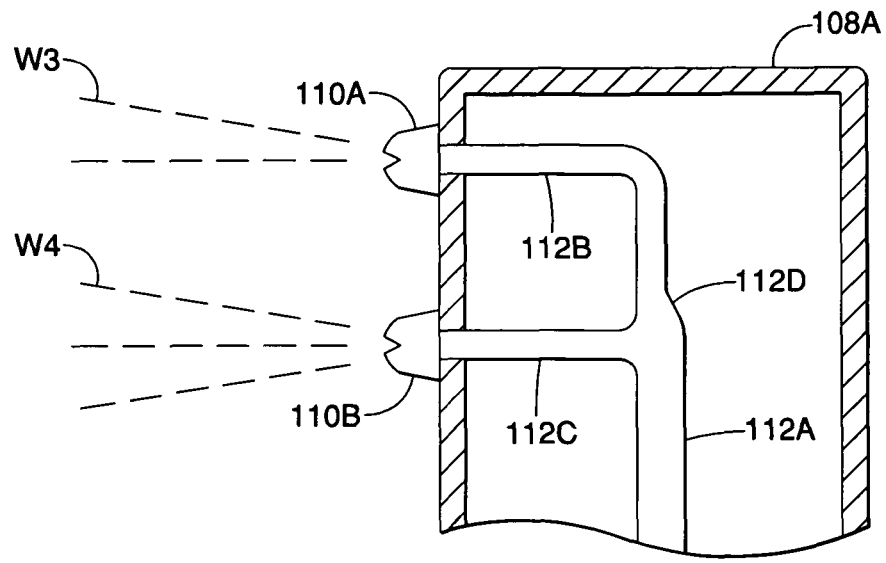
FIG. 17 is a side view of another alternate sprinkler head deployment device that can be used with sprinklers in accordance with the present disclosure.

An alternative sprinkler head 108A is depicted in side view in FIG. 17. The sprinkler head 108A of FIG. 17 includes a first nozzle 110A, and a second nozzle 110B. Nozzles 110A and 110B are fed water by sprinkler head conduit 112A. Sprinkler head conduit 112A can include a first sub-conduit 112B which provides water to nozzle 110A, and a second sub-conduit 112C which provides water to nozzle 110B. Sprinkler head conduit 112A can further include a conduit reducer (or flow restrictor) 112D placed between the first and second sub-conduits 112B and 112C in order to regulate a predetermined flow of water from sprinkler head conduit 112A to sub-conduits 112B and 112C. Nozzle 110A can be configured to provide a relatively constrained stream of water W3, while nozzle 110B can be configured to provide a relatively dispersed stream of water W4. In this way nozzle 110A can provide the stream of water W3 which can essentially trace along a perimeter portion of an area to be watered (e.g., perimeter line "PL2" of FIG. 1C), while nozzle 110B can provide a relatively dispersed stream of water in the area between that covered by nozzle 110A and the sprinkler head 108A. This configuration (i.e., of providing two nozzles 110A and 110B) allows for more concise watering along a perimeter (and thus, less water wasted as a result of overspraying the perimeter), while still providing water in the area between the perimeter and the sprinkler head. Perimeter areas (i.e., bordering areas intended for irrigation) are more prone to drying than are areas away from the perimeter due to: (i) water runoff onto non-absorbent areas outside of the perimeter (e.g., concrete areas outside of the perimeter); (ii) wicking of water from the perimeter into areas not indented to be irrigated outside of the perimeter; and (iii) wind drift. By providing a first nozzle 110A with a spray pattern intended to provide an essentially concentrated water spray W3 along the perimeter, the foregoing effects can be greatly ameliorated. Furthermore, by providing a second nozzle 110B with a spray pattern W4 intended to provide an essentially dispersed spray of water between the area covered by the first nozzle 110A and the sprinkler head itself (108A), the entire area between the sprinkler head 108A and the perimeter (e.g., PL2, FIG. 1C) can be provided with a generally even distribution of water. Further, nozzles 110A and 110B can be adjustable nozzles (e.g., by applying threaded nozzle fittings over threaded counterpart extensions to subconduits 112B and 112C) in order to allow a user to configure the spray emanating from nozzles 110A and 110B to suit a particular given installation for the sprinkler head 108A.

In a further variation the sprinkler head positioner (e.g., 121, FIG. 3) can be a two-speed positioner, having a first speed and a second speed which is higher than the first speed. The sprinkler head positioner can be configured to operate at the second (higher) speed when the sprinkler head is transitioning segments where no watering is to be applied within the potential sprinkling area that can be sprinkled by the sprinkler. In this way the sprinkler head (e.g., 108, FIG. 3) can more rapidly apply water to the area to be sprinkled by quickly moving past areas (arc segments) where no watering is to be applied. For example, in FIG. 9 the arc segments 330 and 332 are not to be watered. It is thus advantageous to quickly move the sprinkler head 108 past these segments so that watering can resume in the adjacent segments (e.g., segments 342 and 344). In one exemplary implementation of this variant, the sprinkler motor 122 of FIG. 3 can be a two-speed motor, and the sprinkler motor can be switched between the first and second speeds by the sprinkler control unit 150. For example, the sprinkler control unit 150 can increase voltage, or amperage, to the sprinkler motor 122 to cause it to move at the second, faster speed. In another example, the sprinkler motor 122 can be provided with a two-speed gearbox (not shown), and the sprinkler control unit 150 can switch the gearbox between the two different speeds. Further, the main sprinkler controller 184 can be provided with a sprinkler head positioner speed subroutine (or program), such that once a user sets a desired sprinkling program (e.g., using the SET function 204 for the user interface 200 of FIG. 4), the sprinkler head positioner speed subroutine is run. This subroutine will cause the controller 184 to review the recorded data for the sprinkler program and to identify any arc segments for which no sprinkling is to be applied. For any such identified segment, the controller 184 will assign the second (or higher) sprinkler head position determiner speed to that segment. This sprinkler head positioner speed data can then be stored in the memory 190. Then, as the sprinkler program is performed in the run mode, the controller 184 will read from the memory 190 (for any then-current sprinkler head position) not only associated control valve positioner data, but also sprinkler head positioner speed data. The controller 184 can then instruct the sprinkler control unit 150 to increase the speed of the sprinkler motor 122 for those positions where no sprinkling is to be provided.

When the sprinkler head positioner (e.g., 121, FIG. 3) is provided as a two-speed positioner (as described above), then the program mode can be provided with the option to allow the user to select either the slower first speed for a segment to be watered, or the second higher speed. For example, the low-speed option can be selected for sunny areas (i.e., where more water is desired), and the high-speed option can be selected for shady areas (i.e., where less water is desired). This feature can be used in conjunction with the programming-by-incremental-segment feature described above, such that, prior to moving to the next segment to be programmed, the user can select the sprinkler head speed to be used for that segment. The sprinkler head speed can remain the same for subsequent segments until the user selects a different sprinkler head speed to be used.

In yet a further variation, the sprinkler system 100 of FIG. 3 can be provided with a sprinkler head direction reversing program in order to reverse the direction of travel of the sprinkler head (e.g., sprinkler head 108) when large areas of non-sprinkling (within the potential area of sprinkling) are encountered. For example, if there is a contiguous arc of 85 degrees or more within a 360 degree total span which can be covered by the sprinkler head, then it can be desirable to reverse the direction of travel of the sprinkler head when this arc is reached, rather than traverse the arc and provide no watering (sprinkling) during the time it takes for the sprinkler head to traverse this arc. By reversing the direction of travel of the sprinkler head when reaching a relatively large arc of no-watering, the time expended to water (sprinkle) the area to be watered can be reduced (as compared to traversing the relatively large arc of no-watering for each rotation of the sprinkler head). One exemplary sprinkler head direction reversing program is depicted in the flowchart 370 of FIG. 10. The flowchart 370 of FIG. 10 includes a step (step 384) to further incorporate the two-speed sprinkler head positioner variation described above. However, it will be appreciated that the sprinkler head direction reversing program depicted by the flowchart 370 can also be implemented without step 384.

With respect to the flowchart 370 of FIG. 10, the sprinkler head reversing program is initiated at step 372 when a user enters a "set" or "start" command following entry of a sprinkling program (as exemplarily set forth above in the flowchart 260 of FIG. 6A, and specifically at step 272). In step 372 (FIG. 10), upon receipt of the "start" command (or an equivalent command), the main controller 184 (FIG. 3) reviews the flow data stored in the memory 190 for the given sprinkling program and identifies any segments (or arcs of potential sprinkler head coverage) for which flow is set to zero. At step 374, if no segments of zero flow are identified in step 372, then the sprinkler head reversing program terminates at step 376. However, if at 374 it is determined that segments of zero flow have been identified in step 372, then at step 378 the controller identifies the largest such segment where flow is set to zero. Then, at step 380, the controller 184 determines if the largest such identified segment of zero flow is greater than 85 degrees. (It will be appreciated that the indicated value of 85 degrees in step 380 is somewhat arbitrary, and that greater or lesser values can be used as the threshold for determining that the sprinkler head positioner should be reversed.)

In the example depicted in FIG. 10, if at step 380 it is determined that the largest identified segment of zero flow is not greater than 85 degrees, then the controller 184 proceeds to step 384, which implements the two-speed sprinkler head positioner variation described above. (If step 384, i.e., the two-speed sprinkler head positioner variation, is not provided for, then the "No" determination at step 380 directs the controller 184 to proceed to the "End" step 376—i.e., if no segment of zero flow (or sprinkling) is identified at step 380 which reaches the criteria for reversing the direction of the sprinkler head positioner, then the sprinkler head reversing program will terminate without providing for any sprinkler head reversing.) However, assuming that the two-speed sprinkler head positioner variation is allowed for (in conjunction with the sprinkler head direction reversing program), then at step 384 for each identified segment of zero flow less which is less than 85 degrees, the controller 184 will perform the following steps: (i) determine the initial and final sprinkler head position data associated with the identified segment of zero flow; and (ii) generate an instruction (i.e., a program step, to be stored as part of the run-mode program) to increase the speed of the sprinkler head positioner between the determined initial and final sprinkler head position data associated with each such identified segment of zero flow.

Returning to step 380 of flowchart 370, if it is determined that the largest segment of zero flow is greater than 85 degrees (or whatever the threshold value of the arc is selected to be), then the controller 184 (FIG. 3) proceeds to step 382. At step 382, for the largest identified segment which is greater than 85 degrees, the controller 184 will identify the initial and final sprinkler head position data associated with the selected segment. The controller 184 can then generate instructions to reverse the direction of the sprinkler head positioner when the then-current sprinkler head position is either the initial or the final sprinkler head position for that largest segment which is greater than 85 degrees. Also, the controller can generate an instruction to reverse the order for reading the sprinkler head position data (and the corresponding flow valve positioner data) from the memory 190 upon receipt of an instruction to reverse the direction of the sprinkler head positioner. Thereafter, the controller 184 ends the programming process at step 376.

Second Embodiment: Multiple Sprinklers Controllable for Area-programmable Coverage of Area (or Areas) to be Sprinkled.

The second embodiment provides for a sprinkler system having a plurality of sprinklers which can all be controlled by a single controller in order to provide area-programmable sprinkling to one or more areas to be sprinkled. A typically application of this second embodiment is an in-ground sprinkler system, such that the sprinklers are located in constant, fixed positions. In this second embodiment the area to be sprinkled can be a single contiguous area which requires two or more watering stations (i.e., sprinklers) in order to cover the entire area (as may be required due to water supply pressure constraints), or two or more separate areas which each require at least one watering station (sprinkler) for each area.

The general configuration of a sprinkler system in accordance with the second embodiment includes a plurality of sprinkler heads, each sprinkler head adapted to move between a first sprinkler head position and a second sprinkler head position to thereby apply water to the area desired to be sprinkled. Each sprinkler head in the system includes a water discharge nozzle (e.g., discharge nozzle 110 of FIG. 3), a sprinkler head positioner adapted to move the sprinkler head between the first and second sprinkler head positions (e.g., sprinkler head positioner 121 of FIG. 3), and a sprinkler head position determiner adapted to determine a current sprinkler head position between the first and second sprinkler head positions (e.g., sprinkler head position determiner 130 of FIG. 3). The sprinkler system also includes a sprinkler water manifold (e.g., 510, FIG. 12) which has a water supply connection (573, FIG. 12) adapted to be connected to a main water supply (564, FIG. 12), a plurality of water outlet conduits (420-1 through 420-n, FIG. 12), each water outlet conduit capable of being placed in fluid communication with a respective sprinkler head (408-x, FIG. 12), and a sprinkler head selector valve (or a plurality of sprinkler solenoid valves 512-1 through 512-n, FIG. 12) to enable selective placement of each water outlet conduit in fluid communication with the water supply connection. The sprinkler system further includes a flow control valve (e.g., flow control valve 172 of FIG. 3) disposed between the water supply connection and the sprinkler head selector valve (or the plurality of sprinkler solenoid valves). The flow control valve is adapted to control flow of water from the water supply to one of the water outlet conduits currently selected by the sprinkler head selector valve (or by any given sprinkler solenoid valve). The sprinkler system further includes a flow control valve positioner (e.g., flow control valve positioner 174 of FIG. 3) which is adapted to establish a current control valve position of the flow control valve between an essentially fully closed control valve position and an essentially fully open control valve position. The sprinkler system can also include a flow control valve position determiner (175, FIG. 3) adapted to determine the current control valve position, and to generate a current flow control valve position signal in response thereto. (As described more fully below, the sprinkler system can further include a water flow detector configured to generate a current water flow signal.) Similar to the first embodiment, the sprinkler system of the second embodiment also includes a controller (which can be generally similar to controller 184 of FIG. 3) adapted to selectively receive a sprinkler head position signal from each sprinkler head position determiner, and to send a control valve control signal to the flow control valve positioner in response thereto. Likewise, the sprinkler system of the second embodiment includes a means for a user to position the flow control valve positioner during a program mode in the controller (e.g., manual control valve positioner 176 of FIG. 3, or electronic flow control valve feature 214 on user interface 200 of FIG. 4). The sprinkler system of this second embodiment will also include a memory device (e.g., memory 190 of FIG. 3) which can record a plurality of the current control valve position signals during the program mode. In this second embodiment, the controller is adapted to record in the memory device the plurality of current control valve position signals during the program mode for each sprinkler head, and to correlate each of the current control valve position signals with a corresponding current sprinkler head position as determined by a contemporaneous (or then-current) sprinkler head position signal received by the controller. The controller thereafter can use the correlated current control valve position signals and the current sprinkler head position signals from the program mode in a run-mode to send the control valve control signal to the flow control valve positioner. We will now describe one exemplary implementation of a sprinkler system in accordance with this second embodiment.

Figure 11:
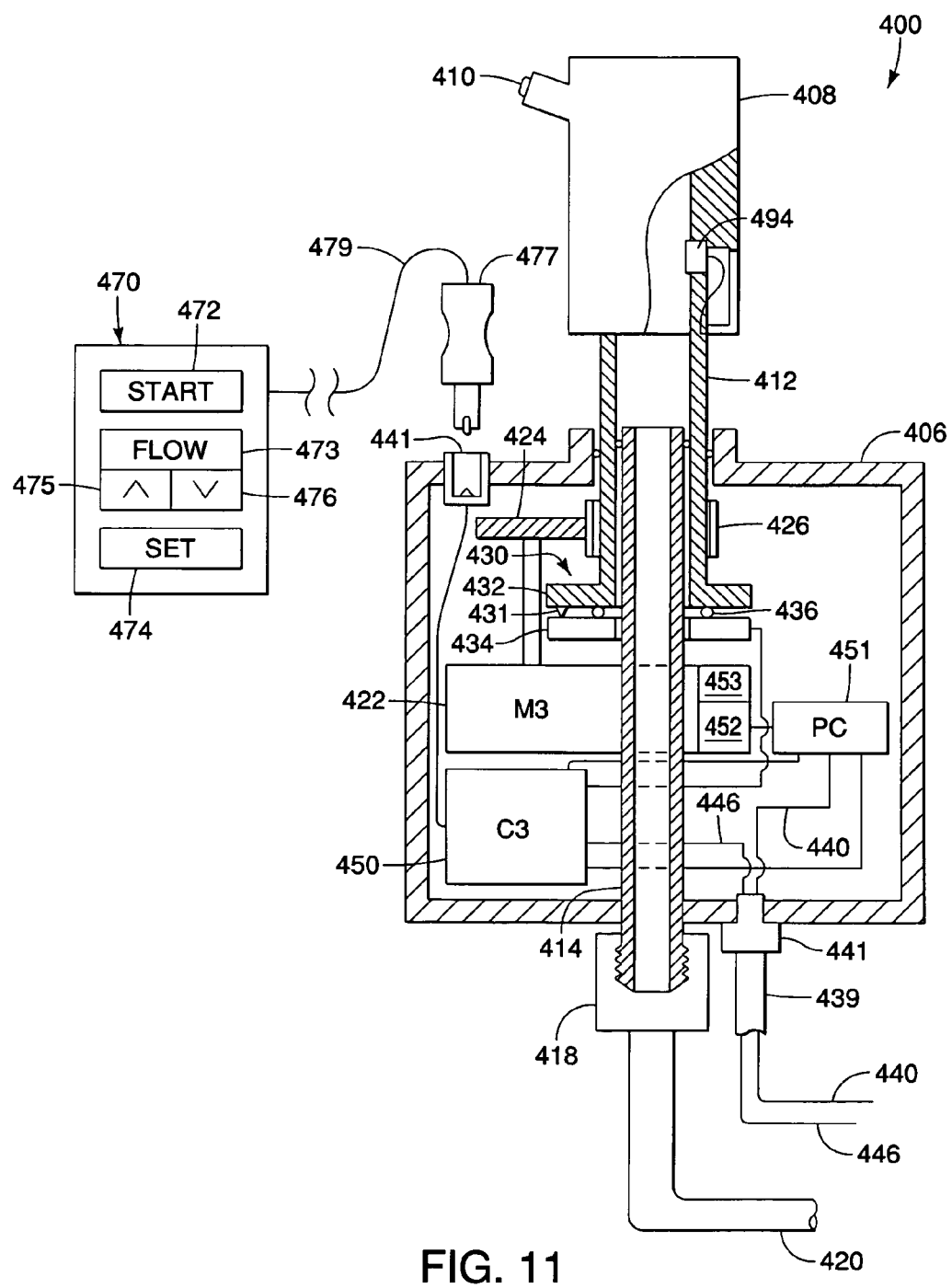
FIG. 11 is a side elevation sectional view depicting an exemplary sprinkler that can be used with a sprinkler system in accordance with a second embodiment provided for herein.

FIG. 11 is a side elevation sectional view depicting a sprinkler 400 which can be used to implement the second described embodiment. The sprinkler 400 of FIG. 11 includes many of the same (or similar) components described above with respect to the sprinkler 102 of FIG. 3. Thus, in the following description for common components between the sprinkler 400 of FIG. 11 and the sprinkler 102 of FIG. 3, reference may be made to the description of FIG. 3 for the sake of brevity. The sprinkler 400 of FIG. 11 includes a sprinkler housing 406 and a sprinkler head 408. Sprinkler head 408 includes a water flow discharge nozzle 410 which is in fluid communication with sprinkler head water conduit 412. The sprinkler head water conduit 412 can be provided with water via the sprinkler body water conduit 414, which can in turn be connected to the sprinkler water supply conduit 420 (which can be at least in part underground water tubing) via water connector 418. Sprinkler 400 can be a pop-up type of sprinkler (even though not depicted as such in FIG. 11 for the sake of simplifying the drawing figure). In that event, housing 406 can be enlarged and modified to accommodate a recessed sprinkler head 408, and the sprinkler head 408 can be mounted on a telescoping water conduit such that when pressurized water pressure is applied to the sprinkler head, the sprinkler head will "pop-up" along the telescoping water conduit. Further, either gravity or a spring can bias the sprinkler head 408 into the non-deployed position when water pressure is not being applied to the sprinkler head. The sprinkler 400 includes a sprinkler head positioner, here depicted as sprinkler motor M3 (422) which drives main gear 424; and thus in turn sprinkler head gear 426 (which is secured to the sprinkler head water conduit 412). The sprinkler motor 422 can be similar to sprinkler motor 122 of FIG. 3, and can include a motor starter solenoid 452 (similar to motor starter solenoid 152 of FIG. 3), and can be further optionally provided with a sprinkler motor reversing unit 453 (similar to reversing unit 153 of FIG. 3). Sprinkler 400 further includes a sprinkler head position determiner 430, which can be similar to the sprinkler head position determiner 130 of FIG. 3. As depicted, the sprinkler head position determiner 430 is a rotary encoder, including a fixed base 434, a position determiner contact 431 which is supported on a sprinkler head platform 432, and a bearing 436. Components 434, 431, 432 and 436 of sprinkler head position determiner 430 can all be similar to their respective counterpart components 134, 131, 132 and 136 of the sprinkler head position determiner 130 of FIG. 3, all described above. The sprinkler 400 can optionally include a flow detector which can operate similar to the flow detector 194 described above with respect to FIG. 3. In the embodiment depicted in FIG. 11, the flow detector is a pressure sensor 494 which is located within the sprinkler head 408. In this example, the pressure sensor 494 can send a pressure signal to the sprinkler control unit 450 (described more fully below) via a rotary contact (not shown) incorporated into the sprinkler head position determiner 430. In another variation, the pressure sensor 494 can be located within the sprinkler body water conduit 414. In a further variation, the flow detector can be an impeller placed at least partially in the fluid stream between the sprinkler water supply conduit 420 and the discharge nozzle 410.

The sprinkler 400 of FIG. 11 is further depicted as including sprinkler control unit C3 (450) which can include a processor (not shown). The sprinkler control unit 450 can process the receipt of, and transmission of, signals relative to the operation of the sprinkler 400 within the overall sprinkler system (e.g., sending then-current position signals from the sprinkler head position determiner 430 to a main controller, receiving and relaying motor start signals to motor starter solenoid 452, controlling the speed of sprinkler motor 422, and receiving programming signals from programming port 441 (which will be described more fully below).

Whereas the sprinkler 102 of FIG. 3 is depicted as including a battery 140 in order to power the sprinkler motor 122 and other components in the sprinkler 102, the sprinkler 400 of FIG. 11 can be provided with electrical power via a power line 440, which can be run in an underground electrical conduit 439. (In one variation, underground electrical conduit 439 and underground water tubing 420 can be run together in a single integrated tubing, as described above with respect to the integrated conduit 360 of FIG. 3B.) Underground electrical conduit 439 can be connected to the sprinkler head 400 via an electrical connector 441 to facilitate ease of installation of the sprinkler head 400. Power line 440 can be routed to a power controller PC (451) which can distribute power to the sprinkler motor 422 (and motor components 452 and 453, if provided), and the sprinkler control unit 450. Power controller 451 can also include a transformer (not shown) to step-down (or step up) the power provided by power line 440. The underground electrical conduit 439 can also include one or more signal cables 446 which can be used to communicate signals between the sprinkler control unit 450 and the main sprinkler controller (described below).

In the sprinkler system of this second embodiment, it can be the case that one or more of the sprinklers is not within line of sight of the main sprinkler controller. As can be appreciated, it is desirable that a user be able to view a sprinkler head while setting a sprinkling program such that the user can verify that the area to be sprinkled is indeed being sprinkled, with minimal overspray. However, if the flow control device which enables the user to adjust the flow of water to the sprinkler during the program mode is located at a main controller, and not within sight of the sprinkler, then it will be very difficult for the user to set a desired flow program. In order to address this situation the sprinkler system can be provided with a remote programming unit 470 (FIG. 11) which allows the user to be located proximate the sprinkler 400 during the program mode. The remote programming unit 470 can communicate with the sprinkler control unit 450 via a wireless connection (similar to the remote user interface 200' of FIG. 3, described above). However, wireless communication between the remote programming unit 470 and the sprinkler control unit 450 requires that the remote programming unit 470 be provided with a wireless transmitter, and the sprinkler control unit 450 be provided with a wireless receiver. In order to simplify the design of both the remote programming unit 470 and the sprinkler control unit 450, the remote programming unit 470 can communicate with the sprinkler control unit 450 via a signal cable 479. The signal cable 479 is connected directly to the remote programming unit 470 at a first end, and to a plug-in connector 477 at a second end. The plug-in connector 477 is configured to plug into the signal port 441 of the sprinkler 400 in order to establish signal communication between the remote programming unit 470 and the sprinkler control unit 450. As will be appreciated, this will also establish signal communication between the remote programming unit 470 and the main sprinkler system controller (584 of FIG. 12, described more fully below) via signal cable 446. The remote programming unit 470 can include the flowing user controls: a START feature 472 to start the program mode for the sprinkler 400; a FLOW feature 473 (including respective increase-flow and decrease-flow controls 475 and 476) to enable the user to adjust the flow of water to the sprinkler head during the program mode; and a SET feature 474 to enable the user to indicate that programming of flow to the sprinkler 400 has been completed, and to terminate the program mode for that particular sprinkler. As can be appreciated, the remote programming unit 470 allows a user to move from one sprinkler to the next, and thereby set a flow program for each sprinkler within the overall sprinkler system.

Figure 12:
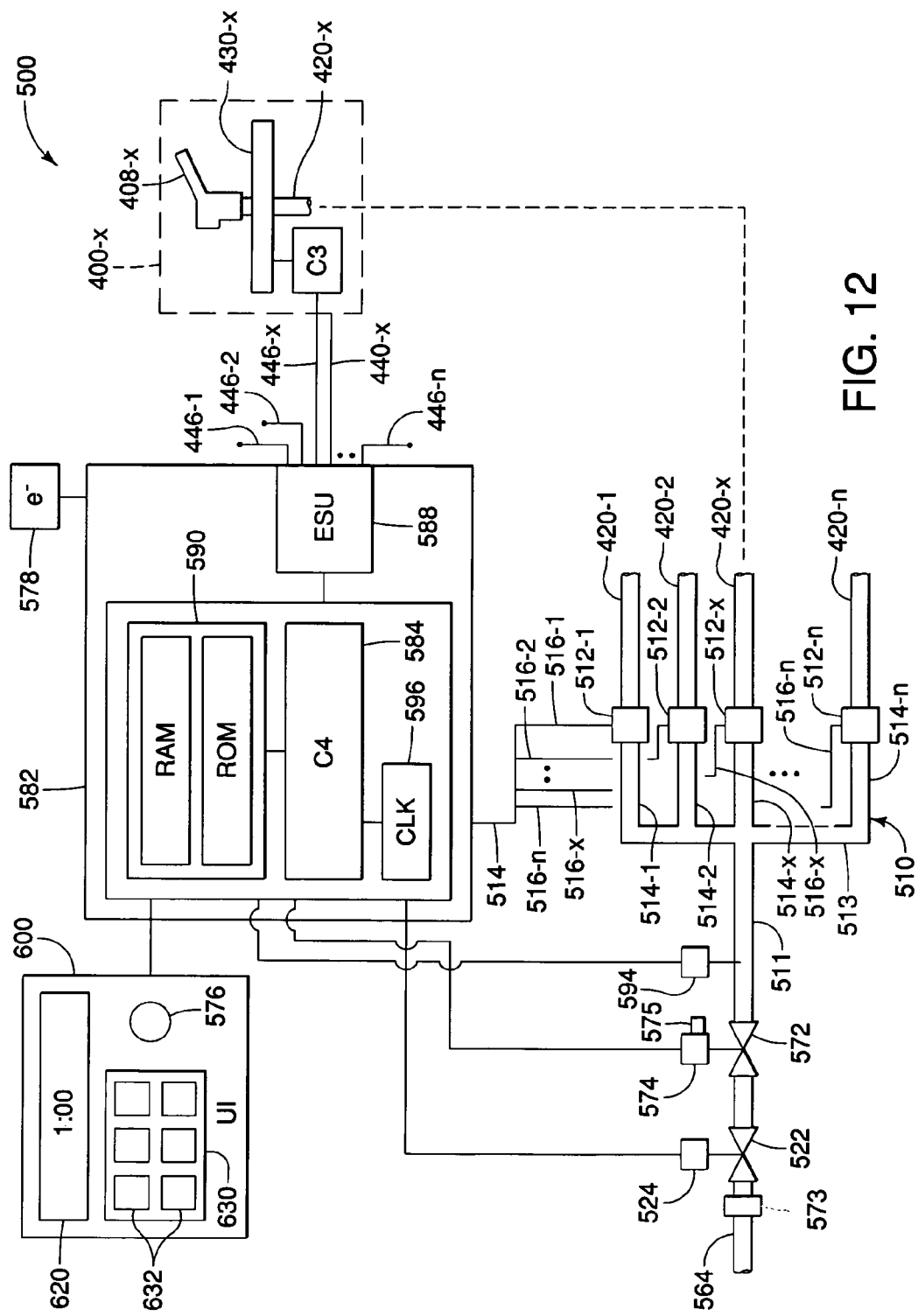
FIG. 12 is a schematic diagram depicting an exemplary sprinkler system in accordance with the second embodiment provided for herein.

Turning now to FIG. 12, a schematic diagram depicts an exemplary sprinkler system 500 in accordance with the second embodiment. The sprinkler system 500 includes a plurality of sprinklers (only one of which is depicted as sprinkler 400-X), each of which can be implemented as the sprinkler 400 of FIG. 11. (For purposes of the following discussion, it will be assumed that the sprinkler system 500 is configured to distribute water to "n" different sprinklers, starting with a sprinkler 400-1 (not shown) and continuing through to a sprinkler 400-n (also not shown), with sprinkler 400-X being one of the sprinklers. Sprinkler 400-X is depicted as including sprinkler head 408-X and sprinkler head position determiner 430-X.) The sprinkler system 500 further includes a main sprinkler control unit 582, and a user interface 600 which is in signal communication with the main sprinkler control unit 582. Sprinkler system 500 also includes a sprinkler selection water manifold 510 which is in fluid communication with a water main source 564, and which can selectively distribute water to each of the sprinklers. The flow of water from the water main source 564 to each individual sprinkler 400-1 to 400-n can be variably adjusted via a flow control valve 572, which can be selectively positioned via flow control valve positioner 574 (which is in signal communication with the main sprinkler control unit 574). The flow control valve 572, and the flow control valve positioner 574, can be implemented as described above with respect to the flow control valve 172, and the flow control valve positioner 174, of FIG. 3. Further, the flow control valve positioner 574 can include a flow control valve position determiner 575 which can be configured similarly to the flow control valve position determiner 175 described above with respect to FIG. 3.

As indicated above, the sprinkler system 500 of the second embodiment is generally intended to operate as an in-ground sprinkler system, and therefor can include many of the features of prior-art in-ground sprinkler systems (i.e., a user can set a desired sprinkling regimen for the system to enable watering by the sprinklers 400-1 through 400-n at various times, and at various days of the week, such that once the desired sprinkling regimen has been entered into the main sprinkler control unit 582, the sprinkler system 500 will operate on a day-to-day basis without further user intervention). It will be appreciated that the sprinkler system 500 can also be implemented using a plurality of moveable sprinklers (e.g., sprinklers 102 of FIG. 3.) However, for purposes of the following discussion the sprinkler system 500 of FIG. 12 will be exemplarily described as an in-ground sprinkle system. Accordingly, a general exemplary description of the operation of the sprinkler system 500 is as follows: a user programs each of the sprinklers 400-1 through 400-n to provide the desired watering (or sprinkling) for each area to be watered by the respective sprinkler, using the user interface 600 and/or the remote programming unit 470 of FIG. 11; the user further programs (via user interface 600) a desired start time for the sprinklers 400-1 through 400-n to begin their watering of the various areas to be watered (and potentially including selected days of the week for each sprinkler to perform its watering); the main sprinkler control unit 582 thereafter selectively enables water from the water main source 564 to be provided to the individual sprinklers 400-1 through 400-n, and during the time that water is provided to any given sprinkler the flow control valve 572 (as controlled by the flow control valve positioner 574) controls flow of water to the given sprinkler (and thus, to the potential area which can be sprinkled by that sprinkler) as determined by the sprinkler flow program previously determined by the user for that sprinkler. (This operation of the sprinkler system will be described in further detail below with respect to the flowchart 700 of FIGS. 13A and 13B.) A more detailed discussion of the components of the exemplary sprinkler system 500 (which were described generally above) will now be provided.

With respect to FIG. 12, the main control unit 582 of the sprinkler system 500 can be provided with electrical power from power source 578. The main control unit 582 can include a main controller C4 (584), a memory device 590 (including RAM and ROM type memory), and a clock CLK (596), all of which can be configured similar to their respective counterparts 184, 190 and 196 of the sprinkler system 100 of FIG. 3, described above. The main control unit 582 can also include an electrical switching unit ESU (588) which can selectively switch signal communication between the main controller 584 and each sprinkler control unit (e.g., sprinkler control unit 450 of FIG. 11) e.g., via signal lines 446-1 through 446-n. (Signal lines 446-2 and 446-x are depicted as exemplary signal lines between the first and last respective signal lines 446-1 and 446-n. Signal line 446-X places sprinkler control unit 450-X in signal communication with the main sprinkler control unit 582.) The electrical switching unit 588 can also selectively provide electrical power to the various sprinklers 400-1 through 400-n (as exemplarily indicated by power line 440-X) under control of the main controller 584.

The user interface 600 of the sprinkler system 500 of FIG. 12 is in signal communication with the sprinkler system main control unit 582, and can include a display device 620 and a user data entry device 630 (such as keypad or the like). The data entry device 630 can enable a user to select a sprinkling regimen, which can include the following: duration of watering (sprinkling) to be performed by each sprinkler 400-1 through 400-n; days of the week during which each sprinkler is to perform watering; and a start time for sprinkling to begin on any given day of the week. This information can be entered into the user interface 600 via selected data entry features (such as keys 632) on data entry device 630. (It will be appreciated that programming a sprinkling regimen for a plurality of sprinklers (or sprinkling stations, which may include more than one sprinkler) is well known (save for the aspect of establishing a specific flow program for each individual sprinkler), and that further description of the components (and programming steps) required to implement such a basic sprinkling regimen program is not necessary in order to enable this particular aspect of the current embodiment.) The user interface 600 can further include a manual control valve positioner 576 which can be used by the user during the program mode in order to manually position the flow control valve positioner (e.g., flow control valve positioner 574) during the program mode for any given sprinkler 400-1 though 400-n. The manual control valve positioner 576 can be used as an alternative (or supplement) to the remote programming unit 470 described above with respect to FIG. 11.

As generally described above, the sprinkler system 500 provides water from a main water supply 564 to each of the sprinklers 400-1 though 400-n via the sprinkler selection manifold 510. A water main solenoid valve 522 can optionally be provided between the main water supply 564 and the sprinkler selection manifold 510, and can be actuated by a water main valve solenoid 524. The water main valve solenoid 524 can be actuated under the control of the main control unit 578 to open the main solenoid valve 522 when sprinkling is to be provided by any of the sprinklers 400-1 through 400-n. For example, if a sprinkler regimen program (which can be stored in memory 590) specifies that a sprinkling regimen is to begin at 4:00 a.m., then main controller 584 can determine from the clock 596 when it is 4:00 a.m., and at that time can send a signal to the main valve solenoid 524 to open the main solenoid valve 522.

As indicated above, the flow control valve 572 can be positioned between the main water supply conduit 564 and the sprinkler selection manifold 510. (Controlled-water-flow conduit 511 is disposed between flow control valve 572 and sprinkler selection manifold 510.) A flow detector 594 can be positioned to measure (or approximate) flow within controlled-water-flow conduit 511. Flow detector 594 can operate similar to flow detector 194 of FIG. 3, described above. That is, during the program mode the flow detector 594 can measure (or approximate) the flow of water after the control flow valve 572 and to sprinkler 400-x (i.e., the then-current selected sprinkler), and this flow data can be stored in memory 590. Thereafter, in the run mode, the then-current flow for any given sprinkler head position (and for any given sprinkler head) can be detected by the flow detector 594, and can thereafter be compared with the desired recorded flow (i.e., recorded during the program mode) for the then-current sprinkler head position (and then-current sprinkler being used). If the flow (as determined by the flow detector 594) has varied from the desired programmed flow (e.g., as a result of variance in the water pressure in the water supply 564), the controller 584 can then calculate a correction for the control valve positioner 574 in order to match the then-current flow to the desired flow. The flow detector 594 can basically be used as an alternative to the flow detector 494 located in the sprinkler head (400, FIG. 11).

In the example of FIG. 12, the sprinkler selection manifold 510 includes a main distribution conduit 513 which is in fluid communication with a plurality of sprinkler branch water conduits 514-1 through 514-n (i.e., one sprinkler branch conduit for each of sprinklers 400-1 through 400-n). Further, each sprinkler branch water conduit 514-1 through 514-n can be selectively placed in respective fluid communication with an associated (and respective) sprinkler water conduit 420-1 through 420-n via a respective sprinkler selector solenoid valve 512-1 through 512-n. Sprinkler solenoid valves 512-1 through 512-n can be selectively actuated by the main control unit 582 under the direction of a sprinkler regimen (or system) program stored in memory 590, which can be executed by a run program via main controller 584. As exemplarily depicted, sprinkler branch conduit 514-X (located after sprinkler branch conduit 514-2) can be placed in fluid communication with sprinkler water conduit 420-X (located after sprinkler water conduit 420-2) via sprinkler solenoid valve 512-X (located after sprinkler solenoid valve 512-2). Each of the sprinkler solenoid valves 512-1 through 512-n can be actuated by a sprinkler solenoid signal line (516-1 through 516-n, and including sprinkler solenoid signal lines 516-2 and 516-X), all of which can be multiplexed on main sprinkler solenoid valve signal line 514 via main controller 584.

In one variation, in order to allow multiple sprinklers 400-1 through 400-n to be operated simultaneously, each of the sprinklers to be operated simultaneously can include a flow control valve (similar to flow control valve 572, FIG. 12) located within the sprinkler itself. The main controller 584 can then run parallel sprinkling programs for the plurality of sprinklers that are being operated simultaneously. All of the sprinklers 400-1 through 400-n can include a flow control valve (even if certain of the sprinklers are not intended to be run simultaneously), in which case similar flow control valve 572 can be eliminated. Optionally, the sprinkler system 500 can include flow control valve 572, and selected ones of the 400-1 through 400-n can be provided with individual flow control valves. In this last arrangement when a sprinkler having its own control valve is being operated, then the flow control valve 572 can be placed in a fully opened position.

The user steps for programming each individual sprinkler in the system 100 can generally follow the sequence of steps (beginning at step 268) described above with respect to the flowchart 300 of FIG. 6A. The user can use the remote programming unit 470 of FIG. 11, going from one sprinkler head to the next, until all of the sprinkler heads are programmed. When the user enables the "START" feature 472 on the remote unit 470, the remote unit can send a signal (e.g., via signal line 446) to the main sprinkler control unit 582 (FIG. 13) to open the appropriate sprinkler solenoid valve (from valves 512-2 through 512-n), and the main supply valve 522 (if so provided). The remote programming unit 470 can also cause the main controller 584 to begin recording the sprinkling program for that sprinkler in the memory 590. Following programming of the individual sprinklers 400, the user can then program the main sprinkler system program using the user interface 600 (FIG. 12). The sprinkler system program (which can be stored in memory 590) can determine which sprinklers are to be actuated on which days of the week, start times, and duration run times. (The sprinkler system program can be set either before or after programming the individual sprinklers 400 in the system 500.) Thereafter, the system 500 will run automatically per the sprinkler system program. (User interface 600 can also allow a user to run individual sprinklers outside of the sprinkler system program in a manual mode.)

Figure 13A:
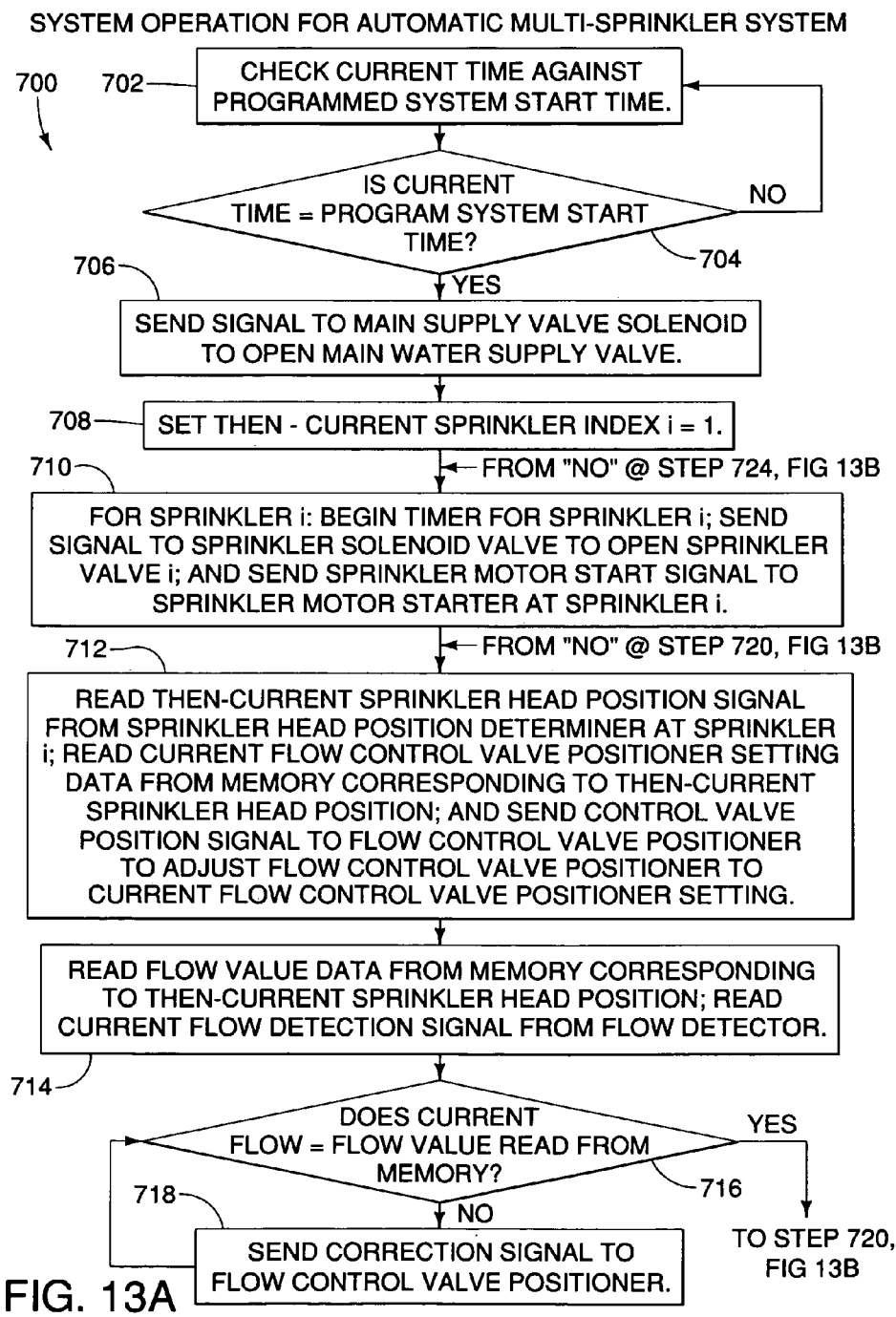
FIGS. 13A and 13B together are a flowchart depicting exemplary system operation steps for an automatic multi-sprinkler system of the current disclosure.
Figure 13B:
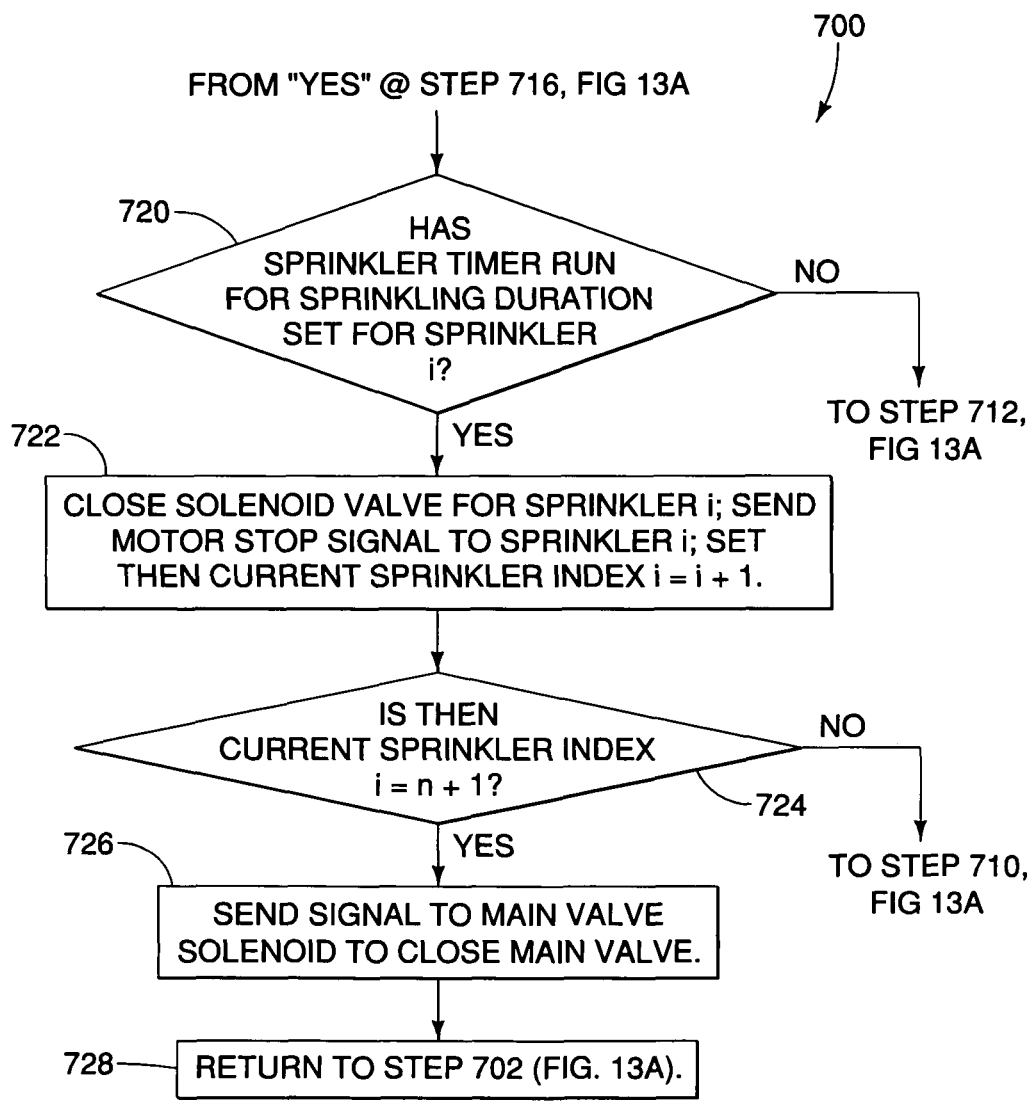

FIGS. 13A and 13B together are a flowchart 700 depicting exemplary system operation steps for running an automatic sprinkler system program for the sprinkler system 500 of FIG. 12. For purposes of simplifying the flowchart, any steps for determining day-of-week are not included, it being well understood how such can be easily incorporated into the program as an initial step. Further, the sprinkler system program 700 assumes that all sprinklers are to be run during the program. In one variation, the system can be configured to allow a user to run two different programs—e.g., a program "A" can provide for running sprinklers 400-1 through 400-X on Monday, Wednesday, and Friday, and a program "B" can provide for running sprinklers 400-X+1 through 400-n on Tuesday, Thursday and Saturday. The user can program both programs "A" and "B" by selecting the specific program via the user interface 600 during the sprinkler system programming mode. Further, the sprinkler system program 700 assumes all of the sprinklers are run sequentially, starting with the first sprinkler. That is, once one sprinkler has run for its predetermined interval, the system program moves to the next sprinkler and so on, until the last sprinkler has run for its predetermined interval, at which time running of the system stops until the next start time is detected. The sprinkler system program 700 also assumes that only one sprinkler is run at a time. However, it will be appreciated that the system 500 can be arranged such that two or more sprinklers run simultaneously. This feature has not been included in the flowchart 700 for the sake of simplicity. However, it will be appreciated that when two or more sprinklers are run simultaneously, providing flow detection using the pressure sensor 494 in the sprinkler 400 (FIG. 11) can be useful since the variable volume flow in each of the sprinklers can affect the flow to other sprinklers being simultaneously run. In yet another variation, the sprinklers 400-1 through 400-n in any given system 500 can either be ordered in a pre-assigned order (in the control unit 582), or alternately the user interface 600 can enable the user to assign the order of the sprinklers (i.e., which specific sprinkler will be designated as sprinkler 400-1, which will be 400-2, and so on). In general the available complexity (and flexibility) for any given sprinkler program which can be set by a user can be determined at least in part by the specific application in which the sprinkler system 500 is being used. For example, if the system 500 is to cover a large number of different areas to be sprinkled having many different complex shapes, a user interface can be provided which allows the user a high degree of flexibility in setting the sprinkler system program. Thus, when installing a sprinkler system 500 the installer may choose to use one kind of user interface 600 (and control unit 582) over another depending on the complexity required in order to achieve the desired sprinkling. As can be appreciated, a user can realize a cost savings by purchasing only as complex of a control unit (582) and user interface (600) as is required for the specific system implementation (it being appreciated that, for example, a control unit 584 which can handle 20 different sprinklers will generally cost more to implement than a control unit which can handle only 5 sprinklers). Thus, the flowchart 700 of FIGS. 13A and 13B is not intended to show all possible program features which can be used in a sprinkler system program, but is intended more to demonstrate how the variable-area individual sprinkler program can be incorporated into a larger sprinkler system program.

Turning now to FIG. 13A, at step 712 the system program reads the current time (e.g., from clock 596, FIG. 12) and the programmed system start time (e.g., from memory 590). At step 704 a determination is made whether the current time is the programmed system start time. If the determination is "no", then control returns to step 702 to continue reading the clock. However, if at step 704 it is determined that the current time is the programmed system start time, then at step 706 the controller (e.g., 584, FIG. 12) sends a signal to the main water supply valve solenoid (e.g., solenoid 524) to open the main water supply valve (e.g., valve 522). Then at step 708 the controller 584 sets a then-current sprinkler index "i" equal to the value of "1" (e.g., indicating that sprinkler 400-1 is the then-current sprinkler). (The then-current sprinkler index value can be stored in RAM of memory 590.) At step 710 the controller (e.g., 584, FIG. 12) performs the following operations: initiates a timer for the current elapsed run-time of the then current sprinkler (the elapsed run time can be stored in RAM of memory 590); sends a signal to the sprinkler solenoid valve (associated with the then-current sprinkler, e.g., sprinkler solenoid valve 512-X) to open that sprinkler valve; and sends a sprinkler motor start signal to the sprinkler motor starter (e.g., motor starter 452, FIG. 11) at the then-current sprinkler. At step 712 the controller (584, FIG. 12) reads the then-current sprinkler head position signal from the sprinkler head position determiner at sprinkler "i" (e.g., sprinkler head position determiner 430-X at sprinkler 400-X, FIG. 12); reads the current flow control valve positioner setting data from memory (e.g., 490) corresponding to then-current sprinkler head position; and sends a control valve positioning signal to the flow control valve positioner (e.g., flow control valve positioner 574, FIG. 12) to adjust flow control valve positioner to the current flow control valve positioner setting. At step 714 the controller (584) reads the flow value data from memory corresponding to then-current sprinkler head position (which data was stored during the individual sprinkler programming mode), and also reads the current flow detection signal from flow detector (e.g., flow detector 494 FIG. 11, or 594 FIG. 12). At step 716 a determination is made whether the current flow (as measured in step 714) is equal to the flow value read from the memory 590 in step 714. If at step 716 it is determined that the current flow is not equal to the recorded flow for the then-current sprinkler head position, then at step 718 a correction signal is sent to the flow control valve positioner (574), and control then returns to step 716 to determine if the correction was sufficient to bring the current flow value to the desired flow value. (Step 716 can be provided with an approximation routine such that if current flow is within a predetermined amount—for example, between 95 percent and 105 percent) of the desired flow, then this is equivalent to a "yes" determination.) If at step 716 it is determined that the current flow is essentially equal to the recorded flow for the then-current sprinkler head position, then control proceeds to step 720 of FIG. 13B. At step 720 (FIG. 13B) a determination is made whether the sprinkler timer (initiated in step 710) has run for at least the duration previously set for the then-current sprinkler. If it is determined (at step 720) that the sprinkler timer has not expired for the then-current sprinkler, then control returns to step 712 (FIG. 13A), and the controller 584 continues to read then-current sprinkler head position data, and to adjust the control valve positioner 574 to achieve the desired flow. However, it at step 720 (FIG. 13B) it is determined that the sprinkler timer has expired for the then-current sprinkler, then at step 722 the controller (584) performs the following steps: sends a signal to the then-current sprinkler solenoid valve (e.g., 512-X) to close the solenoid valve for the then-current sprinkler "i"; sends a motor stop signal to the sprinkler motor starter (e.g., 452, FIG. 11) at sprinkler "i"; and sets the then-current sprinkler index i=i+1. (That is, if at the beginning of step 722 the then-current sprinkler index is set as "2", then at the end of step 722 the then-current sprinkler index "i" is set as "3".) Then at step 724 a determination is made whether the newly-incremented sprinkler index "i" is greater than the number "n" of sprinklers in the system (i.e. whether "i" is equal to n+1). If at step 724 it is determined that the current sprinkler index "i" is not greater than the number of sprinklers in the system, then control returns to step 710 (FIG. 13A) to place the next sprinkler in the system on line and begin the sprinkling program for that sprinkler. However, if at step 724 (FIG. 13B) it is determined that the current sprinkler index "i" is greater than the number of sprinklers in the system, then control proceeds to step 726, and the controller (584, FIG. 12) sends a signal to the main water supply valve solenoid (524) to close the main water supply valve (522). At this point the running of the sprinkling program for the sprinkler system 500 (FIG. 12) program is considered to be complete, and at step 728 (FIG. 13B), control is returned to step 702 to continue checking the clock (596) to determine whether the sprinkling program should be run again.

It will be appreciated that the steps set forth for the flowchart 700 of FIGS. 13A and 13B are exemplary only in order to demonstrate one example of how a sprinkler system program can be performed in order to accomplish desired area-programmable sprinkling by the multi-sprinkler system 500 of FIG. 12. The flowchart 700 can thus include additional steps (e.g., to implement the sprinkler reversing routine described above with respect to the flowchart 370 of FIG. 10), certain steps can be eliminated (e.g., the flow-checking steps of 716 and 718, FIG. 13A), and that the order of certain steps may be rearranged.

It will be further appreciated that most of the variations, alternative configurations and enhancements described above with respect to the first embodiment (generally, the sprinkler system 100 of FIG. 3) can be implemented with respect to the sprinkler system 500 (FIG. 12) of the second embodiment.

When the sprinkler system (100 FIG. 3, 400 FIG. 11) is implemented as an in-ground system, it is desirable that the sprinkler head (respectively, 108, 408) remain near ground level when sprinkling is not occurring. This reduces the chances that damage can occur to the sprinkler head as a result of incidences such as lawn mowing and the like. Thus, it is desirable to provide a means for moving the sprinkler head (108, 408) to an elevated position above ground level during sprinkling in order that spray emanating from the nozzle (110, 410) can achieve watering of the desired area. As indicated above, traditional means for moving a sprinkler head to an elevated position (i.e., to "pop-up" a sprinkler head) relies on using water pressure from the water supply conduit 420 to push the sprinkler head up against the bias of gravity or a spring. While the traditional means to "pop-up" a sprinkler head can be used for the sprinkler systems disclosed herein, such traditional means include some drawbacks when the flow control valve is not located within the sprinkler itself. (If the flow control valve (e.g., 172, FIG. 3) is located within the sprinkler (e.g., 102), then water pressure from the water supply conduit (e.g., 114) prior to the control valve can be used to deploy the sprinkler head 108.) Problems associated with using water pressure to deploy the sprinkler head when the flow control valve is remote from the sprinkler itself include the following: (i) if water pressure is required to "pop-up" a sprinkler head, then the sprinkler head may be moved past the initial watering position before the sprinkler head is fully deployed (resulting in insufficient water being applied at the initial position); and (ii) for areas within a watering region which require little or no water, the water pressure available to the sprinkler head may be insufficient to keep the sprinkler head in the deployed position. It is therefore desirable to provide a means for moving a sprinkler head of the current disclosure to a deployed position (i.e., a position wherein water can be dispersed from a nozzle attached to the sprinkler head onto the area to the irrigated) which is not reliant upon water pressure being applied to the sprinkler head. To this end, we have developed a sprinkler head deployment device which achieves this purpose. More specifically, the sprinkler head deployment device can use electrical power (which is available to the sprinkler motor 122, 422) in order to move the sprinkler head (108, 408) into a deployed (i.e., sprinkling) position. One example will now be described.

Figure 16:
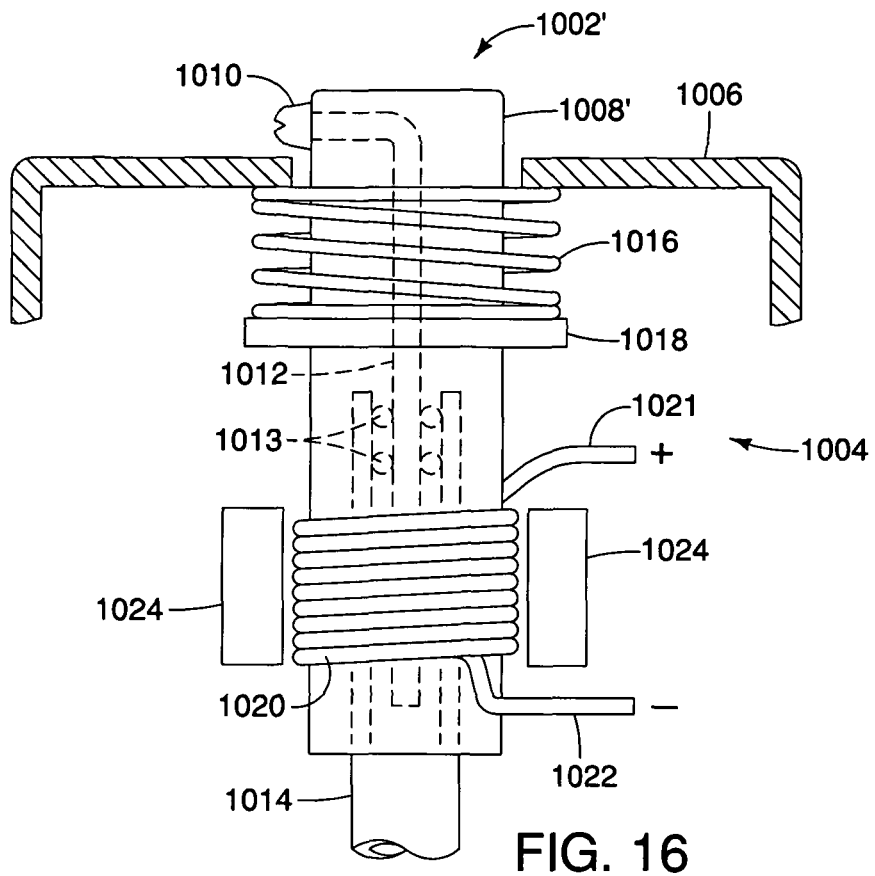
FIG. 16 is a side view of a sprinkler head deployment device that can be used with sprinklers in accordance with the present disclosure.

With respect to FIG. 16, a sprinkler head deployment device 1004 is depicted in a side view. (This particular implementation of the sprinkler head deployment device 1004 can be implemented with respect to the sprinkler heads 108 and 408 of respective FIGS. 3 and 11 by minor modifications thereto.) The sprinkler head deployment device 1004 is depicted as being implemented with respect to a sprinkler 1002 (shown only in partial view) which is configured to provide area-programmable watering capability in accordance with the present disclosure. That is, the particular implementation of the sprinkler head deployment device 1004 depicted in FIG. 16 can be implemented with respect to the sprinkler heads 108 and 408 of respective FIGS. 3 and 11 by minor modifications thereto. As depicted in FIG. 16, the sprinkler 1002 includes sprinkler body or housing 1006 and sprinkler head 1008. Sprinkler head 1008 includes spray nozzle 1010 which is supplied with water from Sprinkler head conduit 1012 can move rotationally as well as translationally with respect to sprinkler water line 1014 by virtue of o-ring seals 1013. The sprinkler head 1008 includes a flange 1018 which holds a coil spring 1016 in place between the flange and the inside of the housing 1006. Spring 1016 biases the sprinkler head 1008 in a downward (i.e., non-deployed) position. A conductive coil 1020 is wrapped around a portion of the sprinkler head 1008, and can be energized by electrical leads 1021 and 1022. (Leads 1021 and 1022 can be attached to a rotational electrical contact conductor (not shown) placed about the sprinkler head 1008 in order to allow the leads to rotate with the sprinkler head 1008 while remaining in electrical contact with a stationary electrical supply source (such as battery 140 of FIG. 3).) Permanent magnets 1024 are placed adjacent to the conductive coil 1020. Thus, when the sprinkler 1008 is electrically energized (i.e., electrically placed into service for sprinkling of an area) the electrical coil is also energized, and the permanent magnets 1024 force the sprinkler head 1008 in an upward (deployed) position against the bias of spring 1016. Once watering is complete and the electrical coil 1020 is de-energized, the coil spring 1016 returns the sprinkler head 1008 to the retracted position.

Figure 16A:
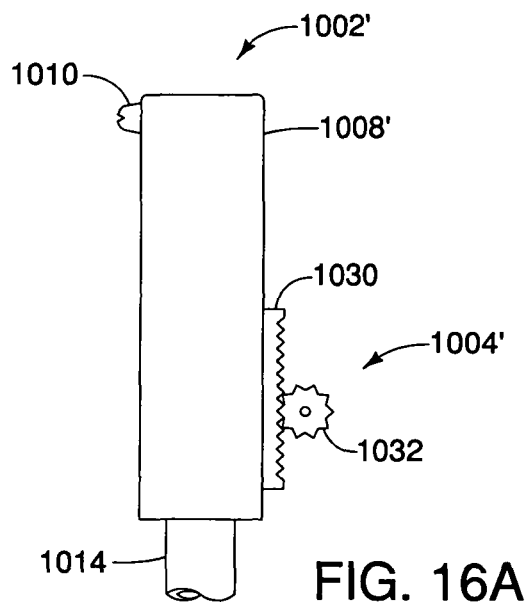
FIG. 16A is a side view of an alternate sprinkler head deployment device that can be used with sprinklers in accordance with the present disclosure.

A second version of a sprinkler head deployment apparatus is depicted in a side view in FIG. 16A. In this configuration the sprinkler 1002' (shown only partially) includes sprinkler head 1008' and spray nozzle 1010. The sprinkler head 1008' is provided with a sprinkler head deployment apparatus 1004' which includes a gear rack 1030 mounted on the sprinkler head, and a pinion gear 1032 which can drive the sprinkler head 1008' in upwards and downwards positions (to respectively deploy and retract the sprinkler head from the deployed (i.e., watering) position. The pinion gear 1032 can be driven by a separate electrical motor (not shown) which can be powered by a power source (such as battery 140 of FIG. 3) when the sprinkler 1002' is placed in service. The pinion gear 1032 can also be driven by motor 121 (FIG. 3) by a gear train. Circuitry (not shown) can be provided to disengage power to the pinion gear after deployment, and to re-engage power (in a direction reversing configuration) when the watering program for the sprinkler 1002' is complete.

It will be appreciated that, in addition to the configurations depicted in FIGS. 16 and 16A, other mechanical, electrical and electro-mechanical devices can be provided to provide deployment of the sprinkler head which do not rely on water pressure.

Third Embodiment: Elevation Adjustable Sprinkler Discharge Nozzle to Achieve Area-Programmable Sprinkling.

In a third embodiment, in order to achieve area-programmable sprinkling, the discharge nozzle at a sprinkler head can be variably elevationally positioned in order to achieve a desired sprinkling pattern over an area to be sprinkled. A disadvantage of a sprinkler in accordance with the third embodiment over the sprinkler systems 100 and 500 of the first and second embodiments is that a sprinkler of the third embodiment will generally achieve constant flow over the entire area to be sprinkled. Thus, the water applied to the area to be sprinkled (as measured in gallons per square foot) by a sprinkler of the third embodiment can vary significantly over the area to be sprinkled.

In general, a sprinkler system in accordance with the third embodiment includes a sprinkler head having a water discharge nozzle and adapted to move between a first sprinkler head position and a second sprinkler head position. (In this case, the area desired to be sprinkled lies within a region bounded by water which can emanate from the sprinkler head between the first and second sprinkler head positions.) The sprinkler system further includes a sprinkler head positioning apparatus (e.g., 121, FIG. 3) adapted to move the sprinkler head between the first and second sprinkler head positions, and a sprinkler head position determiner (e.g., 130, FIG. 3) adapted to determine a current sprinkler head position between the first and second sprinkler head positions. The sprinkler system also includes a discharge nozzle angle of declination positioner (870) adapted to control an angle of declination of the discharge nozzle relative to the sprinkler head, and a discharge nozzle angle of declination position determiner (871) adapted to determine an angle of declination of the discharge nozzle relative to the sprinkler head. The sprinkler system of the third embodiment additionally includes a controller (860) adapted to receive a sprinkler head position signal from the sprinkler head position determiner (871), and to send an angle of declination control signal to the angle of declination positioner (870) in response thereto. Thus, as the sprinkler head rotates about a fixed base, the angle of declination of the discharge nozzle can be adjusted to extend (or retract) the spray distance from the discharge nozzle to an outer perimeter which defines the area to be sprinkled. A specific example of a sprinkler system in accordance with the third embodiment will now be described with respect to FIG. 14.

Figure 14:
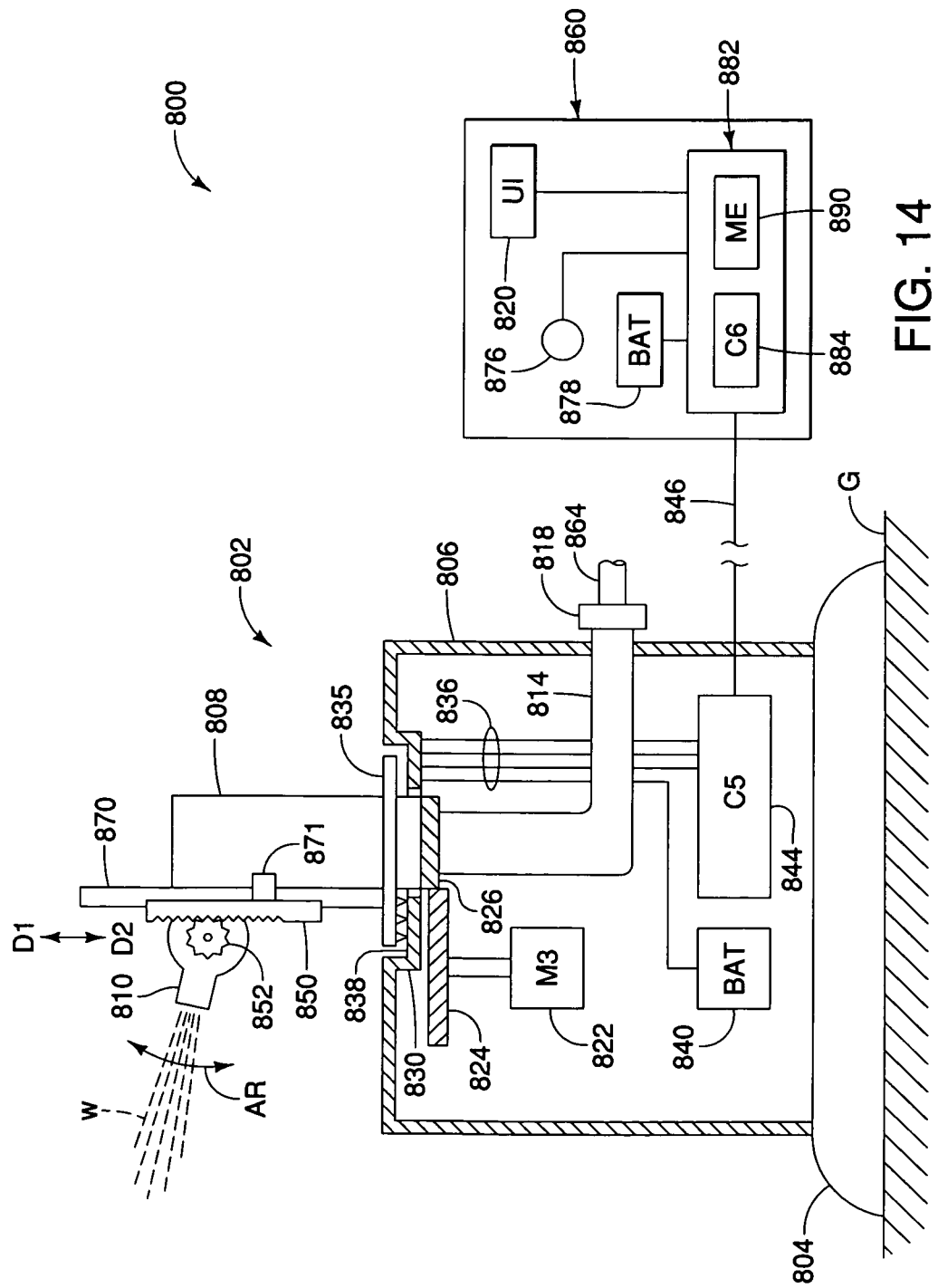
FIG. 14 is a side view schematic diagram depicting a third embodiment of an area-programmable sprinkler system in accordance with the current disclosure.

FIG. 14 is a side view schematic diagram depicting one example of an area-programmable sprinkler system 800 in accordance the third embodiment of the current disclosure. The sprinkler system 800 includes a sprinkler 802 and a main control unit 860. The sprinkler 802 includes a sprinkler head 808 having a water discharge nozzle 810 (which can spray water "W" over an area to be sprinkled), a sprinkler base 804 (which can be supported on ground "G" within or proximate to the area to be sprinkled), and a sprinkler housing 806. Sprinkler head 808 is configured to move rotationally (in plan view) with respect to the fixed sprinkler base 804 and sprinkler housing 806. Sprinkler 802 includes a sprinkler head positioner, here depicted as motor M3 (822) which drives gear 824 and, in turn, gear 826 which is secured around the lower part of the sprinkler head 808. (It will be appreciated in this embodiment that the sprinkler head positioner (motor 822) can be a water motor (i.e., driven by flow of water to the sprinkler head 808) since water flow is not regulated in this embodiment (unlike the first and second embodiments).) The sprinkler head 808 is provided with water from a sprinkler water conduit 814, which can be connected to a main water supply 864 (such as a garden hose, or underground tubing) via water connector 818. Sprinkler 802 can further include a power supply (here, depicted as battery "BAT" (840), and a sprinkler control unit "C5" (844). The power supply 840 can be used to power the discharge nozzle angle of declination position determiner 870 (described more fully below), to provide signal power to the sprinkler head position determiner 830 (also described more fully below), and to provide power to the sprinkler control unit 844.

The sprinkler 802 additionally includes a discharge nozzle angle of declination positioner, which is depicted in FIG. 14 as being a geared rack 870 which drives a pinion gear 852. The geared rack (or discharge nozzle angle of declination positioner) 870 is driven by the discharge nozzle angle of declination position determiner 870, which is depicted here as being a linear motor. Geared rack 870 drives pinion gear 852 is secured to the water discharge nozzle 810, such that as rack 870 is moved in directions D1 and D2 by the linear motor 870, the water discharge nozzle 810 is moved through the arc "AR". In the example depicted the discharge nozzle angle of declination position determiner (linear motor 870) is supported on a sprinkler head platform which rotates along with the sprinkler head 808. The sprinkler 802 further includes a fixed signal deck 838 which can be supported by the sprinkler body 806. The fixed signal deck 838 can include the contact points 256 (FIG. 3A) of a rotary encoder which can be used to implement the sprinkler head position determiner 830 (which can be similar to sprinkler head position determiner 130 of FIG. 3, described above). The fixed deck 838 can also include concentric metallic contact rings so that contact points (shown in FIG. 14, but not numbered) can communicate information between the discharge nozzle angle of declination position determiner 870 and the sprinkler control unit 844 via signal lines 836.

The sprinkler system 800 of FIG. 14 further includes the control module 860, which includes user interface 820, main control unit 882, power supply 878, and a discharge nozzle angle of declination manual position controller 876. The main control unit 822 can include the controller "C6" (884), which can be similar to controller 184 of FIG. 3, and a memory device "ME" (890), which can be similar to memory device 190 of FIG. 3. The control unit 860 of FIG. 14 can communicate with the sprinkler head 802 via signal lines 846, or via a wireless controller (similar to wireless user interface 200' of FIG. 3).

Programming of the sprinkler system 800 of FIG. 14 can proceed in a manner somewhat similar to that as describe above in flowchart 260 (FIG. 6A) for the system 100 of FIG. 3. Specifically, the user connects the sprinkler 802 (FIG. 14) to the water supply 864 and places the sprinkler on the ground "G" in or proximate to the area to be sprinkled. The user opens the main water supply valve (e.g., 167, FIG. 3) to a desired position which will achieve flow to the farthest reach of the area to be sprinkled. (Adjustment of the main supply valve may be performed during the program mode.) The user then enables a "START" or "PROGRAM" feature on the user interface 820, and then uses the discharge nozzle angle of declination manual position controller 876 to direct the discharge nozzle angle of declination positioner 870 to adjust the angle of declination of the discharge nozzle 810 as appropriate to achieve the desired sprinkling of the area. During this time the controller 884 records the then-current discharge nozzle angle of declination position as a function of the sprinkler head position (as determined by the sprinkler head position determiner 830). Once the desired sprinkling program for the area to be watered is achieved, the user can activate a "SET" feature on the user interface 820 to store the sprinkling program in memory 890. Thereafter, in a run mode, the controller can read the sprinkling program from the memory 890 in a manner somewhat similar to that described above with respect to flowchart 280 of FIG. 6B. Specifically, during the run mode the controller 884 reads then-current sprinkler head position data from sprinkler head position determiner 830, reads the corresponding discharge nozzle angle of declination data from the memory 890, and sends a signal to the discharge nozzle angle of declination position determiner 870 to adjust the discharge nozzle angle of declination positioner 850 to achieve the desired sprinkling for the then-current sprinkler head position.

It will be appreciated that the angle-of-declination embodiment of FIG. 14 can also be implemented as a multi-sprinkler system, and that certain optional features described above with respect to the first two embodiments can be used with the third embodiment as well.

Figure 18:
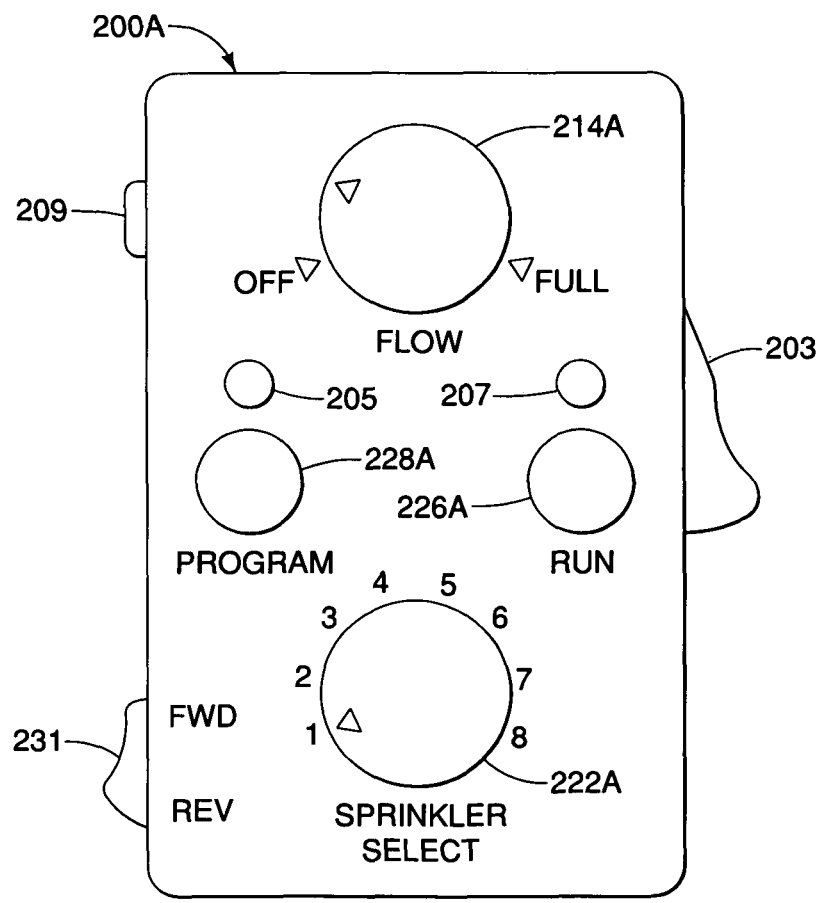
FIG. 18 is a plan view of an alternative user interface to that depicted in FIG. 4.

Turning now to FIG. 18, an alternative user interface 200A which can be used to program the area-programmable sprinkler described herein is depicted in a plan view. The alternative user interface 200A is one alternative to the user interface 200 depicted in FIGS. 4 and 8, and can also replace the user interface 200' of FIG. 3, the user interface (remote programming unit) 470 of FIG. 11, and the user interface 630 of FIG. 12. The user interface 200A of FIG. 18 can be placed in wired or wireless communication with the controllers C1 (150, FIG. 3), C2 (184, FIG. 3), 352 (FIG. 8), 450 (FIG. 11), and/or C4 (584, FIG. 12) via communication port 209, which can be a wired communication port or a wireless communication port. The user interface 200A includes a program mode switch 228A, and can also include a run-mode switch 226A. Switches 228A and 226A can be, for example, spring-loaded push-on/-push off switches (or buttons), which make a closed circuit connection with one push and disconnects or opens the circuit connection with the next push (i.e., when pressed, will latch on or toggle off). Such switches are commonly referred to as clicky switches. Switches 228A and 226A can also be two-position toggle switches. The user interface 200A can also include indicator lights 205 and 207. Illumination of program indicator light 205 can indicate that the program switch 228A has been placed in the program mode, wherein the irrigation pattern of the associated area programmable sprinkler is being recorded. Illumination of run-mode indicator light 207 can indicate that the run switch 226A has been placed in the run mode, wherein the associated area programmable sprinkler is performing (or running) the stored (recorded) irrigation pattern. An exemplary operation of the user interface 200A in the program mode is described below with respect to flowchart 1050 of FIG. 19.

The user interface 200A further includes a flow control 214A. Flow control 214A essentially acts as a pseudo-valve to regulate flow of water to the sprinkler (e.g., sprinkler 100, FIG. 3) which is being programmed using the user interface 200A. Flow control 214A is depicted as a rotary dial which sends a flow signal (via communication port 209) to the flow control valve position determiner (e.g., 175, FIG. 3). The flow control valve position determiner then sends a signal to the flow valve positioner (e.g., 174, FIG. 3) to position the control valve (e.g., control valve 172, FIG. 3). The flow control 214A can thus control the flow of water (via the control valve) to the sprinkler. The flow control 214A is intended to allow for control of flow between a fully closed position of the control valve and a fully opened position of the control valve. Preferably, for ease of use by the user, the flow control 214A can be implemented as a rotary dial controlling flow between the fully closed and fully opened positions of the control valve with 360 degrees or less of rotation of the rotary dial, and more preferably with 270 degrees or less of rotation. However, in one variation the sensitivity of the flow control 214A can be programmed to have finer control over the volume of water being provided by the control valve to the sprinkler. This will require an advanced user interface preferably having a graphical user interface display device allowing a user to select programming options (and also optionally program run options).

The user interface 200A can also include a "sprinkler select" switch 222A. The "sprinkler select" switch 222A allows a user to select one, from a plurality of available sprinklers, for programming or program running. For example, if the user interface 200A is used in place of (or in conjunction with) the user interface 600 (FIG. 12) for an interconnected multi-sprinkler configuration (as depicted in FIG. 12), then the sprinkler select switch 222A can be used to select which sprinkler (of sprinklers 400-X, FIG. 12) is being programmed at that time. Further, if the user interface 200A is being used in conjunction with a plurality of stand-alone sprinklers (e.g., sprinkler 400, FIG. 11), then each sprinkler can be assigned a unique identification code (by virtue of selecting the sprinkler using the sprinkler select switch 222A, and correlating the identification code with a corresponding code stored in a memory device in communication with the particular sprinkler). That is, if a user implements 2 or more stand alone sprinklers (100, FIG. 3, and/or 400, FIG. 11), then a single user interface 200A can be used to commonly program the individual sprinklers by selecting the individual sprinkler to be programmed via the sprinkler select switch 222A.

The user interface 200A can further include a sprinkler head position controller 203. The sprinkler head position controller 203 allows a user to move the sprinkler head (e.g., 108, FIG. 3) when the sprinkler (e.g., 100, FIG. 3) is being programmed for the irrigation pattern using the user interface 200A in the program mode. The sprinkler head position controller 203 can be a spring-loaded thumb switch. In one example a single click and release of the spring-loaded sprinkler head position controller 203 can cause the sprinkler head (e.g., 108, FIG. 3) to be advanced by a predetermined incremental amount (e.g., 3 degrees), but holding the sprinkler head position controller 203 in a down position can cause the sprinkler head to move forward in ever increasing speed up to a predetermined upper limit. More specifically, the sprinkler head position controller 203 can close a switch in communication with a controller (e.g., controller 184, FIG. 3), and the controller can count the time (via clock 196, for example) during which the switch is closed. If the time that the switch (in communication with sprinkler head position controller 203) is closed is less than a predetermined time (e.g., less than 200 ms), then the controller (e.g., 184, FIG. 3) is configured to direct the sprinkler head positioner (e.g., motor 121, FIG. 3) to move the sprinkler head forward by a predetermined amount (e.g., 3 degrees), as determined by the sprinkler head position determiner (e.g., 130, FIG. 3). It will be appreciated that the amount or degree of forward movement of the sprinkler head (e.g., 108) provided by a single pulse of the sprinkler head position controller 203 will be somewhat constrained by the resolution that is allowed by the sprinkler head position determiner (e.g., 130). If the sprinkler head position determiner (e.g., 130) is provided with 100 contact points, then at least a 3 degree separation can be accommodated (i.e., 360 degrees for a full circle divided by 100 contact points equals 3 degrees per contact point), and finer degrees of separation can be provided by signal processing between contact points. However, if the time that the switch (in communication with sprinkler head position controller 203) is closed is greater than a predetermined time (e.g., 200 ms or more), then the controller (e.g., 184, FIG. 3) can be configured to count the time that the switch is closed, and increase the speed of the sprinkler head positioner (e.g., motor 121, FIG. 3) up to an upper limit. For example, if the clock frequency of clock 196 (FIG. 3) is 1 MHz (thus allowing a sampling rate of 1 million samples per second), then the processor (controller, e.g., 184) can determine resolution of times up to 1 millisecond (ms). By employing commonly known time dividers within the processor (e.g., controller 184) the processor can determine the time during which the sprinkler head position controller 203 switch is held in the closed position, and thus the speed at which the sprinkler head (e.g., 108, FIG. 3) should be advanced. For example: (i) if the processor (e.g., controller 184) determines that the sprinkler head position controller 203 is held in the closed position for between 200 ms and 1000 ms, then the controller (184) can be instructed to cause the sprinkler head positioner (e.g., motor M1, FIG. 3) to move the sprinkler head (e.g., 108, FIG. 3) forward at the rate of 30 degrees every 12 seconds; (ii) if the processor (e.g., 184) determines that the sprinkler head position controller 203 is held in the closed position for between 1000 ms and 2000 ms, then the controller (203) is instructed to cause the sprinkler head positioner (e.g., motor M1, FIG. 3) to move the sprinkler head (e.g., 108, FIG. 3) forward at the rate of 60 degrees every 12 seconds; and (iii) if the processor (e.g., 184) determines that the sprinkler head position controller 203 is held in the closed position for more than 2000 ms (i.e., 2 seconds), then the then the controller (203) is instructed to cause the sprinkler head positioner (e.g., motor M1, FIG. 3) to move the sprinkler head (e.g., 108, FIG. 3) forward at the rate of 90 degrees every 12 seconds. This exemplary regimen allows a user to quickly move through areas of constant programmed irrigation (or no irrigation) by virtue of speed control provided by the sprinkler head position controller 203.

The user interface 200A can further include a direction reversing switch 231 (FIG. 18) to allow the direction of the movement of the area programmable sprinkler head (e.g., sprinkler head 108, FIG. 3) to be reversed during programming. When used in conjunction with the speed controller (203, FIG. 18) this allows a user to move backwards and make adjustments to the flow program being recorded during the programming mode.

Figure 19:
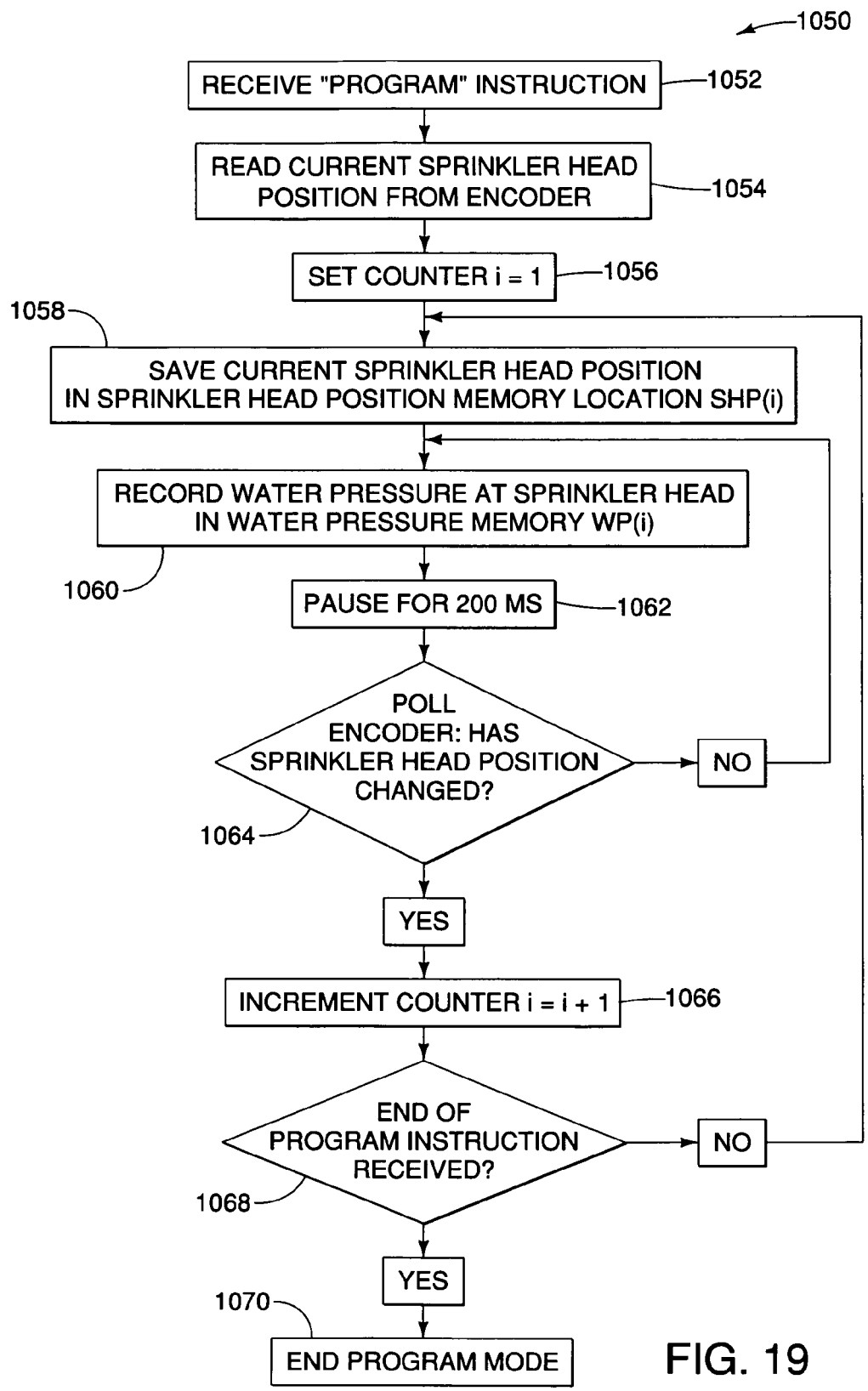
FIG. 19 is a flowchart depicting one embodiment of how the user interface of FIG. 18 can be employed with area-programmable sprinklers described herein.

Turning now to FIG. 19, a flowchart (1050) depicts one example of how the user interface 200A of FIG. 18 can be used to program an area-programmable-sprinkler, as provided for by the instant disclosure. The following description of flowchart 1050 of FIG. 19 will be made in reference to other enumerated figures, but is not intended to be limited by such references. It will further be appreciated that other processes can be implemented, and that the following description is exemplary only, and not intended to be limiting.

The process of receiving programming instructions from the user interface 200A (FIG. 18), as provided in the flowchart 1050 of FIG. 19, begins at step 1052 when the program mode switch 228A (FIG. 18) is placed in the program mode (as optionally indicated by illumination of the program indicator light 205). Receipt of the "program" instruction at step 1052 causes the sprinkler memory (e.g., 190, FIG. 3) to be placed into a record-mode in order to record sprinkler position information and corresponding sprinkler flow settings (as can be established by associated pressure readings). Specifically, at step 1054, the processor (e.g., controller 182, FIG. 3) reads the current sprinkler head position from the encoder (e.g., sprinkler head position determiner 130, FIG. 3). Then at step 1056 the controller (e.g., 182) sets a counter (in a dedicated memory location such as in memory 190) to a value of 1. At step 1058 the controller (e.g., 182) saves the current sprinkler head position in a sprinkler head position (SHP) memory location SHP(i), with the letter "i" indicating one of a plurality of memory locations allocated for storing sprinkler head positions. For example, if the position determiner (e.g., 130, FIG. 3) allows for 120 different discrete positions to be determined, then 120 different memory locations can be allocated (e.g., in memory 190) such that the value of "i" will range from 1 to 120. At step 1060 the controller (e.g., 182) saves (i.e., records) the water pressure at the sprinkler head (e.g., by polling the pressure determiner (e.g., flow detector 194, FIG. 8, or pressure sensor 494, FIG. 11) into a memory location "WP(i)" (e.g., in memory 190, FIG. 3). As discussed above with respect to the saving of sprinkler head positions in sprinkler head position memory locations SHP(i), the water pressure memory locations WP(i) can have an equal number of memory locations allocated as for the sprinkler head positions. For each sprinkler head position "i" stored in memory locations SHP(i), a corresponding water pressure reading can be stored in a water pressure memory location WP(i). Thus (for example), for 120 different sprinkler head memory positions SHP(i), there can be an equal (and correlated) number of water pressure readings. The one-to-one correlation of the sprinkler head positions (as recorded in memory locations SHP(i)) and the water pressure readings (as recorded in memory locations WP(i)) allows the controller (e.g., 184, FIG. 3) to replay the recorded sprinkling program, as described further below. As an alternative to recording water pressure information at step 1060, water flow data (as measured proximate the sprinkler nozzle, e.g., 110, FIG. 3) can be stored in the allocated memory locations. Flow information (including pressure information) can be obtained from flow determiner 194, FIG. 8, and/or 494, FIG. 11.

At step 1062 the controller (e.g., 184, FIG. 3) pauses for a prescribed period of time (e.g., 200 ms, or ⅕ of a second) before proceeding to step 1064. This pause can be accomplished by the controller counting clock pulses (e.g., from clock 196). For example, if clock 196 is running at 1 KHz (i.e., 1 thousand pulses or cycles per second), then the controller can count 200 clock pulses (being equal to 200 ms) before proceeding to step 1064. The pause at step 1062 allows the controller (e.g., 182) to make a discrete determination (i.e., to save in memory locations SHP(i) and WP(i)) the current sprinkler head position and water pressure for the given (i.e., currently recorded) sprinkler head position prior to any forward movement of the sprinkler head. The pause at step 1062 also allows the sprinkler head positioner (e.g., motor 122, FIG. 3) time to advance the sprinkler head (e.g., 108) to the next position, and also reduces the sampling rate of the position determiner (130) and the flow detector (194, FIG. 8), thus reducing power consumption. At step 1064 the controller (e.g., 184, FIG. 3) polls the position determiner (e.g., rotary encoder 130, FIG. 3) to determine if the position of the sprinkler head has changed since the last recorded position. For example, the controller 184 can poll the rotary encoder 130 for the current position, and then compare this current position with the last-most recorded sprinkler head position recorded in memory SPH(i). If the result of the poll at step 1064 is "NO" (i.e., the sprinkler head position has not changed since the last recorded sprinkler head position), then control reverts to step 1060 to record the current water pressure at the sprinkler head. During this time the user can be adjusting the water flow to the sprinkler head (111, FIG. 3). This process continues until a determination is made at step 1064 that the sprinkler head position has changed (as determined by polling the position determiner or encoder 130). Once the controller determines (by a "YES" response) that the sprinkler head position has changed, then at step 1066 the counter (see step 1056), along with the sprinkler head position memory location SHP(i) and the water pressure memory location WP(i), are incremented by a value of one.

At step 1068 the controller (e.g., 184, FIG. 3) polls the program switch (228A, FIG. 18) to determine whether or not an "End of Program" instruction has been received. If the answer to this polling is "YES", then at step 1070 the programming mode of the sprinkler is terminated. However, if no "End of Program" instruction has been received (as based on the poll at step 1068), then the program reverts to step 1058 to save the current sprinkler head position and continue recording sprinkler head positions and corresponding flow values (as determined e.g., per the rotary encoder 430 and the pressure sensor 494 of FIG. 11).

In a run-mode of the program recorded by user interface 200A (per the example of FIG. 19, discussed immediately above), a user can press the "RUN" button 226A. This can cause the controller (e.g., 184, FIG. 3) to set a run-mode counter to a value of 1 (as established in memory 190), and then to read the sprinkler head position from memory SHP(1), and also read the corresponding water pressure for this sprinkler head position from water pressure memory location WP(1). The controller (e.g., 184, FIG. 3) can then cause the water flow control valve (e.g., 172, FIG. 3) to be adjusted (e.g., via control valve positioner 174) in order to achieve the flow of water to the sprinkler head (e.g., 108, FIG. 3) as determined by the corresponding water pressure setting (as recorded in memory WP(i)) for the sprinkler head position SHP(i). When the run-mode counter (e.g., in memory 190) is incremented (for the next sprinkler head position, as determined by polling of the encoder 130, and based on the sprinkler motor M1, FIG. 3 operating in a run-mode configuration), then the controller (e.g., 184) can read the next corresponding flow value (e.g., pressure reading) from the memory WP(i), and adjust the flow (via the control valve positioner 174, FIG. 3) in order to achieve the desired flow for the corresponding sprinkler head position.

In one variation, rather than using a dedicated user interface device (e.g., 200 or 200A), the user interface can be provided on a display screen of a handheld user device such as a smart phone, a tablet device, and/or a laptop computer. Such handheld user devices include a processor (e.g., similar to controller 184, FIG. 3), a clock (e.g., similar to clock 196), memory (e.g., similar to memory 190), and a communication port (e.g., similar to port 209, FIG. 18), all of which allow the handheld user device to perform the same functions as a dedicated user interface device. The handheld user device can be provided with a program or application which displays a user interface (which can be graphically similar to the user interface depicted in FIG. 4, for example). The graphical user interface can be displayed on a touch-screen (or a mouse-controlled screen), thus allowing the user to provide the inputs necessary to program the area-programmable sprinkler. The handheld user device can further allow the user to input or obtain a plan view of the area to be irrigated, and to plan an irrigation regimen for the area. For example, the user can obtain a plan view of the area to be irrigated from a satellite image which is available from one of several internet websites. In yet another variation the user can use a handheld GPS device to determine the dimensions and shape of the area to be irrigated by walking the perimeter of the area while recording the path using the GPS device. This recorded path can then be transferred to a handheld user device, or a user computer, and the user can then plan the irrigation regimen to be provided using the area programmable sprinkler or sprinklers. Such can be particularly beneficial when planning the installation of multiple area programmable sprinklers for large complex areas to be irrigated such as golf courses or municipal parks.

Figure 20:
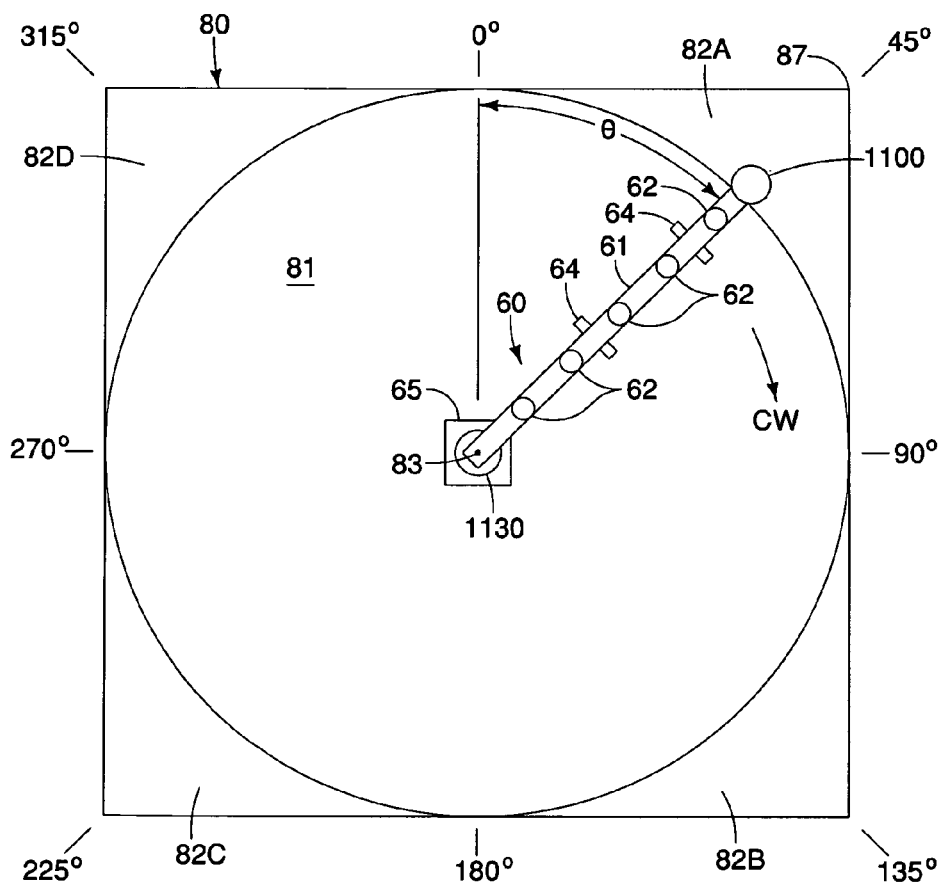
FIG. 20 is a plan view of a center pivot irrigation system and including an area programmable sprinkler that can be used therewith.

In yet another variation, the area-programmable sprinkler can be used in conjunction with existing agricultural sprinklers to allow arable land to be planted (and irrigated) that would otherwise go unplanted. In one specific implementation, the area-programmable sprinkler can be used in conjunction with a center-pivot irrigation sprinkler. FIG. 20 is a plan view of a center-pivot sprinkler 60, depicted in a simplified drawing. The center pivot sprinkler system 60 includes a sprinkler arm 61 which pivots about a center point 83. The sprinkler arm 61 is typically fabricated from water pipe, and thus the sprinkler arm defines a water conduit. The sprinkler arm 61 is provided with sprinkler heads 62 which receive water from the water conduit formed in (or, alternately, supported by) the sprinkler arm to irrigate the area around the arm 61. The sprinkler arm 61 is supported on the ground by wheels 64 or the like. The center pivot sprinkler 60 includes a motive source 65 (such as a motor) which causes the sprinkler arm 61 to move around the center point 83. (Typically the motive source is applied at the wheels 64, but is depicted in FIG. 20 as being centrally located merely for convenience of depiction. More commonly, the motive source 65 is a driven wheel located proximate the distal end of the sprinkler arm 61 (i.e., distal from pivot point 83).) Thus, the center pivot sprinkler 60 can irrigate the circle 81, while leaving areas 82A-D unirrigated. As can be appreciated, when a large number of center pivot sprinklers 60 are used in conjunction, regardless of how the sprinklers are positioned (other than by providing overlapping spray, which is undesirable), then a significant amount of potentially arable land goes unirrigated. If the entire square area 80 can be irrigated, then center pivot sprinklers can be arranged side by side such that the areas 82A-B can also be planted. This not only allows maximal use of the arable land, but can also simplify planting, spraying and harvesting of crops since areas 80 can be laid out in contiguous squares with common sides. By applying an area programmable sprinkler 1100 to the end of the sprinkler arm 61, the areas 82A-D can also be irrigated. While it is known to apply a sprinkler head to the end of a center pivot sprinkler arm, such end sprinklers are not programmable, and only increase the diameter of the circle 81 in a general overall sense, thus still leaving corner areas 82A-D unirrigated. The area programmable sprinkler 1100 alleviates that problem.

The case of using an area programmable sprinkler 1100 in conjunction with a center pivot irrigation sprinkler 60 is a special case, and allows certain simplification of the area programmable sprinkler 1100 over other area programmable sprinklers described herein. Firstly, in the case of a center pivot sprinkler 60, a motive source (65) is already provided, so the area programmable sprinkler 1100 does not need a separate self-contained motor (e.g., motor 121, FIG. 3) in order to move the area programmable sprinkler 1100 past areas 82A-D. Secondly, in the case of a center pivot sprinkler 60, the entire area 80 to be irrigated is almost always a square, having an inscribed circular area 81 which is irrigated by the center pivot sprinkler 60 (sans the area programmable sprinkler 1100). That is, the center pivot sprinkler 60 irrigates the circular area 81, while the area programmable sprinkler 1100 irrigates the corner areas 82A-D. As can be seen from FIG. 20, this geometry allows for four repeating, essentially identical, cycles of the area programmable sprinkler 1100 in order to cover the four corner areas 82A-D. Thus, when the sprinkler arm 61 is located at the zero degree position (as indicated on FIG. 20), the area programmable sprinkler 1100 provides zero flow. As the sprinkler arm 61 moves clockwise from the zero degree position to the 45 degree position, flow to the area programmable sprinkler 1100 is increased to irrigate area 82A, with the maximum flow being provided when the sprinkler arm is located at the 45 degree position. Then, as the sprinkler arm moves from the 45 degree position to the 90 degree position, flow to the area programmable sprinkler 1100 is reduced from the maximum flow (provided at the 45 degree position) to zero flow (at the 90 degree position). This cycle continues to repeat for the other three corner areas 82B-D. Further, the rate of increase of flow to the area programmable sprinkler 1100 between the zero degree position and the 45 degree position is the exact opposite of the rate of decrease of flow to the area programmable sprinkler 1100 between the 45 degree position and the 90 degree position. The rate of flow increase to the area programmable sprinkler 1100 between the zero degree position and the 45 degree position can be determined from trigonometry since the overall area 80 is a square, and the area programmable sprinkler 1100 moves in a circular path within the square. Thus, by knowing where the zero degree position is located, and by knowing the flow of water to be provided by the area programmable sprinkler 1100 at the 45 degree position, it is possible to program the area programmable sprinkler 1100 in a simplified manner over other embodiments of the area programmable sprinkler disclosed herein. One example of programming and running the area programmable sprinkler 1100 will be described below.

Figure 21:
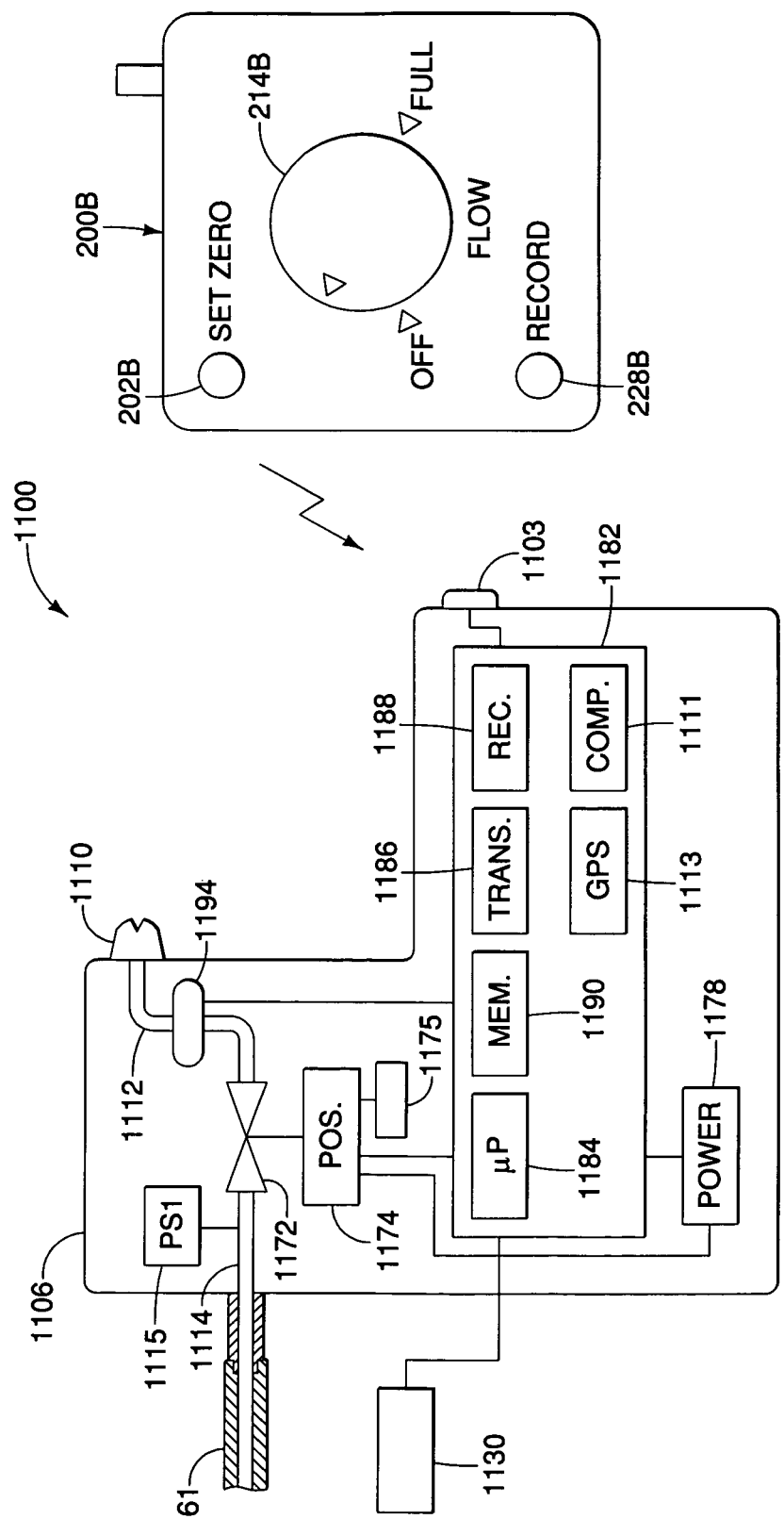
FIG. 21 is a schematic view of an area programmable sprinkler used with the center pivot irrigation system of FIG. 20.

Turning now to FIG. 21, one example of the area programmable sprinkler 1100 which can be used with a center pivot irrigation system 60 (FIG. 20) is depicted in a schematic view. The area programmable sprinkler 1100 includes a main water supply conduit 1114 which can be connected to the water supply provided by the center pivot sprinkler arm 61. The various components of the area programmable sprinkler 1100 can be contained within, or supported on, a housing 1106. The area programmable sprinkler 1100 includes a spray nozzle (or end nozzle) 1110, a spray nozzle (or end nozzle) water conduit 1112, and a flow control valve 1172 placed in-line between the main water supply conduit 1114 and the spray nozzle water conduit 1112. The control valve 1172 is provided with a control valve positioner 1174, and a flow control valve position determiner 1175 can be placed in communication with the control valve positioner 1172. The control valve position determiner 1175 can be used to determine the position of the control valve positioner 1174 and to communicate this information to the sprinkler controller 1182 (described more fully below). A flow determining device 1194 can be provided to the spray nozzle water conduit 1112. The flow determining device 1194 can be any device which is configured to measure, sense or detect the flow of water (or a variable related thereto) flowing through the end nozzle conduit 1112. For example, the flow determining device 1194 can be one of the following: an orifice plate; an inline impeller; or a pressure sensor. (In the case where the flow determining device 1194 is a pressure sensing device, it will be appreciated that in a water conduit (e.g., sprinkler nozzle water conduit 1112) containing flowing water, detected pressure of flowing water, as compared against shut-off pressure of water in the conduit, is indicative of water flow. That is, water flow can be calculated based on measuring water pressure.) The area programmable sprinkler 1100 further includes a power supply ("POWER") 1178. The power supply 1178 can be a separate battery, or it can be connected to an electrical power supply which is provided to the center pivot sprinkler 60. In one variation the power supply 1178 can be a battery which can be recharged by solar cells (i.e., photovoltaic cells, not shown) supported by the center pivot sprinkler 60. The area programmable sprinkler 1100 further includes a position determining device to allow a determination to be made (during programming and during a run mode) of the direction in which the end nozzle 1110 is oriented. One example of a position determining device is a rotary encoder 1130 which can be placed at the pivot point 83 of the center pivot sprinkler (as shown in FIG. 20).

The area programmable sprinkler 1100 of FIG. 21 can further include a control section 1182. Control section 1182 can include the following components: a controller or processor 1184 (indicated by the symbol "μP", such as a microprocessor); a memory device ("MEM.") 1190; a transmitter ("TRANS.") 1186; a receiver ("REC.") 1188; an electronic digital compass ("COMP.") 1111; and a GPS (or Global Positioning System) unit 1113. The area programmable sprinkler 1100 can further include a communication port 1103 (such as a wireless communication port). The various interactions of the components of the control section 1182 will be described below.

A user control device 200B can be provided to allow communication between a user and the area programmable sprinkler 1100 during a programming or set-up mode. The user control device 200B can be placed in wireless communication with the control section 1182 of the area programmable sprinkler 1100 via the communication port 1103 and the receiver 1188. The user control device 200B can include a "SET ZERO" control 202B, which can be used to record a zero degree position (as depicted in FIG. 20) for the area programmable sprinkler 1100. The user control device can further include a flow adjustment control 214B (which can be implemented as a rotary dial, in the manner of flow adjustment control 214A described above with respect to FIG. 18), and a "RECORD" control 228B to allow the user to record the desired flow (as will be described further below).

The components of the control section 1182 of the area programmable sprinkler 1100 of FIG. 21 interact as follows. Processor (or controller) 1184 regulates communications (inputs and outputs) between the various other components of the area programmable sprinkler 1100, such as (and by way of example only): storing and retrieving data and instructions in the memory device 1190; calculating the current position of the area programmable sprinkler 1100 based on an input from a position determining device (e.g., rotary encoder 1130); and executing a run mode program stored in the memory 1190 (as described below). The memory device 1190 stores temporary information (such as the current position of the area programmable sprinkler 1100), as well as non-temporary information (such as the program for adjusting the position of the control valve 1172 via the control valve positioner 1174 based on the current sprinkler position). The receiver 1188 can be configured as a wired or wireless receiver to receive inputs from the communication port 1103, and the transmitter 1186 can be can be configured as a wired or wireless transmitter to transmit outputs via the communication port 1103. The control of the receipt and/or transmission of signals from the receiver 1188 and transmitter 1186 can be performed by the processor 1184.

As indicated above, the position determining device of the area programmable sprinkler 1100 allows a determination to be made of the direction in which the nozzle 1110 is oriented, which is also indicative of the position of the end nozzle 1110 within the circle 81 (FIG. 20). The rotary encoder 1130 of FIG. 21 was described as one possible position determining device. In a first variation, the position determining device can be the electronic (digital) compass 1111. Electronic compasses are known (e.g., as provided in most current GPS units), and can detect direction using, for example, a fiber optic gyrocompass or a magnetometer. Thus, a user can establish a zero degree direction (or any other direction) based on an output from the electronic compass 1111, and subsequent outputs from the compass 1111 can be used to determine the direction in which the nozzle 1110 of the area programmable sprinkler 1100 is directed or oriented. In a second variation, the position determining device can be the global positioning system ("GPS") unit 1113. GPS units (in combination with augmentation systems) can currently determine the position of a GPS unit (and thus, the position of the area programmable sprinkler 1100) within a few centimeters. This level of accuracy is more than sufficient for crop irrigation. Thus, a user can record a GPS position as a zero degree position, and subsequent GPS signals can determine the position of the area programmable sprinkler 1100 with reasonable accuracy. In a third variation the position determining device can include in-ground sensors to determine the position of the end of the sprinkler arm 61 (i.e., the position of the area programmable sprinkler 1100). In a fourth variation the position determining device can include rotary encoders placed on the wheels (e.g., 64, FIG. 20) which support the sprinkler arm 61 in order to determine the number of wheel rotations which correspond to distance traveled and thus a particular position.

Figure 22:
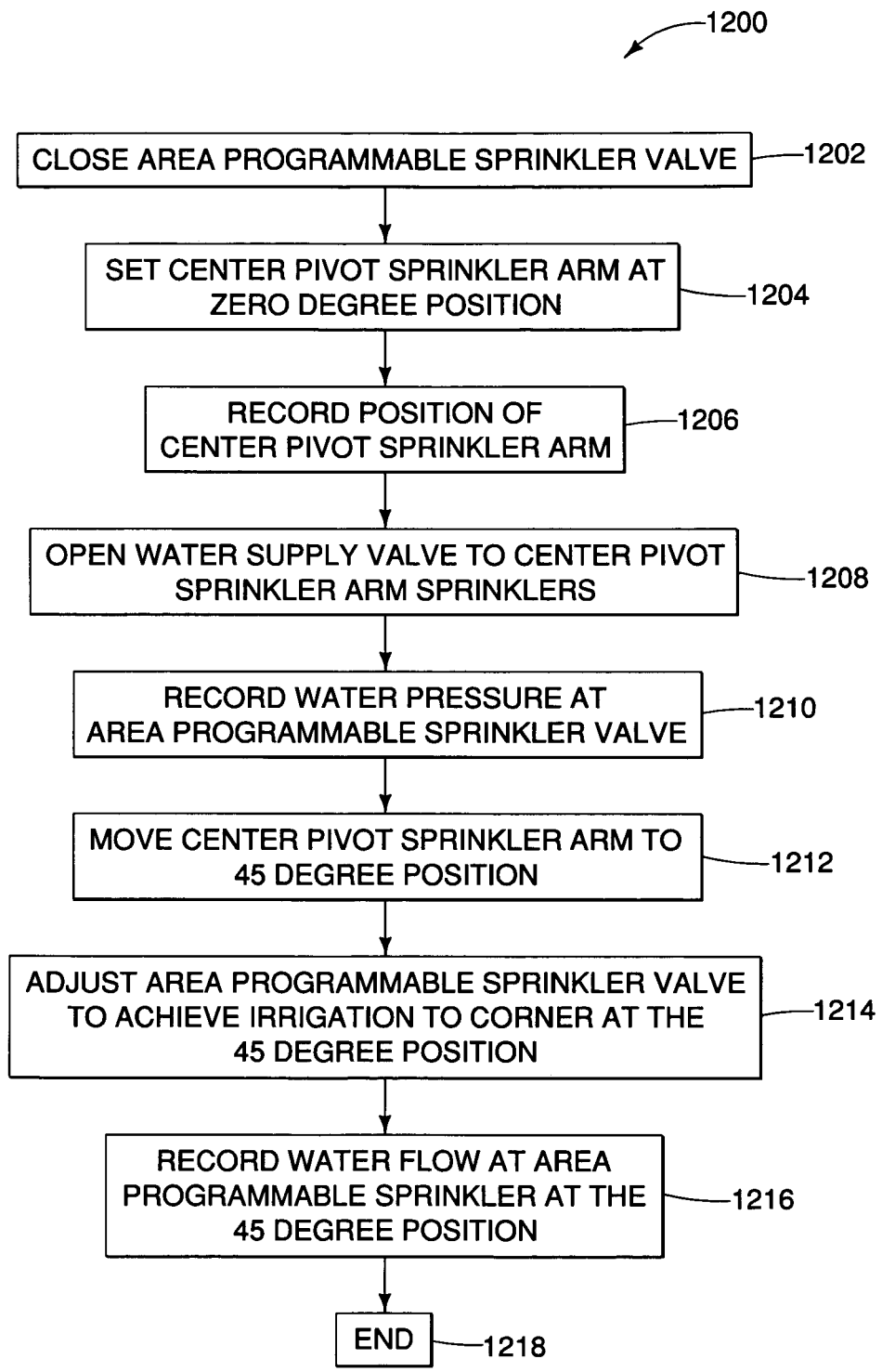
FIG. 22 is a flowchart depicting one method of programming the area programmable sprinkler used with the center pivot irrigation system of FIG. 20.

Turning now to FIG. 22, a flowchart 1200 depicts one exemplary method for programming the center-pivot based area programmable sprinkler 1100 of FIGS. 20 and 21. At step 1202 the area programmable sprinkler control valve 1172 (FIG. 21) is placed in a closed position. This can be accomplished by moving the flow control dial 214B of the user control device 200B (FIG. 21) to the "OFF" position. At step 1204 (FIG. 22) the center pivot irrigation sprinkler arm (61, FIG. 20) is positioned to the desired zero degree position (as indicated in FIG. 20). This can be accomplished by the user actuating the motive source 65 (FIG. 20) to move the sprinkler arm 61 to the desired zero degree position. At step 1206 (FIG. 22) the zero degree position of the center pivot sprinkler arm 61 is recorded. This can be accomplished by reading the then-current position from the position determining device (e.g., rotary encoder 130, electronic compass 1111, or GPS unit 1113, FIG. 21), and then pressing the "SET ZERO" control 202B on user control device 200B. This zero degree position, as determined by the position determining device, is then saved in the memory device 1190 (FIG. 21). At step 1208 (FIG. 22) the user opens the water supply valve (not shown) to the center pivot sprinkler arm sprinklers (62, FIG. 20). This can be accomplished by manually opening the center pivot water supply valve. At step 1210 (FIG. 22) the water pressure provided to the main water conduit 1114 of the area programmable sprinkler 1100 can be recorded (and saved to memory device 1190) using pressure sensor ("PS1") 1115. This step (1210, FIG. 22) records the water pressure at control valve 1172 (at main water conduit 1114) of the area programmable sprinkler 1100 when the control valve is in the closed position, and the recorded pressure can thus be assigned the designation "$P_{max}$", i.e. the maximum water pressure (and thus the minimum water flow) for water provided to the nozzle 1110. At step 1212 (FIG. 22) the user moves the center pivot sprinkler arm (61, FIG. 20) to the 45 degree position (FIG. 20). This can be accomplished by the user actuating the motive source 65 (FIG. 20) to move the sprinkler arm 61 to the desired 45 degree position. Once the sprinkler arm 61 (and thus, the area programmable sprinkler 1100) are positioned at the 45 degree position, then at step 1214 (FIG. 22) the user adjusts the flow control valve (1172) to achieve irrigation to the corner (87, FIG. 20). This adjusting of flow to achieve irrigation at the corner 87 can be accomplished using the flow control 214B of the user control device 200B of FIG. 21. At this point the flow of water to the nozzle 1110 (FIG. 21) will be at the maximum flow necessary to achieve irrigation to the corner 87 of area 82A, and thus the water pressure at the nozzle will be at its minimum, and can thus be assigned the designation "$P_{min}$", i.e. the minimum water pressure (and thus the minimum water flow) for water to be provided to the end nozzle 1110 (FIG. 21) in order to achieve the desired irrigation. At step 1216 the flow of water being provided to the area programmable sprinkler 1100 at the 45 degree position is recorded. This can be accomplished by measuring and saving to the memory device 1190 (FIG. 21) a detected flow measurement parameter, as determined and detected by the flow determining device 1194 (FIG. 21). Such a detected flow measurement parameter can include a measurement of the flow itself (e.g., by using a flow meter), or a measurement of a related parameter (such as pressure in the nozzle water conduit 1112). The recording to memory device 1190 of the detected flow measurement parameter at the 45 degree position (as determined by flow determining device 1194) can be accomplished by the user pressing the "RECORD" control 228B on the user programming device 200B (FIG. 21). After recording the flow parameter for the maximum flow to be issued from the sprinkler end nozzle 1110 (FIG. 21) of the area programmable sprinkler 1100 at the 45 degree position, the programming is thus ended at step 1218.

Figure 23:
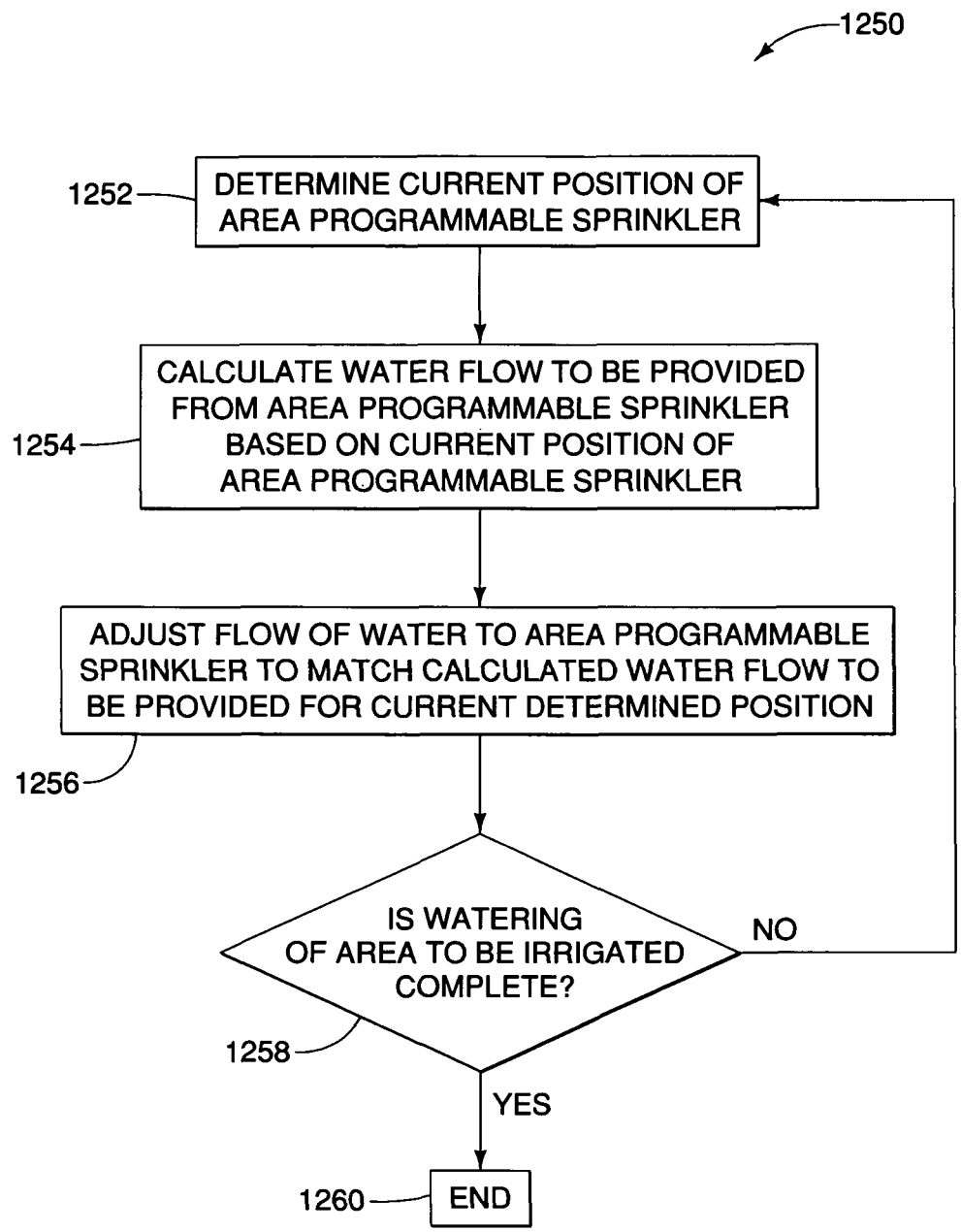
FIG. 23 is a flowchart depicting a run mode program that can be used with the center pivot irrigation system of FIG. 20.

FIG. 23 is an exemplary run-mode program flowchart 1250 for running an irrigation program for the center pivot area programmable sprinkler 1100 of FIGS. 20 and 21. At step 1252 a determination is made as to the current position of the area programmable sprinkler 1100 (corresponding to the end of sprinkler arm 61, FIG. 20). This determination can be made by the controller (1184, FIG. 21) polling the position determining device (e.g., rotary encoder 1130, electronic compass 1111, or GPS unit 1113), and the determined position can be temporarily saved in the memory device 1190. At step 1254 (FIG. 23) the water flow to be provided from the area programmable sprinkler 1100 is calculated based on the then-current determined position of the area programmable sprinkler 1100. The method for calculating the water flow to be provided at step 1254 (FIG. 23) is described more fully below. In any event, the calculated water flow to be provided from the area programmable sprinkler 1100 based on the then-current determined position of the area programmable sprinkler 1100 is temporarily stored in the memory device 1190 (FIG. 21). At step 1256 (FIG. 23) the flow of water to the end nozzle (1110, FIG. 21) of the area programmable sprinkler 1100 is adjusted to match the calculated water flow (as determined in step 1254, FIG. 23) for the then-current determined position of the area programmable sprinkler 1100 (as determined in step 1252). This can be accomplished by the processor (1184, FIG. 21) sending control signals to the control valve positioner (1174), and ascertaining that the correct control valve position has been set as determined by the control valve position determiner 1175. Step 1256 can further include an internal step for checking the pressure of water within the end nozzle conduit 1112 (e.g., using the pressure sensor 1194), comparing the actual pressure against the desired pressure, and adjusting the control valve positioner 1174 to achieve the desired pressure. This can accommodate pressure changes within the main water supply conduit 1114. At step 1258 of flowchart 1150 (FIG. 23), a query is made as to whether or not the watering of the area to be irrigated (typically, area 80, FIG. 20) is completed. This determination can be based on a timer (not shown) which determines how long the center pivot irrigation system 60 (FIG. 20) is to provide irrigation to the intended area of irrigation (80). If the answer to the query at step 1258 (FIG. 23) is "YES" (i.e., the watering of the area to be irrigated is completed), then at step 1260 the irrigation program is terminated. However, if the answer to the query at step 1258 is "NO" (i.e., the watering of the area to be irrigated has not been completed), then control reverts to step 1252.

In general, the water to be emitted from the area programmable sprinkler 1100 (and end nozzle 1110, FIG. 21) can be programmed in the same way as described herein above for other versions of the area programmable sprinkler—i.e., a user observes the spray pattern (typically, spray distance) of water coming from the end nozzle 1110, and adjusts the spray (e.g., using the user remote device 200B) in order to get water to the corners (e.g., corner 87, FIG. 20) of the area 80 to be irrigated. The flow of water to the area programmable sprinkler 1100 (FIGS. 20 & 21) associated with the various sprinkler positions (as determined by the sprinkler position determiner (e.g., rotary encoder 1130, electronic compass 1111, or GPS unit 1113, FIG. 21) can be recorded (i.e., saved in memory device 1190), and then used by the processor (1184) to adjust the control valve (1172) to achieve the desired water flow parameters to the sprinkler head 1110 during operation.

As indicated above, in a center pivot irrigation system (e.g., 60, FIG. 20) the preferred area to be irrigated (i.e., area 80, FIG. 20) is typically a square area, and thus it is easy to calculate the distance the end nozzle (1110, FIG. 20) needs to spray water in order to achieve irrigation out to the corners (e.g., corner 87) or, alternatively, to determine the water pressure needed to achieve watering of the corners. More specifically, when the sprinkler arm 61 is located at the four 90 degree positions (i.e., zero degrees, 90 degrees, 180 degrees and 270 degrees), no flow of water is provided to (or from) the area programmable sprinkler 1100. Between the 90 degree positions, the flow varies from zero flow (at the first 90 degree position) to maximum (at the first 45 degree position), and then back to zero at the next 90 degree position. During set-up (or programming, as per flowchart 1200, FIG. 22) the user can use the user control device (200B, FIG. 21) to adjust the flow (e.g., via the flow control 214B) at only one of the 45 degree intermediate positions (i.e., the 45 degree position, the 135 degree position, the 225 degree position, or the 315 degree position). The processor (1184) can then record (in memory device 1190) the water flow (via measured, detected, determined, calculated or associated means) to the end nozzle 1110 for this 45 degree intermediate position. In the case where water pressure is recorded as a measure of pressure, this will be the minimum water pressure ($P_{min}$) applied to the end nozzle 1110, and corresponds to the maximum flow needed to reach the corner 87 (FIG. 20). The processor 1184 (FIG. 21) can also automatically record (in the memory device 1190) the water pressure when the flow control valve 1172 is in the fully closed position (i.e. maximum water pressure $P_{max}$). (That is, water pressure is maximum when flow to the area programmable sprinkler 1110 is zero, and pressure at the end of the fluid conduit formed by the sprinkler arm 61 is lowest (for the irrigation pattern) when the control valve 1172 is at the open position needed to achieve irrigation at the corner 87, FIG. 20.) Assuming that water flow to the nozzle 1110 is based on water pressure readings (as determined by the flow detector 1194 when the device 1194 is a pressure sensor), the processor 1184 can then calculate the pressure settings for all of the other angular positions of the area programmable sprinkler 1100 (and nozzle 1110) based on the following formula:

$$P_\Theta = P_{min} + ((P_{max} - P_{min}) \cdot (1 - \tan\Theta)) \quad \text{(Equation 1)}$$

where $\Theta$ (as depicted in FIG. 20) is the angular position of the sprinkler arm 61 (and thus, the area programmable sprinkler 1100) as can be determined from the position determiner (e.g., rotary encoder 130, electronic compass 1111, or GPS unit 1113, all of FIG. 21), between the angles of zero degrees and 45 degrees. (For angles beyond 45 degrees, the equation needs to be reversed, as can be accommodated by programming stored in memory 1190, FIG. 21, to count down from a value of $\tan\Theta$ at 45 degrees as being equal to 1 to a value of $\tan\Theta$ at 90 degrees as being equal to zero. Since water pressure within the fluid conduit formed by the sprinkler arm 61 is typically regulated by a pressure regulator (which forms an integral part of the center pivot sprinkler 60), the pressure at the end of the sprinkler arm when the control valve 1172 (FIG. 21) is in the closed position, (i.e., $P_{max}$) will be relatively constant, and can thus be measured with sufficient accuracy (by pressure sensor 1115, FIG. 21, for example) in order to carry out the calculation of Equation 1.

The flow control valve positioner 1174 (FIG. 21) can then be adjusted to achieve the required pressure (or flow) for each angular position of the sprinkler arm 61 (and thus the area programmable sprinkler 1100, FIG. 20) as determined by the position determiner (e.g., rotary encoder 130). Of note, in this variation, since the above formula only works for angles between zero degrees (being one of the 90 degree positions) and 45 degrees, the processor (1184, FIG. 21) can be configured to count up from zero degrees to 45 degrees as the sprinkler arm 61 (FIG. 20) moves through the first 45 degree segment (i.e., from zero degrees to 45 degrees), and then counts back down from 45 degrees to zero degrees until the sprinkler arm 61 (and thus the area programmable sprinkler 1100) is at the 90 degree position. The processor (1184) then begins again counting from zero degrees up to 45 degrees, and so on, such that the processor 1184 goes through 4 cycles of counting from 0 degrees up to 45 and back down to zero degrees. Put another way, the processor 1184 can be configured to associate the value of $\Theta$ as zero for each 90 degree position (as determined by the position determiner, e.g., rotary encoder 1130). Further, for this embodiment it is useful for the processor 1184 to know in which direction (i.e. clockwise or counter-clockwise) the center-pivot sprinkler arm 61 (FIG. 20) moves, such that on start-up of a watering cycle program the processor 1184 will be able to able to determine whether flow to the area programmable sprinkler 11000 should be increased or decreased based on the then-current position of the end nozzle 1110 at start-up. Thus, a run mode process for the area programmable sprinkler 1100 can be implemented as follows:

Determine the current position of the end nozzle (e.g., 1110) based on position information provided to the processor (e.g., 1184). (That is, determine the current absolute value of $\Theta$ (FIG. 20) within a 360 degree circle. Determining the current absolute value of $\Theta$ can be done using a rotary encoder (1130) or via other position determiners as described above and below.)

Calculate $P_\Theta$ (i.e., the water pressure to be provided to the end nozzle (1110, FIG. 21) for the current absolute value of $\Theta$. This can be done using Equation 1).

Position the control valve (1172) (using control valve positioner 1174) to achieve $P_\Theta$.

Wait for a predetermined period of time (e.g., 10 seconds) and again determine the then-current value of $\Theta$. This determination of the then-current value of $\Theta$ preferably takes into account the direction of rotation of the center-pivot sprinkler 60. That is, if the initially recorded value of $\Theta$ (upon start-up) and the subsequent (or then-current) value of $\Theta$ are based on a known direction of rotation of the sprinkler arm, it can then be determined whether flow to the end nozzle 1110 should be increased or decreased, and also the angular value (i.e., zero degrees or 90 degrees) to be assigned to either the last 90 degree position or the next 90 degree position of the end nozzle.

Repeat the immediately-above step until the end nozzle (1110) is determined to pass beyond the first-encountered 45 degree position (i.e., either 45 degrees, 135 degrees, 225 degrees or 315 degrees), at which time the calculation of $P_\Theta$ is reversed for the next 45 degrees of rotation of the sprinkler arm (61).

When the sprinkler arm (61) reaches the next 90 degree position (i.e., either zero degrees, 90 degrees, 180 degrees or 270 degrees), then set the current value of $\Theta$ equal to zero, and continue to monitor the then-current position of the sprinkler arm (61) and adjust the control valve (1172) to achieve $P_\Theta$ until the sprinkler is shut off.

In a further variation the value of $P_{min}$ can be determined by measuring the water flow to the end nozzle 1110 (using the flow determining device 1194, FIG. 21) between any of the 90 degree positions and an adjacent 45 degree position (and preferably knowing the direction of rotation of the sprinkler arm 61) by solving Equation 1 to determine $P_{min}$ or $P_{max}$ as a function of $\Theta$ (i.e., the currently measured angle), or as a function of $P_\Theta$ (i.e., the currently measured pressure (or flow) associated with position $\Theta$). For example, solving Equation 1 for $P_{max}$ as a function of $P_\Theta$ gives: $P_{max}=(P_\Theta-P_{min} \tan\Theta)/(1-\tan\Theta)$.

While the above examples generally describe providing zero flow to the center pivot area-programmable sprinkler 1100 at the ninety degree positions (i.e., zero degrees, 90 degrees, 180 degrees and 270 degrees—FIG. 20), in one variation zero flow can be provided at selected angles on either side of the ninety degree positions (e.g., within seven degrees either side of the ninety degree positions). Also, while above examples describe using the center pivot area-programmable sprinkler 1100 to irrigate all four corner areas (82A-D), if desired selected corner areas can be left unirrigated for purposes such as allowing equipment storage. Further, while FIG. 20 suggests that the zero degree position of the area 80 to be irrigated is oriented in a northerly direction, in practice any compass direction can be established as the zero degree (0°) position.

In one variation alluded to above, the rotary encoder 1130 of FIG. 21 can be replaced with an electronic compass 1111, which can be located proximate the area programmable sprinkler 1100. The compass 1111 can be provided with a digital output which can be received by the processor 1184. During installation of the area programmable sprinkler 1100 the sprinkler arm 61 (FIG. 20) can be positioned at one of the 90 degree positions (e.g., at the zero degree position) and the installer (user) can press the "Set Zero" button 202B on the user interface 200B which can be in communication with the processor 1184. The processor 1184 can then store in the memory device 1190 the compass setting corresponding to this 90 degree (or "zero degree") placement of the sprinkler arm 61 (and the area programmable sprinkler 1100). Then, as the sprinkler arm 61 (and the area programmable sprinkler 1100) move through 360 degrees of rotation, the compass settings can be provided to the processor 1184 as position indicators for the position of the end nozzle (1110) of the area programmable sprinkler 1100. The use of an electronic compass (1111) with a digital output can simplify incorporating the area programmable sprinkler 1100 into existing center pivot sprinkler systems since it eliminates the need to provide a rotary encoder (e.g., 1130, FIGS. 20 and 21).

In yet another variation, the rotary encoder 130 (FIG. 21) can be replaced with a global positioning system (GPS) unit 1113. The GPS unit 1113 can determine the position of area programmable sprinkler 1100 (and thus the approximate position of the nozzle 1110) with sufficient accuracy for agricultural uses, and for many landscape uses as well. As with the electronic compass variation described above, during installation of the area programmable sprinkler 1100, the installer can position the sprinkler arm 61 (FIG. 20) at one of the 90 degree positions (i.e., zero degrees, 90 degrees, etc.) and then press the "zero set" button 202B on the user interface 200B (FIG. 21), which is in communication with the processor 1184, to thus save the corresponding GPS position information in the memory device 1190. Then during programming of the area programmable sprinkler 1100 when the desired maximum flow is provided at the corner (i.e., one of the 45 degree positions such as corner 87, FIG. 20), the corresponding signal from the GPS unit 1113 is recorded in the memory device 1190. The processor 1184 can then associate the recorded GPS signals with the zero degree position and first 45 degree position. The GPS unit 1113 can then be used thereafter to determine the approximate position of the end nozzle 1110 through the remaining 315 degrees of rotation of the sprinkler arm 61 and, knowing the associated positions for the first 90 degree (or zero degree) position and the first 45 degree position, can determine the associated angular position (i.e., $\Theta$ in the above discussion) of the end nozzle, and thus the water flow (or water pressure) to be applied to the nozzle 1110 for the associated GPS-determined position of the nozzle. Further, most GPS units include the capability to determine compass headings, and thus a compass heading reading from the GPS unit 1113 can be used to supplement the GPS-determined position information. As discussed above with respect to the electronic compass variation, the GPS unit variation allows for easy retrofit of existing center-pivot sprinklers.

It will be appreciated that a significant difference between the area programmable sprinkler 1110 (FIGS. 20 and 21), which is primarily intended for use with a center pivot irrigation system (60, FIG. 20), and the area programmable sprinklers 100 (FIG. 3) and 400 (FIG. 11), is that the area programmable sprinkler 1110 itself moves through a circular arc (81, FIG. 20). This is in contrast to the area programmable sprinklers 100 and 400 which are stationary (other than for movement of the associated sprinkler heads 108 and 408, respectively, which move rotationally with respect to the sprinklers themselves). That is, area programmable sprinklers 100 and 400 are essentially stationary with respect to the surrounding environment, whereas area programmable sprinkler 1110 moves with respect to the surrounding environment. Thus, by determining the current position of the area programmable sprinkler 1110 with respect to the surrounding environment, the water flow to be provided to the area programmable sprinkler 1110, in order to achieve a predetermined irrigation regimen, can be determined (as described above).

In yet another variation of the area programmable sprinkler 1100, if the processor 1184 (FIG. 21) is initially provided with the length of the center pivot sprinkler arm 61 (i.e., the distance from the pivot point 83 to the sprinkler 1110, as depicted in FIG. 20), then the processor can calculate the distance that the end nozzle (1110, FIG. 21) needs to spray at any given position (based on the position determining device, such as rotary encoder 1130). Based on trigonometry, the maximum distance the area programmable sprinkler 1100 will need to spray is 0.41 times the length of the sprinkler arm 61, and this will be at the corners (or 45 degree positions—i.e., 45 degrees, 135 degrees, 225 degrees and 315 degrees). Further, if the spray characteristics of the spray nozzle 1110 are known (i.e., spray distance as a function of water pressure supplied to the nozzle 1110), which can be determined by measuring the performance of the nozzle 1110 in a testing environment), then no programming of the area programmable sprinkler 1100 at all needs to be done (other than setting the zero degree position in the memory device 1190, as discussed above). Further, since a large number of center pivot irrigation systems are placed with the zero degree position pointing north, a GPS unit (e.g., 1113, FIG. 21) can determine the zero degree position without the need of user intervention. Additionally, since a global positioning system (e.g., 1113, FIG. 21) is easily capable of determining the current location of an area programmable sprinkler 1110 with respect to the surrounding environment, and with a resolution of at least 10 meters, the GPS unit (1113) provides a desirable position determining device for center pivot irrigation applications. More specifically, since a standard length for a center pivot sprinkler arm 61 (FIG. 20) is around 400 meters, and thus the distance between the distal end of the sprinkler arm 61 and a corner (e.g., corner 87, FIG. 20) is therefore about 285 meters, achieving a resolution of 10 meters or less (by use of the GPS unit 1113) for irrigation of the corner areas (82A-D) allows for an error margin (i.e., over-spray or under-spray) of the corner areas of less than five percent.

The current disclosure further includes a method for retrofitting an existing center pivot crop irrigation system (e.g., 60, FIG. 20) with an area programmable sprinkler 1100 in order to achieve irrigation of arable portions of land (e.g., corner areas 82A-D, FIG. 20) which cannot be otherwise achieved using current art center pivot irrigation methods.

Figure 24:
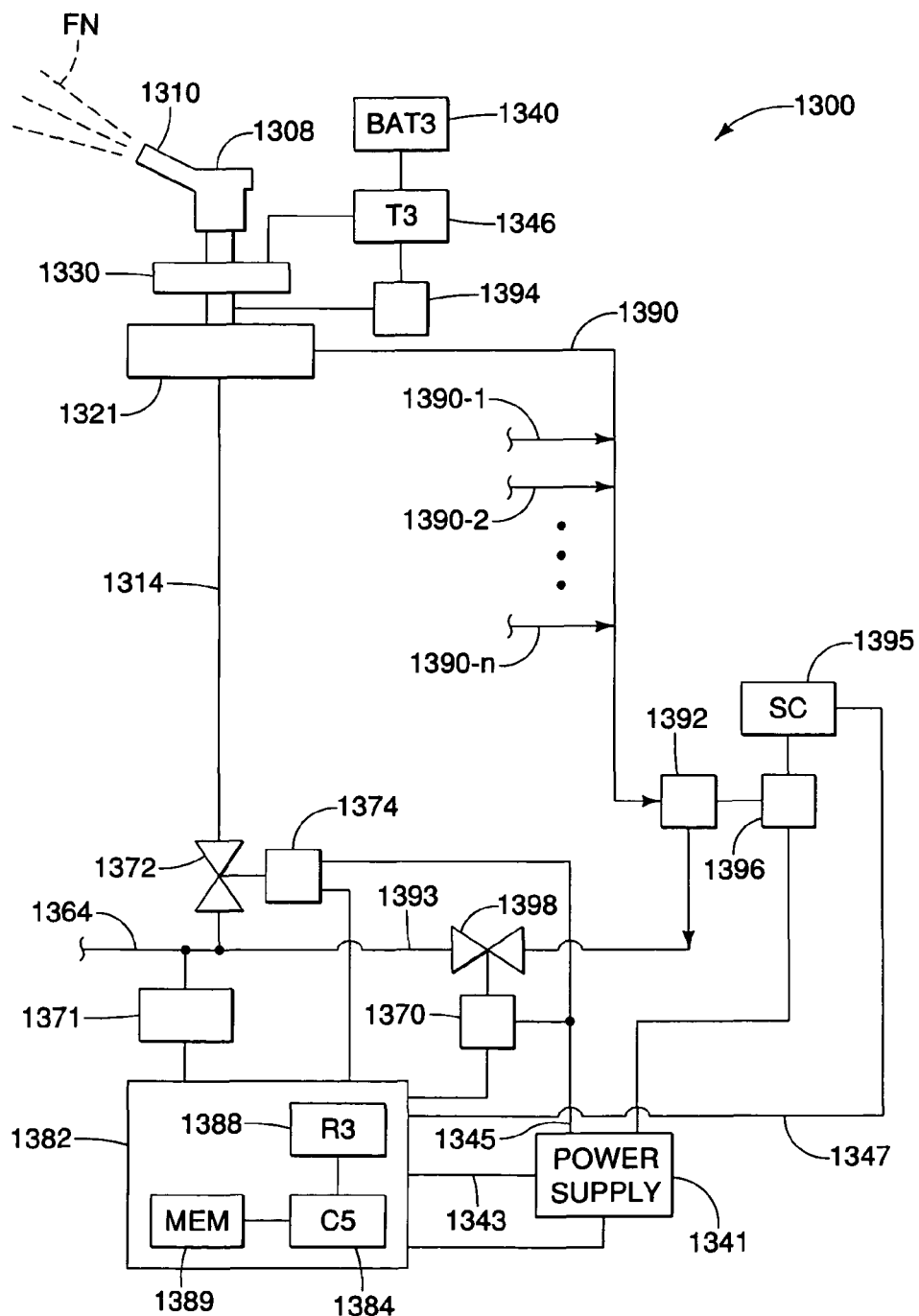
FIG. 24 is a schematic diagram depicting a variation of the area programmable sprinkler using a water motor with water return.

Referring now again to the area programmable sprinklers which remain stationary with respect to their surroundings (other than for rotation of the sprinkler head), as described above, the sprinkler head positioner 121 (FIG. 3), which serves to cause the sprinkler head 108 to rotate, can be an electric motor or a water motor. (Other types of drive systems can also be used.) The advantages of an electrical motor were also described above—specifically, the ability to maintain a constant rotational speed of the sprinkler head 108 regardless of water flow being provided to the nozzle 110, and the ability to continue to move the sprinkler head even when no water flow is being provided to the nozzle. However, an electric motor requires a source of electrical power, such as a battery or a hard-wired electrical supply. In certain instances it may therefore be desirable to provide a water motor as the sprinkler head positioner to thus eliminate the need for electrical power to drive the sprinkler head positioner. One such configuration wherein a water motor is used as the sprinkler head positioner will now be described with respect to FIG. 24. FIG. 24 is a schematic diagram of an area programmable sprinkler system 1300 having a sprinkler head 1308, a water motor sprinkler head positioner 1321 to move the sprinkler head in a rotational manner, and a water recirculation system (not specifically numbered) to recirculate water from the water motor 1321 into the sprinkler water supply line 1314. More specifically, the area programmable sprinkler system 1300 includes (at the sprinkler head 1308) the following components: a nozzle 1310; a sprinkler head position determining device 1330 (which can be similar to any of the sprinkler head position determining devices described above); a water flow determining device 1394 (such as a pressure sensor or a flow measuring device) for determining the amount of water being provided by the sprinkler head water supply conduit 1314 to the nozzle 1310; a transmitter ("T3") for transmitting the sprinkler head position (as determined by the sprinkler head position determining device 1330), and the information from the flow determining device 1394, to the controller 1382; and a power supply 1340 (depicted here as battery "BAT3") to drive the transmitter T3. It will be appreciated that the power supply 1340, which is used to drive the transmitter 1346, will require significantly less power than would be required if the sprinkler head positioner 1321 is an electrical motor.

The sprinkler system 1300 also includes the following components which have been described above with respect to other embodiments (such as those depicted in FIGS. 3, 8, 11 and 12): a controller 1382 which controls operation of the area programmable sprinkler system 1300; a flow control valve 1372 which controls flow of water to the sprinkler head 1308 via control valve positioner 1374; and a main water supply conduit 1364. The controller 1382 includes the following components (which have also been described above with respect to other embodiments): a microprocessor 1384 ("C5"); a memory device 1389 ("MEM"); and a receiver 1388 ("R3"). The receiver 1388 can receive signals from the transmitter 1346 at the sprinkler head 1308 such that the controller 1382 (and in particular, the processor 1384) are able to determine the current sprinkler head position (as determined by the sprinkler head position determiner 1330) and the amount of water being provided to the nozzle 1310 (or the water pressure proximate the nozzle, which is proportional to the water flow, via flow sensor 1394).

In order to ensure that the water motor 1321 moves the sprinkler head 1308 at an essentially constant rotational speed, and without dispensing unwanted water emanating from the water motor at the area to be irrigated, the sprinkler system 1300 can be provided with a water-motor water recirculation system (not specifically numbered). The water-motor water recirculation system (or water recirculation system) includes the following primary components: a water recirculation conduit 1390 which conducts water emanating from the water motor 1321 away from the sprinkler head 1308; a water recirculation pump 1392 (driven by pump motor 1396) which can be used to raise the pressure of water from the water recirculation conduit 1390; and a water injection conduit 1393 to allow water from the recirculation pump 1392 to be injected back into the main water supply conduit 1364. (Additional components of the water recirculation system will be described below.)

For any given water motor 1321, it is generally known what flow rate of water (e.g., as measured in liters per minute, for example) is required to move the motor at a given speed in order to achieve a known rate of rotation (e.g., as measured in revolutions per minute) and thus move the associated sprinkler head (1308) at a desired rotational speed (e.g., as measured in degrees per second). For purposes of discussion, we will define the rate of water to be provided to the water motor 1321 in order to move the sprinkler head 1308 at a first desired speed as "FM1" (i.e., flow 1 to motor 1321). Accordingly, when calculating the flow of water "FT" (i.e., total flow) to be provided to the sprinkler head water conduit 1314 (as determined by processor 1384 controlling valve positioner 1374 and thus control valve 1372), the total amount of water ("FT") is the flow of water required at the nozzle ("FN") in order to achieve the desired irrigation, plus the flow of water ("FM1") for the water motor—i.e., FT=FN+FM1. The flow "FM1" from the water motor is recirculated via water recirculation conduit 1390, leaving only the flow "FN" to be provided to the nozzle 1310.

The water-motor water recirculation system can also include the following components: a recirculation pump motor speed controller ("SC") 1395 (under control of the controller 1382), a recirculation control valve 1398 (with recirculation control valve positioner 1370, also under the control of the controller 1382); and a main water supply pressure sensor 1371. In operation, the processor 1384 can determine (from main water supply pressure sensor 1371) the pressure of water from the water recirculation pump 1392 which is required in order to inject the recirculated water (from the recirculation conduit 1390) into the main water supply conduit 1364. The controller 1382 can then adjust the speed of the recirculation pump 1392 (as for example, via the speed controller 1395), or can adjust the pressure of water in the recirculation injection line 1393 via the recirculation control valve 1398 and associated valve positioner 1370.

As can be appreciated from FIG. 24, the use of a water motor 1321 as the sprinkler head positioner allows the controller 1382, the control valve positioners 1370 and 1374, and the recirculation pump motor 1396 to all be powered by an electrical power supply 1341 (via respective via power lines 1343, 1345 and 1347), such that no electrical power is required at the sprinkler head 1308 in order to move the sprinkler head in rotational motion. In one example the electrical power supply 1341 can be a common power supply providing different required voltages and/or electrical currents to the power lines 1343, 1345 and 1347, and can be powered, for example, by 120 volt alternating current. The power supply 1341 can also be under the control of controller 1382.

The sprinkler system 1300 of FIG. 24 can also be implemented in conjunction with a multi-sprinkler area programmable sprinkler system, such as that depicted in FIG. 12. In this instance the sprinkler system 1300 will include a plurality of water-motor water recirculation conduits (1390, 1309-1, and 1390-2 through 1390-n, FIG. 24, corresponding to the multiple sprinkler heads 400-x of FIG. 12), and the sprinkler head water supply conduit 1314 of FIG. 24 can be manifolded as per the water supply conduits 514-1 through 514-n of FIG. 12.

As described above, the area programmable sprinkler system described herein can be configured such that the sprinkler head can be moved at different rotational speeds, depending upon circumstances (e.g., moved faster to pass over areas where no irrigation is desired or where the area is frequently shaded, and moved slower over areas where more irrigation is desired). This feature can be accommodated by the water-motor variation depicted in FIG. 24. For example, if a user desires to move the sprinkler head 1308 at twice the normal speed, then twice as much water flow is required to be provided to the water motor 1321. Thus, the total water flow "FT" provided to the sprinkler head 1308 will be (using the equation provided above) FT=FN+2(FM1). Likewise, if a user desires to move the sprinkler head 1308 at half the normal speed, then half as much water flow is required to be provided to the water motor 1321. Thus, the total flow "FT" to be provided to the sprinkler head will be FT=FN+½(FM1). The calculations for the total water flow ("FT") to be provided via the sprinkler head conduit 1314 can be made by the processor 1384, and achieved by control valve 1372 via the control valve positioner 1374.

The water-motor sprinkler head positioning embodiment depicted in FIG. 24 can also include the following variation. When the sprinkler head 1308 is within range of the controller 1382 such that the controller (when provided with a radio frequency identification (RFID) detector, which can be receiver 1388 of FIG. 24) can read an RFID transmitter located at the sprinkler head 1308, then the sprinkler head position determiner 1330 can include a plurality of RFID transmitters, each transmitter corresponding to a particular position of the sprinkler head 1308. In this case the electrically-powered transmitter 1346 located at the sprinkler head 1308 is not required to transmit position information to the controller 1382, thus reducing power load on the power supply 1340 located at the sprinkler head. In this instance a solar cell (rather than a battery) can be used as the power supply 1340 in order transmit water flow (or water pressure) information from the detector 1394 at the sprinkler head 1308 to the controller 1382.

In a variation on the area-programmable sprinkler system 1300 of FIG. 24, rather than providing the water-motor water recirculation system (including recirculation conduit 1390 and recirculation pump 1392), water from the water motor 1321 can be ejected proximate the sprinkler head 1308 via a separate nozzle (not shown) at the sprinkler head. While this does not allow for a zero-water-flow condition to be present at the sprinkler head 1308 (as some water will need to be ejected from the water motor 1321 in order to continue movement of the sprinkler head), such an arrangement can be beneficially implemented when the sprinkler head 1308 is to be positioned inside of an area to be irrigated (i.e., not immediately adjacent any areas where irrigation is not desired). In certain instances this can be desirable, since the nozzle 1310 of a sprinkler head 1308 is typically not configured to provide irrigation in an area immediately around the sprinkler head.

While the above embodiments have been described in language more or less specific as to structural and methodical features, it is to be understood, however, that the present disclosure is not limited to the specific features shown and described. Certain of the disclosed embodiments are, therefore, claimed in any of their various forms or modifications within the proper scope of the appended claims as appropriately interpreted in light of the current disclosure, and relevant extrinsic sources.

We claim:

1. A center pivot sprinkler system comprising:
a sprinkler arm configured to be mounted at a pivot point at a first end of the sprinkler arm, the sprinkler arm being connectable to a water supply, the sprinkler arm defining a water conduit;
a plurality of water spray nozzles supported by the sprinkler arm and configured to be capable of fluid communication with the water conduit;
a motive source for moving the sprinkler arm in a circular motion about the pivot point;
an end nozzle supported at a second end of the sprinkler arm and capable of being placed in fluid communication with the water conduit;
a control valve positioned between the water conduit and the end nozzle to regulate flow of water from the water conduit to the end nozzle;
a control valve positioner configured to position the control valve;
a processor;
a computer readable memory device in electronic signal communication with the processor;
a position determining device for determining the position of the end nozzle in a circular arc about the pivot point; and
wherein the processor is configured to poll the position determining device to determine a then-current position of the end nozzle and to determine a flow of water to be issued from the end nozzle as a function of the then-current position of the end nozzle, and to instruct the control valve positioner to position the control valve to achieve the determined flow of water to be issued from the end nozzle as a function of the then-current position of the end nozzle; and
the circular motion of the sprinkler arm about the pivot point and the water issued from the plurality of water spray nozzles supported by the sprinkler arm are configured to irrigate an essentially circular pattern, and further wherein the processor is configured to adjust the control valve such that the end nozzle provides irrigation to areas outside of the circular pattern in order to achieve an irrigated square pattern enclosing the circular pattern.

2. The center pivot sprinkler system of claim 1 and further comprising a flow determining device configured to measure flow of water emanating from the end nozzle and to generate a flow signal associated therewith.

3. The center pivot sprinkler system of claim 2 and wherein the flow determining device comprises a pressure sensor configured to detect water pressure in an end nozzle water conduit located between the control valve and the end nozzle.

4. The sprinkler of claim 1 and wherein the position determining device comprises a rotary encoder mounted proximate the pivot point of the sprinkler arm.

5. The sprinkler of claim 1 and wherein the position determining device comprises a global positioning system unit mounted proximate the end nozzle.

6. The sprinkler of claim 1 and wherein the position determining device comprises an electronic compass.

7. The sprinkler of claim 1 and further comprising a user control device which can be placed in communication with the processor in order to allow a user to save in the memory device a desired flow of water to be provided to the end nozzle at a prescribed position of the end nozzle as determined by the position determining device.

\* \* \* \* \*